(12) United States Patent
Neufeld et al.

(10) Patent No.: US 12,546,704 B2
(45) Date of Patent: Feb. 10, 2026

(54) METHODS FOR CHARACTERIZING CHIRALITY

(71) Applicants: TECHNION RESEARCH & DEVELOPMENT FOUNDATION LIMITED, Haifa (IL); FORSCHUNGSVERBUND BERLIN E.V., Berlin (DE)

(72) Inventors: Ofer Neufeld, Haifa (IL); David Ayuso, Berlin (DE); Gavriel Lerner, Haifa (IL); Dana Raluca Cireasa, Haifa (IL); Mikhail Ivanov, Berlin (DE); Olga Smirnova, Berlin (DE); Oren Cohen, Haifa (IL)

(73) Assignees: TECHNION RESEARCH & DEVELOPMENT FOUNDATION LIMITED, Haifa (IL); FORSCHUNGSVERBUND BERLIN E.V., Berlin (DE)

( * ) Notice: Subject to any disclaimer, the term of this patent is extended or adjusted under 35 U.S.C. 154(b) by 822 days.

(21) Appl. No.: 17/562,691

(22) Filed: Dec. 27, 2021

(65) Prior Publication Data

US 2022/0120670 A1    Apr. 21, 2022

Related U.S. Application Data

(63) Continuation of application No. PCT/IL2019/050709, filed on Jun. 25, 2019.

(51) Int. Cl.
*G01N 21/21* (2006.01)
*G01N 21/31* (2006.01)

(52) U.S. Cl.
CPC ............. *G01N 21/21* (2013.01); *G01N 21/31* (2013.01)

(58) Field of Classification Search
CPC .............................. G01N 21/21; G01N 21/31
See application file for complete search history.

(56) References Cited

U.S. PATENT DOCUMENTS

2017/0356843 A1*  12/2017  Alu ....................... G01N 21/554
2021/0190676 A1*   6/2021  Murayama ............ G01J 3/2823

FOREIGN PATENT DOCUMENTS

JP        2011153921 A  *  8/2011
WO       2020261252 A1     12/2020

OTHER PUBLICATIONS

Lerner, Gavriel et al. "Multiscale dynamical symmetries and selection rules in nonlinear optics." Science Advances 9 (2021): n. pag. (Year: 2021).*

(Continued)

*Primary Examiner* — Uzma Alam
*Assistant Examiner* — Justin J Van Cleave
(74) *Attorney, Agent, or Firm* — The Roy Gross Law Firm, LLC; Roy Gross

(57) ABSTRACT

Methods and systems for detecting chiral characteristic of an analyte, are provided. In some embodiments, the method disclosed herein (e.g. operated by a system) comprises receiving at least one spectral line of harmonic emission generated by an interaction between a laser field and the analyte; measuring a characteristic of an electric field of the at least one spectral line resulting from an electric dipole interaction between the laser field and the analyte; and determining the chiral characteristic of said analyte based on said measured characteristics of the at least one spectral line.

20 Claims, 42 Drawing Sheets
(33 of 42 Drawing Sheet(s) Filed in Color)

(56) References Cited

OTHER PUBLICATIONS

Wang et al, "High harmonic generation from axial chiral molecules", Optical Society of America, 2017 (Year: 2017).*
Baykusheva et al, "Chiral Discrimination through Bielliptical High-Harmonic Spectroscopy", Physical Review, 2018 (Year: 2018).*
Heyl et al, "Macroscopic Effects in Noncollinear High-Order Harmonic Generation", Physical Review Letters, 2014 (Year: 2014).*
Neufeld and Cohen, "Optical Chirality in Nonlinear Optics: Application to High Harmonic Generation", Physical Review Letters, published Mar. 30, 2018 (Year: 2018).*
Smirnova et al, "Opportunities for chiral discrimination using high harmonic generation in tailored laser fields", Journal of Physics B, 2015 (Year: 2015).*
Ayuso, D., Neufeld, O., Ordonez, A. F., Decleva, P., Lerner, G., Cohen, O., . . . & Smirnova, O. (2018). Locally and globally chiral fields for ultimate control of chiral light matter interaction. arXiv preprint arXiv:1809.01632.
Ayuso, D., Decleva, P., Patchkovskii, S., & Smirnova, O. (2018). Chiral dichroism in bi-elliptical high-order harmonic generation. Journal of Physics B: Atomic, Molecular and Optical Physics, 51(6), 06LT01. doi:10.1088/1361-6455/aaae5e.
Ayuso, D., Decleva, P., Patchkovskii, S., & Smirnova, O. (2018). Strong-field control and enhancement of chiral response in bi-elliptical high-order harmonic generation: an analytical model. Journal of Physics B: Atomic, Molecular and Optical Physics, 51(12), 124002. doi:10.1088/1361-6455/aabc95.
Cireasa, R., Boguslavskiy, A., Pons, B et al. Probing molecular chirality on a sub-femtosecond timescale. Nature Phys 11, 654-658 (2015). https://doi.org/10.1038/nphys3369.
Neufeld, O., & Cohen, O. (2018). Highly selective chiral discrimination in high harmonic generation by dynamical symmetry breaking spectroscopy. arXiv preprint arXiv:1807.02630.
Neufeld, O., Ayuso, D., Decleva, P., Ivanov, M. Y., Smirnova, O., & Cohen, O. (2019). Ultrasensitive chiral spectroscopy by dynamical symmetry breaking in high harmonic generation. Physical Review X, 9(3), 031002.
Olga Smirnova et al,. 2015. Opportunities for chiral discrimination using high harmonic generation in tailored laser fields. J. Phys. B: At. Mol. Opt. Phys. 48 234005 doi:10.1088/0953-4075/48/23/234005.
Ordonez, A. F. & Smirnova, O. Generalized perspective on chiral measurements without magnetic interactions. Physical Review A 98, 063428 (2018). URL https://link.aps.org/doi/10.1103/PhysRevA.98.063428.
Fischer, P. & Hache, F. Nonlinear optical spectroscopy of chiral molecules. Chirality 17, 421-437 (2005). URL https://onlinelibrary.wiley.com/doi/abs/10.1002/chir.20179.
Beaulieu, S., Comby, A., Descamps, D. et al. Photoexcitation circular dichroism in chiral molecules. Nature Phys 14, 484-489 (2018). https://doi.org/10.1038/s41567-017-0038-z.
Neufeld, O., Podolsky, D., & Cohen, O. (2017). Symmetries and selection rules in Floquet systems: application to harmonic generation in nonlinear optics. arXiv preprint arXiv:1706.01087.
Tang, Y. & Cohen, A. E. Optical Chirality and Its Interaction with Matter. Physical Review Letters 104, 163901 (2010). URL http://link.aps.org/doi/10.1103/PhysRevLett. 104.163901.

Eibenberger, S., Doyle, J. & Patterson, D. Enantiomer-specific state transfer of chiral molecules. Phys. Rev. Lett. 118, 123002 (2017). URL https://link.aps.org/doi/10.1103/PhysRevLett.118.123002.
Owens, A., Yachmenev, A., Yurchenko, S. N. & K''upper, J. Climbing the rotational ladder to chirality. Phys. Rev. Lett. 121, 193201 (2018). URL https://link.aps.org/doi/10.1103/PhysRevLett.121.193201.
Ayuso, D., Decleva, P., Neufeld, O., Lerner, G., Cohen, O., Ivanov, M., Smirnova, O. (2018). Giant chiral macroscopic response in high harmonic generation. arXiv preprint arXiv:1809.01632v1.
Bowering, N. et al. Asymmetry in photoelectron emission from chiral molecules induced by circularly polarized light. Phys. Rev. Lett. 86, 1187-1190 (2001). URL https://link.aps.org/doi/10.1103/PhysRevLett.86.1187.
Fischer, P., Wiersma, D. S., Righini, R., Champagne, B. & Buckingham, A. D. Three-wave mixing in chiral liquids. Phys. Rev. Lett. 85, 4253-4256 (2000). URL https://link.aps.org/doi/10.1103/PhysRevLett.85.4253.
Stranges S, Turchini S, Alagia M, Alberti G, Contini G, Decleva P, Fronzoni G, Stener M, Zema N, Prosperi T. Valence photoionization dynamics in circular dichroism of chiral free molecules: the methyloxirane. J Chem Phys. Jun. 22, 2005;122(24):244303. doi: 10.1063/1.1940632. PMID: 16035753.
Serbinenko, V. & Smirnova, O. Multidimensional high harmonic spectroscopy: a semiclassical perspective on measuring multielectron rearrangement upon ionization. Journal of Physics B: Atomic, Molecular and Optical Physics 46, 171001 (2013). https://doi.org/10.1088/0953-4075/46/17/171001.
Pedatzur, O., Orenstein, G., Serbinenko, V. et al. Attosecond tunnelling interferometry. Nature Phys 11, 815-819 (2015). https://doi.org/10.1038/nphys3436.
Bruner, B. D. et al. Multidimensional high harmonic spectroscopy of polyatomic molecules: detecting sub-cycle laser-driven hole dynamics upon ionization in strong mid-ir laser fields. Faraday Discuss. 194, 369-405 (2016). URL http://dx.doi.org/10.1039/C6FD00130K.
Toffoli, D., Stener, M., Fronzoni, G., & Decleva, P. (2002). Convergence of the multicenter B-spline DFT approach for the continuum. Chemical physics, 276(1), 25-43.
Zuo, T., & Bandrauk, A. D. (1995). High-order harmonic generation in intense laser and magnetic fields. Journal of Nonlinear Optical Physics & Materials, 4(03), 533-546.
Long, S., Becker, W., & McIver, J. K. (1995). Model calculations of polarization-dependent two-color high-harmonic generation. Physical Review A, 52(3), 2262-2278. doi:10.1103/physreva.52.2262.
Eichmann, H., Egbert, A., Nolte, S., Momma, C., Wellegehausen, B., Becker, W., . . . McIver, J. K. (1995). Polarization-dependent high-order two-color mixing. Physical Review A, 51(5), R3414-R3417. doi:10.1103/physreva.51.r3414.
Milošević, D. B., Becker, W., & Kopold, R. (2000). Generation of circularly polarized high-order harmonics by two-color coplanar field mixing. Physical Review A, 61(6). doi:10.1103/physreva.61.063403.
Fleischer, A., Kfir, O., Diskin, T. et al. Spin angular momentum and tunable polarization in high-harmonic generation. Nature Photon 8, 543-549 (2014). https://doi.org/10.1038/nphoton.2014.108.
Kfir, O., Grychtol, P., Turgut, E. et al. Generation of bright phase-matched circularly-polarized extreme ultraviolet high harmonics. Nature Photon 9, 99-105 (2015). https://doi.org/10.1038/nphoton.2014.293.

* cited by examiner

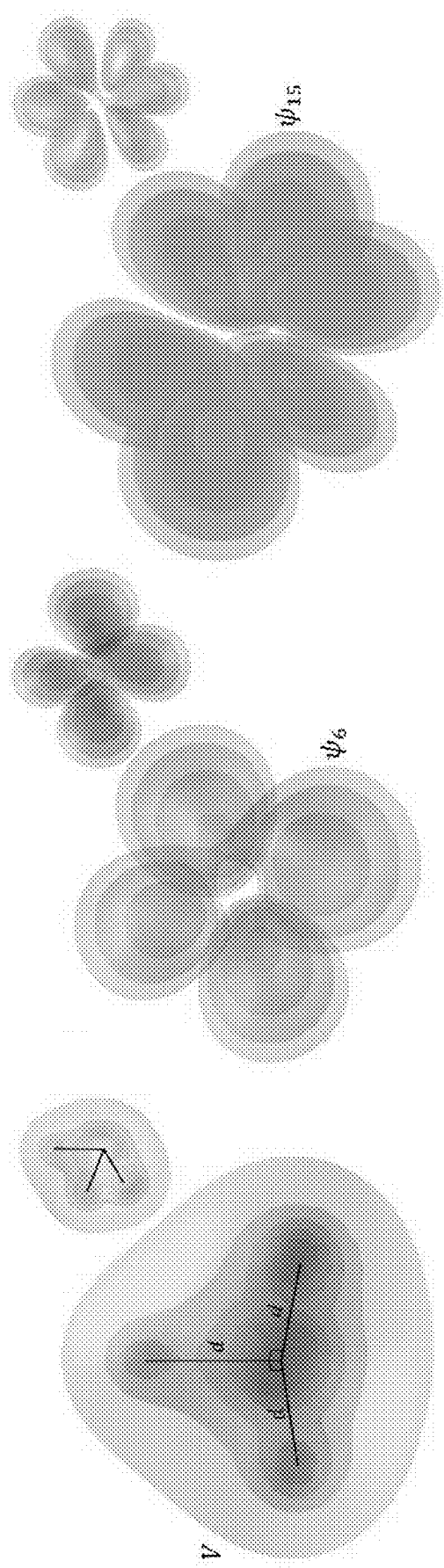

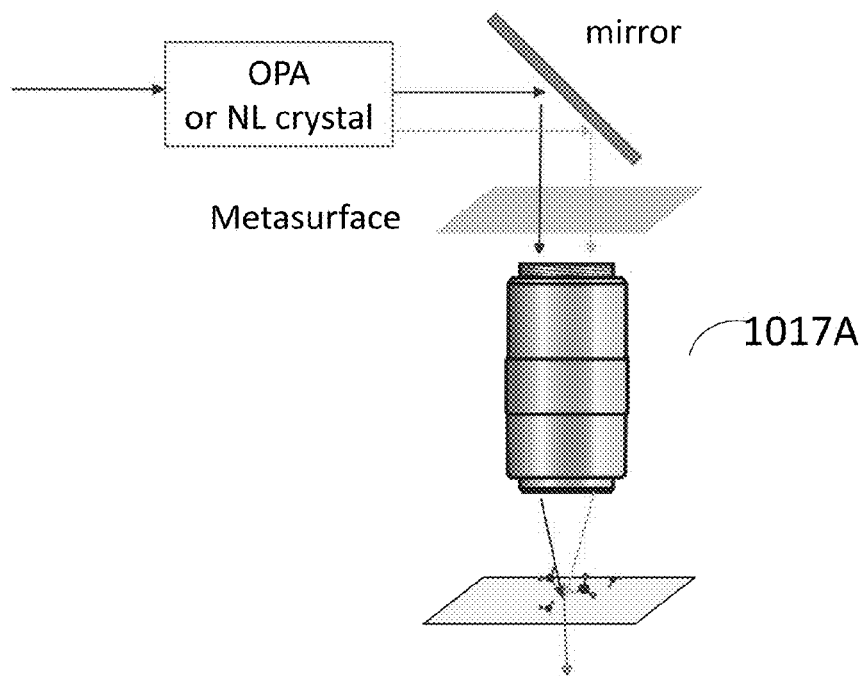
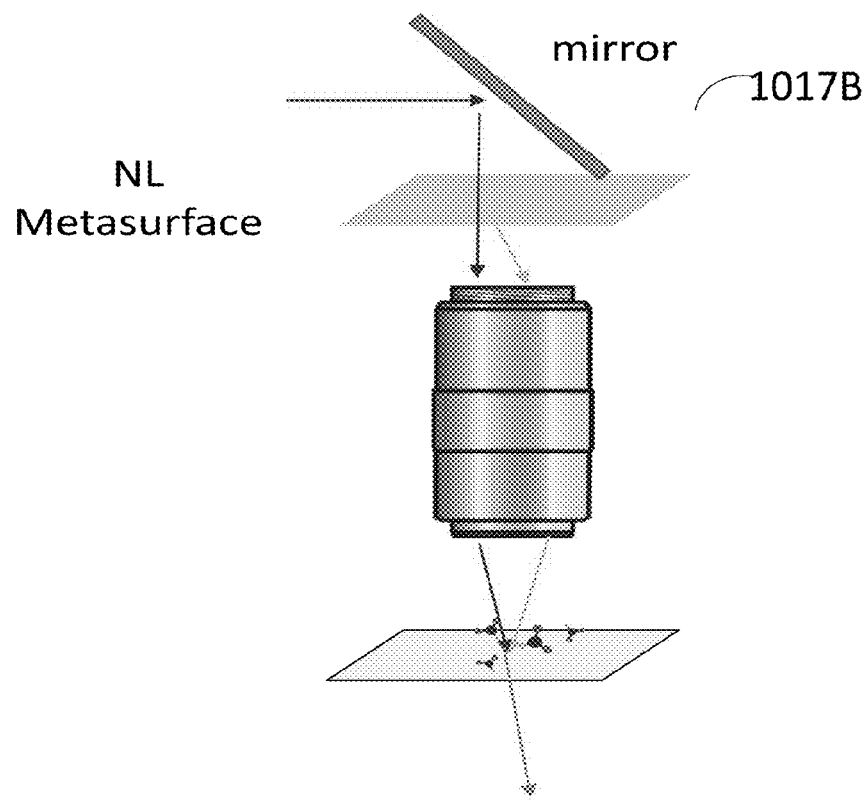
Figure 17E

METHODS FOR CHARACTERIZING CHIRALITY

CROSS REFERENCE TO RELATED APPLICATIONS

This application is a Bypass Continuation of PCT Patent Application No. PCT/IL2019/050709 having International filing date of Jun. 25, 2019, the contents of which is incorporated herein by reference in its entirety.

FIELD OF THE INVENTION

The present invention is in the field of physical methods for detecting and characterizing chirality of an analyte.

BACKGROUND OF THE INVENTION

Chirality is a fundamental property of asymmetric systems that is abundantly observed in nature. Its analysis and characterization is of tremendous importance in multiple scientific fields, including particle physics, astrophysics, chemistry, and biology. For example, amino acids are generally chiral, as well as DNA and other biologically active molecules, making molecular chiral spectroscopy a necessity for modern drug design. Chiral spectroscopy is therefore paramount, and novel spectroscopic methods are required to enhance signal strength and resolution, as well as to probe systems with ultrafast chiral dynamics.

SUMMARY OF THE INVENTION

The present invention, in some embodiments thereof, provides a method and a system for detecting chiral characteristic of an analyte.

In some embodiments, the method disclosed herein (e.g. operated by a system) comprises receiving at least one spectral line of harmonic emission generated by an interaction between a laser field and the analyte, to thereby define an interaction region; measuring a characteristic of an electric field of the at least one spectral line; and determining the chiral characteristic of said analyte based on said measured characteristics of the at least one spectral line.

In some embodiments, the laser field exhibits any one of the following symmetry properties:
- static reflection symmetry;
- dynamical reflection symmetry;
- dynamical inversion symmetry;
- dynamical improper rotational symmetry; and
- lack of inversion, reflection, and improper-rotation symmetry, wherein the laser field is locally chiral at said interaction.

In some embodiments, there is provided a method (e.g., operated by a system) for detecting chiral characteristic of an analyte, the method comprising receiving at least one spectral line resulting from an interaction between a laser field and the analyte, to thereby define an interaction region; measuring a characteristic of an electric field of the at least one spectral line; and determining the chiral characteristic of said analyte based on said measured characteristics of the at least one spectral line, wherein the laser field exhibits any one of the following symmetry properties:
- static reflection symmetry;
- dynamical reflection symmetry;
- dynamical inversion symmetry;
- dynamical improper rotational symmetry; and
- lack of inversion, reflection, and improper-rotation symmetry, wherein the laser field is locally chiral at said interaction.

In some embodiments, the interaction region can be the region on the analyte, or the sample comprising the analyte, which exhibits the electric dipole.

In some embodiments, determining the chiral characteristic of the analyte is based on a model that assumes electric dipole interaction between the illuminated laser and the analyte. In some embodiments, determining the chiral characteristic of the analyte is based on a model that assumes that the illuminated laser exhibit the said symmetry properties.

In some embodiments, the electric field of the laser can be generated by illuminating at least two laser beams non-collinearly, wherein at least one of the following is controlled: (i) one or more of the wavelengths of the laser beams, and (ii) one or more of the polarizations of the laser beams.

In some embodiments, the electric field of the laser is generated by shaping a laser beam or multiple laser beams with a metamaterial structure, so as to exhibit said symmetry properties. In some cases, the measuring a characteristic of an electric field is measuring intensity of the spectral line.

In some embodiments, measuring a characteristic of an electric field is measuring any one of ellipticity and polarization handedness of the spectral line, or combination thereof. In some embodiments, the locally chiral laser field maintains its local chirality and handedness within all the interaction region with the analyte.

In some embodiments, the locally chiral laser field can have different handedness in different sections of the interaction region. In some embodiments, the electric dipole interaction between the laser and the analyte where the laser field exhibits different symmetry properties in different sections of the interaction region.

In some embodiments, the harmonic emission results from a high harmonic generation process between the laser and the analyte. In some embodiments the harmonic emission results from a low-order harmonic generation process between the laser and the analyte. In some embodiments, the harmonic emission results from a wave-mixing nonlinear process causing a polarization density which responds non-linearly to the electric field.

In some embodiments, the harmonic emission is caused by projection of at least two non-collinear beams comprising a first laser beam and a second laser beam which jointly meet the analyte to generate said harmonic emission.

In some embodiments, the laser field interacting with the analyte is characterized by a static reflection symmetry. In some embodiments, the laser field interacting with the analyte is characterized by a dynamical reflection symmetry. In some embodiments, the laser field interacting with the analyte is characterized by a dynamical inversion symmetry. In some embodiments, the laser field interacting with the analyte is characterized by a dynamical improper rotation symmetry. In some embodiments, the laser field interacting with the analyte is characterized by lack of inversion, reflection, and improper-rotation symmetry, wherein the laser field is locally chiral at said interaction.

In some embodiments, wherein two laser beams are utilized, the angle of incidence of the first laser beam and the second laser beam is in the range of 0° to 90°. In some embodiments, a polarization state of the first laser beam is linearly, elliptically, or circularly polarized. In some embodiments, the polarization state of the second laser beam is linearly, elliptically, or circularly polarized.

In some embodiments, the projecting of said first laser beam and the second laser beam is at the same time or different time intervals. In some embodiments, measuring a characteristic of at least one spectral line is in respect to a predefined measuring model based on the level of polarized harmonic spectrum emitted from the chiral/achiral analyte.

In some embodiments, measuring a characteristic of at least one spectral line is in respect to a predefined measuring model based on harmonic ellipticity value according to the harmonic order, wherein the helicity changes sign the analyte's handedness. In some embodiments, measuring a characteristic of at least one spectral line is in respect to a predefined measuring model based on the ratio of said spectral line to at least one other spectral line.

In some embodiments, the analyte is within a liquid, a solution, a solid or a gas sample. In some embodiments, wherein two laser beams are utilized the first laser beam and the second laser beam originate from the same source. In some embodiments, first laser beam and a second laser beam originate from a different source.

In some embodiments, the harmonic emission from the analyte is imaged to create a dimensional map at one two or three space dimensions of chiral regions in the analyte.

In some embodiments, there is provided a system which can operate at least part of the methods disclosed herein.

In some embodiments, there is provided a system comprises an detection device coupled with at least one hardware processor and a non-transitory computer-readable storage medium having stored thereon program instructions, the program instructions executable by the at least one hardware processor to receive at least one spectral line resulting from a harmonic emission from an analyte, illuminated by laser light, measure a characteristic of an electric field of the at least one spectral line, and determine the chiral characteristic of said analyte based on said measured characteristics of the at least one spectral line.

In some embodiments, the harmonic emission received by the system from an electric dipole interaction generated by a three-dimensional vectorial laser field which interacts with the analyte and exhibits harmonic emission with one of the following properties:
  static reflection symmetry
  dynamical reflection symmetry
  dynamical inversion symmetry
  dynamical improper rotational symmetry
  harmonic emission without any one of inversion, reflection, or improper-rotation symmetry.

As used herein, the term "three-dimensional vectorial laser field" is a laser field with three non-zero polarization components, e.g. a laser field with x, y and z polarization components.

In some embodiments, the detection device comprises a spectrometer.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee

FIG. 5D-E: Orientation averaged harmonic spectra under similar settings to A-C from a strong-field model for $C_3H_6O$, but with $\omega$-$3\omega$ in the pump field for fundamental wavelength $\lambda=1900$ nm, and $I_{max}=5\times10^{13}$ [W/cm$^2$];

FIGS. 6A-C present the Iso-surface plots for: (FIG. 6A) the chiral atomic potential, (FIG. 6B) the $6^{th}$ orbital, and (FIG. 6C) the $15^{th}$ orbital. In each sub-figure a second viewpoint is shown in inset. Iso-surfaces for the potential are: s=0.15, 0.3, 0.4, 0.5, 0.6$V_{max}$, and for the orbitals are: s=0.05, 0.1, 0.25, 0.75$|\psi|_{max}^2$. In (A) lines represent the molecular backbone for the model potential, where d=1a.u;

(FIG. 8A) chiral/achiral signal per harmonic order vs. orientations; (FIG. 8B) Chiral even harmonic emission ratio to nearby odd achiral harmonic emission. The average ratio is 0.5 for this particular parameter choice; (FIG. 8C) exemplary representation of the 48-orientation ensemble—the Lissajou curves of the 48 different orientations of pump fields used in the molecular reference frame. As seen, the electric field drives all three spatial axes, even from a single orientation.

(FIG. 10B) Interference of chiral and achiral pathways in even (second) harmonic generation from a single molecule controlled by $h^{(5)}$ (FIG. 10A). Interfering multiphoton pathways controlled by $h^{(5)}$ resulting in enantiosensitive absorption into level $|1\rangle$. (FIG. 10C);

FIG. 11D same as C but for the opposite enantiomer of the field;

FIG. 15C shows z-polarized harmonic intensity from opposite enantiomers for $\lambda=1500$ nm, $I_{max}=1.2\times10^{13}$ W/cm$^2$, $\phi_{\omega,2\omega}=2\pi/3$, $\varepsilon_1=0.4$, $\varepsilon_2=0.3$, $\alpha=5°$, and a trapezoidal envelope with 4 cycle turn-on/off and 3 cycle flat-top and FIG. 15D chiral dichroism in the harmonic intensity. An error of ±18.4% is estimated based on convergence with the number of orientations.

FIG. 17E presents two optional setups 1017A and 1017B of a layout using a metasurface before the objective, which can be nonlinear and produce the second frequency of the driving field, according to exemplary embodiments.

DETAILED DESCRIPTION OF THE INVENTION

Figure 1A:
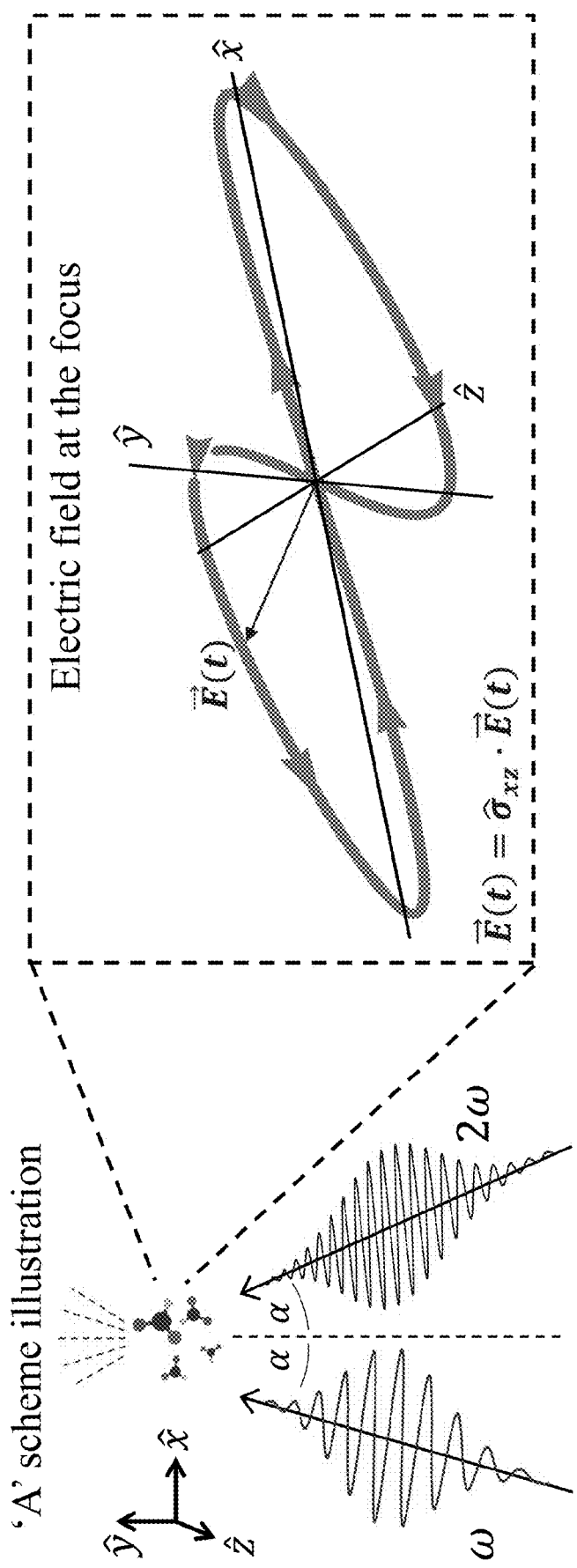
FIGS. 1A-D present 'static' reflection symmetry breaking based chirality detection in high harmonic generation (HHG): numerical model potential results; Non-limiting illustration of scheme (A) with the pump field from eq. (7), inset shows the 3D Lissajou plot of the microscopic electric field vector in the focus (though in this case the field is 2D and is contained in the xz plane), which exhibits a static reflection symmetry (arrows along the Lissajou represent the direction of time) (FIG. 1A); numerically calculated y-polarized HHG emission from the chiral/achiral ensembles ($\psi_6$ in model potential) for $\lambda$=900 nm, $I_{max}$=6.5×10$^{13}$ [W/cm$^2$], $\phi$=0, $\Delta$=1, 15°, and a trapezoidal envelope with 4 optical cycle long turn-on/off and 4 optical cycle long flat-top. In the chiral ensemble all harmonic orders are emitted (both even and odd), while there is no y-polarized harmonic emission from the achiral ensemble (FIG. 1B); calculated harmonic ellipticities in the xy plane from (R) and (S) ensembles—the helicity changes sign with the medium's handedness (FIG. 1C); and integrated y-polarized yield per harmonics 8-20 vs. ee in log scale (FIG. 1D)

The present invention, in some embodiments thereof, provides a method and a system for identifying chirality of an analyte. In some embodiments, the method disclosed herein receives, at least a part of a spectral line of nonlinear harmonic emission and analyzes the received spectral line to define the chiral characteristic of the analyte. In some embodiments, the chiral characteristic defined by the method and system of the invention can be utilized to identify the analyte's molecular chirality and the enantiomeric excess in a sample comprising the analyte.

In some embodiments, the method disclosed herein can be configured to identify the chiral characteristics of the analyte, based on symmetry breaking phenomena, wherein spectral line of a nonlinear harmonic emission resulting from a harmonic generation (e.g., high or low order harmonic generation) on the analyte is measured. In some cases, such a method can yield a chiral/achiral signal correlated to magnitude of the enantiomeric excess in an analyte.

According to the some embodiments, there is provided a method for identifying a chiral characteristics of the analyte, based on symmetry breaking phenomena, wherein spectral line of a nonlinear radiation resulting from wave-mixing nonlinear process causing a polarization density which responds non-linearly to the electric field of the light.

In some case, wherein nonlinear radiation results from wave-mixing nonlinear process, the method and system disclosed herein can be configured to analyze spectral line with multiple orders.

In some embodiments, the method and system disclosed herein can employ a detection device, e.g., a spectrometer, designed to receive the spectral line or lines. In some embodiments, the device can be coupled with at least one hardware processor and a non-transitory computer-readable storage medium having program instructions stored thereon, the program instructions executable by the at least one hardware processor to receive, and/or measure, and/or analyze the spectral line of the nonlinear harmonic emission.

In some embodiments, chiral characterization by the method and system of the invention relies solely, or in some cases or dominantly, on the spectral line analysis dominantly generated by electric-dipole interaction between the laser and the analyte.

In some embodiments, the method disclosed herein comprises a step of measuring a characteristic of the spectral line, such as in respect to a predefined measuring model. Measuring the characteristic of the spectral line, allows performing at least part of the analysis processes based on the received spectral line. In some embodiments, measuring a characteristic of an electric field is measuring intensity of the spectral line. In some embodiments, measuring a characteristic of an electric field is measuring any one of ellipticity and polarization handedness of the spectral line, or combination thereof.

In some embodiments, the method and system disclosed herein can be utilized for measuring a characteristic or characteristics of an electric field of the at least one spectral line. In some cases, the characteristic of an electric field of the at least one spectral line can be one or more of the following: (i) wavelengths, and (ii) one or more of the polarizations, (iii) the harmonic number received from the spectral line, (iv) x-polarized high harmonics, (v) x-polarized odd harmonic, (vi) harmonic ellipticity in xy plane, and (vii) polarized harmonic spectrum.

In some embodiments, the predefined measuring model can comprise, but is not limited to: (i) measuring the level of polarized harmonic spectrum emitted from the chiral/achiral analyte, (ii) measuring harmonic ellipticity according to the harmonic order, wherein the helicity changes sign the analyte's handedness, and (iii) measuring the polarized odd harmonics versus the enantiomeric excess.

In some embodiments, the high harmonic emission on the analyte can be caused by an electric dipole interaction between the laser and the analyte. In some cases, the electric dipole interaction can be generated through focusing two non-collinear laser beams on the analyte. Thus, the analyte can be irradiated with an intense laser field, and the emission spectrum resulting from that laser field can be measured and analyzed, as aforementioned.

In some embodiments of the present invention, the two non-collinear laser beams can be used to induce macroscopic chiral light. Thus, the two non-collinear laser beams generate electric dipole interactions on an analyte which can provide a chiral sensitivity, both in the microscopic response and in the macroscopic scale. The propagation and the phase of the macroscopic chiral light can be photoinduced for the purpose of probing and monitoring the chiral characteristic.

In some embodiments, the focused non-collinear laser pulses induce a three-dimensional vectoral laser field that interacts with the analyte. In some cases, a meta-structure with metasurfaces is illuminated by a laser to induce a three-dimensional vectoral laser field that interacts with the analyte (FIGS. 17B-17E).

In some embodiments, the system and methods disclosed herein can be operated using a layout comprising two non-collinear laser beams set to generate the electric dipole on the analyte required for chiral characteristic processes.

In some cases, the setting of the layout comprising two non-collinear laser beams can harness the fact that chiral analyte inherently breaks certain symmetries, e.g., reflections, inversions, dynamical-reflections, and the like, that are upheld by the pump field. Thus, the setting of the layout can be engineered to illuminate the analyte for generating harmonic emission characterized by diverse symmetries.

In some embodiments, operations required for measuring and analyzing intensities of the spectral line, may be based on the characteristic of the harmonic emission caused by the analyte illumination to define the chiral characteristic of the analyte. In some cases, the characteristic of the harmonic emission caused by the analyte illumination may be considered in, at least part, of the analysis steps.

For example, the vector direction of the electrical field may be considered in the analysis in case the harmonic emission caused by the analyte illumination is characterized by a spherically symmetric ensemble which is invariant under any rotation, reflection, and inversion. Namely, in this exemplary case, the characteristic of the harmonic emission, e.g., the direction of the field, may be considered in the analysis in case the vector direction of the field is dependent on the macroscopic emission of the harmonics.

In some embodiments, the laser pumps can set to exhibit harmonic emission characterized by orientation of enantiomer (R). In some cases, the pumps can set to exhibit harmonic emission characterized by orientation of enantiomer (S). In some embodiments, the laser pumps can set to exhibit harmonic emission characterized by orientation that changes according to the vector direction of the field.

In some cases, a co-propagating single-color can be focused into a metamaterial structure to produce a three-dimensional multi-color pump laser filed. In some other cases, a co-propagating multiple-color beams can be focused into a metamaterial structure to produce a three-dimensional multi-color pump laser field.

The method and system of the present invention can be operated using several settings, based on the architectural and/or configuration variables of the non-collinear laser beams' layout. Thus, in some cases, the laser beam architectural and/or configuration variables such as the polarizations of the laser beam, the frequencies thereof, and the angles between the beams, may be changed and/or set, such as to generate the electric dipole interaction with the analyte required for chiral characteristic processes. In some cases, changing and/or setting the architectural and/or configuration variables may be required for the purpose of receiving a number of intensity values of spectral lines which are different from each other.

For example, in one chiral characteristic definition process, a person utilizing a layout comprising two non-collinear laser beams can change the polarization of the at least one of the beams, and/or the angle between the beams, and thereby receive a first spectral line. In this exemplary case, in another chiral characteristic definition process the person can change again the polarization of the at least one of the beams, and/or the angle between the beams and thereby receive a second spectral line The term "angle between the beams" refers to the angle measured between two light trajectories of two beams focusing on one point (e.g., the analyte), wherein each light trajectory is defined to be the trajectory of the center of each beam.

In some cases, the system and methods disclosed herein can be employed according to the symmetry breaking in high or low harmonic generation. Thus, architectural and/or configuration variables of the non-collinear laser beams' layout can be set for the purpose of receiving diverse symmetry breaking options resulting from the high harmonic generation. For example, the non-collinear laser beams' layout can be set to a static reflection symmetry breaking. In some other cases, the non-collinear laser beams' layout can be set to a dynamical improper-rotational symmetry breaking.

In some cases, the non-collinear laser beams' layout can be set to a dynamical reflection symmetry breaking. In some cases, the non-collinear laser beams' layout can be set to a dynamical inversion symmetry breaking.

In some embodiments, a single laser pump can be utilized to generate the harmonic emission. In some cases, a laser beam directed to a metamaterial can be set, to obtain harmonic emission with a spatial field distribution which may be in correlation to the required analysis of the analyte.

In some embodiments, the predefined measuring model may be set and defined, in accordance with the symmetry breaking resulting by high harmonic generation. For example, in case the symmetry breaking is static reflection symmetry breaking the y-polarized yield per harmonics 8-20 vs. enantiomeric excess (ee) in log scale for fundamental wavelength $\lambda=900$ nm, Imax=$4.2\times1013$ [W/cm2], $\phi=\pi/9$, $\Delta1=1.1$, $\Delta2=0.97$, $\alpha=150$.

In another exemplary case, wherein the symmetry breaking is dynamical reflection symmetry breaking the integrated power of the y-polarized odd harmonics 9-19 vs. the enantiomeric excess (ee) in log scale for fundamental wavelength $\lambda=900$ nm, Imax=$4.2\times1013$ [W/cm2], $\phi=\pi/9$, $\Delta1=1.1$, $\Delta2=0.97$, $\alpha=150$, and a trapezoidal envelope with 4 cycle turn-on/off and 4 cycle flat-top.

As used herein the term "analyte" refers to a material of interest that may be present in a sample. In some embodiments, the analyte refers to a chiral molecule or molecular gas, liquid solution or solid. In some embodiments, the analyte refers to an achiral molecule or molecular gas, liquid solution or solid. In some embodiments, the analyte refers to a racemic mixture. Suitable analytes according to the present invention include organic molecules, catalysts, biocatalysts, bio-molecules such as polypeptides, proteins, enzymes, ribozymes, or the like, or mixtures or combination thereof. In some cases, the term medium may be used herein to depict the analyte and the material thereof.

As used herein the term "chiral" molecule refers to a molecule that is not superposable on its mirror image (i.e., the molecule does not possess a plane of symmetry). Most chiral organic molecules contain one or more stereogenic centers which are carbon atoms that are bonded to 4 different groups. The pair of non-superimposable mirror images are generally referred to as enantiomers. A solution, mixture, or substance that comprises an excess of an enantiomer is often referred to as being optically active. That is, the plane of polarization of a beam of plane polarized light passed through the solution or mixture containing an excess of one chiral form of a molecule is typically rotated. Specifically, an enantiomer that rotates the plane of polarized light clockwise (to the right) as seen by an observer is dextrorotatory (indicated as D or +) and an enantiomer that rotates the plane of polarized light counterclockwise (to the left) is levorotatory (indicated as L or −). Because of this optical activity, enantiomers are often referred to as optical isomers or optically active. A mixture of equal number of both enantiomers is called a "racemic" mixture or a "racemate".

In some embodiments, the chiral characteristic of an analyte can be determined in accordance with the symmetry breakings.

As used herein the term "absolute configuration" refers to the spatial arrangement of the atoms of a chiral molecular entity (or group) and its stereochemical description e.g. (R) or (S), referring to Rectus, or Sinister, respectively. As used herein, the term "(R)"/"(S)" system refers to a nomenclature system for denoting enantiomers. This approach labels each chiral center (R) or (S) according to a system by which its substituents are each assigned a priority, according to the Cahn-Ingold-Prelog priority rules (CIP), based on atomic number.

In some embodiments, the method provides a (R)/(S) chiral sensitivity. In some embodiments, the method provides chiral/achiral sensitivity. In some embodiments, there is provided a method to determine the chirality of an analyte in a sample. In some embodiments, there is provided a method to differentiate between the (R) and (S) chirality of an analyte in a sample. In some embodiments, there is provided a method to determine if an analyte in a sample is chiral or achiral.

In some embodiments, the method relies solely on electric-dipole interactions. In some embodiments, the method is not dependent on the interaction with the magnetic field of the illuminating laser.

In some embodiments, the harmonic emission of photons is obtained by projecting two non-collinear beams comprising a first laser beam and a second laser beam which jointly meet the sample to create the asymmetric light field.

In some embodiments, the propagation direction of the first laser beam and the second laser beam form an angle, referred to as non-collinear configuration. In some embodiments, the angle of incidence of the first laser beam and the second laser beam is in the range of 0° to 90°. In some embodiments, the angle of incidence of the first laser beam and the second laser beam is in the range of 1° to 90°, 3° to 90°, 5° to 90°, 10° to 90°, 15° to 90°, 20° to 90°, 25° to 90°, 30° to 90°, 35° to 90°, 40° to 90°, 45° to 90°, 1° to 70°, 3° to 70°, 5° to 70°, 10° to 70°, 15° to 70°, 20° to 70°, 25° to 70°, 30° to 70°, 35° to 70°, 40° to 70°, 45° to 70°, 1° to 50°, 3° to 50°, 5° to 50°, 10° to 50°, 15° to 50°, 20° to 50°, 25° to 50°, 30° to 50°, 35° to 50°, 40° to 50°, 45° to 50°, 1° to 45°, 3° to 45°, 5° to 45°, 10° to 45°, 15° to 45°, 20° to 45°, 25° to 45°, 30° to 45°, 35° to 45°, 1° to 25°, 3° to 25°, 5° to 25°, 10° to 25°, 1° to 15°, 3° to 15°, or 5° to 15°, including any range therebetween.

In some embodiments, the propagation of the first laser beam and the propagation of the second laser beam overlap in space. In some embodiments, the propagation of the first laser beam and the propagation of the second laser beam overlap in time. In some embodiments, projecting the first laser beam and the second laser beam is at the same time or different time intervals. The frequencies ($\omega_i = 2\pi c/\lambda_i$ were $\lambda$ is the wavelength and c is the speed of light) are determined by several consideration: the ratio between the two frequencies $\omega_1/\omega_2 = \lambda_2/\lambda_1$ needs to be odd:odd for achieving dynamical reflection or dynamical inversion symmetries. The frequencies also should be far from resonance of the analyte (for most cases 800-2500 nm is far from any resonance). Another practical consideration is to have a strong enough source for the beams (which is available in the range of 400-2200 nm). For example, 1333 and 800 nm for 3/5 ratio or 1200 and 800 nm for 2/3 ratio can be used.

In some embodiments, the first laser beam is with a frequency of a wavelength of 800 nm. In some embodiments, the second laser beam is with a frequency of wavelength of 400, 1200 or 1333 nm In some embodiments, the first laser beam and the second laser beam have a frequency ratio in the range of x:y to x:y 1:1, 1:2, 2:3, 3:5

In some embodiments, the first laser beam and the second laser beam have an odd:odd frequency ratio. Non-limiting examples of odd:odd frequency ratios include 1:3, 1:5, 1:7, 3:1, 3:3, 3:5, 3:7. In some embodiments, the first laser beam and the second laser beam have an even:odd frequency ratio. Non-limiting examples of even:odd frequency ratio include 2:1, 2:3, 2:5, 4:1, 4:3, 4:5, 4:7.

In some embodiments, the first laser beam and the second laser beam are co-planar. In some embodiments, the first laser beam and the second laser beam are not co-planar.

In some embodiments, the first laser beam and the second laser beam have the same frequency. In some embodiments, the first laser beam and the second laser beam have the same frequency and are co-planar. In some embodiments the first laser beam and the second laser beam have different frequencies.

In some embodiments, a polarization state of the first laser beam is linearly, elliptically, or circularly polarized. In some embodiments, a polarization state of the second laser beam is linearly, elliptically, or circularly polarized. In some embodiments, the first laser beam and the second laser beam have the same polarization state. In some embodiments the first laser beam and the second laser beam have a different polarization state.

In some embodiments, the ratio between the wavelength of the first laser beam and the wavelength of the second laser beam is the ratio between frequencies and wavelengths is practically the same In some embodiments, the first laser beam and the second laser beam originate from the same source. In some embodiments, the first laser beam and the second laser beam originate from a different source. In some embodiments, the source is a laser beam. In some embodiments, the laser beam is split into the first laser beam and the second laser beam.

In some embodiments, the second laser beam is originated through an optical parametric amplifier (OPA). In some embodiments, the OPA converts the frequency of the second laser beam into chosen values, obtaining odd or even frequency ratio with respect to the first laser beam.

As used herein, a spectral line may be a dark or bright line in an otherwise uniform and continuous spectrum, resulting from emission or absorption of light. A spectral line typically extends over a range of frequencies. In some cases, the spectral line can be a narrow line with narrow range of frequencies. In some cases, the spectral line can be a broad line with a broad range of frequencies.

In some embodiments, the obtained spectral line is a result of the emission of forbidden harmonics from a chiral analyte in a sample. In some embodiments, when the analyte in a sample is achiral or racemic, no forbidden harmonics are emitted. In some embodiments, the spectral line obtained is correlated to the magnitude of the enantiomeric excess in a sample.

Background Free Mode

In some embodiments, the frequency ratio of the first laser beam and the second laser beam and the polarization of the first laser beam and the second laser beam lead to a total light field with a reflection/inversion/improper rotation symmetry.

In some embodiments, the obtained symmetry is broken by a chiral analyte in a sample. In some embodiments, the breaking of the symmetry leads to emission of forbidden harmonics. In some embodiments the breaking of the symmetry leads to the emission of harmonics with forbidden polarizations.

In some embodiments, when the analyte in a sample is achiral, a signal with zero intensity is obtained.

Chiral Light Mode

In some embodiments, the frequency ratio of the first laser beam and the second laser beam and the polarization of the first laser beam and the second laser beam lead to an asymmetric total light field. In some embodiments, an asymmetric light field is a light field without reflection/inversion/improper-rotation symmetry.

In some embodiments, an asymmetric light field leads to emission of harmonics with different intensity for (R) chiral analytes and for (S) chiral analytes.

In some embodiments, the difference between the operating modes is physically controlled by tuning the relative beam frequencies, and polarization states, which control the symmetry properties of the total electric field, influencing the harmonic response.

One of skill in the art will appreciate that the order of the laser beams may be altered in various embodiments and that the nomenclature "first laser beam" and "second laser beam" is used herein for ease of reference.

General

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Locally Chiral Fields

In order to extend the molecular group theory definition of chirality to light fields, one must address the fact that light is a time dependent vector field, rather than a static molecule. Consequently, spatial symmetry operations alone cannot fully characterize the light field's point-group, because that would completely ignore the time-dependent properties of the vector field that may themselves exhibit some symmetry relation. To overcome this issue, a dynamical symmetry (DS) group theory formalism is used to describe the spatio-temporal symmetries of time-periodic vector fields.

Within the dipole approximation (DA), the spatial dependence of a local field is neglected. Light's electric field can therefore be described by a time-dependent vector: $\vec{E}(t) = \{E_x(t), E_y(t), E_z(t)\}$. Light's magnetic field can be assigned a similar vector, $\vec{B}(t)$, but $\vec{B}(t)$ is not necessary in order to analyze light's symmetries, because the magnetic field upholds the exact same symmetries as the electric field. Consequently, from this point on the symmetries of $\vec{E}(t)$ are only analyzed and used to distinguish the chirality of the light field. For simplicity, assume that $\vec{E}(t)$ is periodic with a minimal period of T (to which a fundamental frequency, $\omega = 2\pi/T$ is assigned), such that $\vec{E}(t+T) = \vec{E}(t)$ for all t. This assumption is strictly upheld by CW fields, but also describes laser pulses where the pulse duration is larger than the field period. Ultimately, our motivation is to classify $\vec{E}(t)$ according to its DS point-group. Once this is achieved, locally chiral light can be defined as a light field whose DS point-group excludes certain improper-rotational elements, which can be systematically and tractably determined (very similar to the approach used in molecules that is often applied via flow charts [1]). To move forward, the inventors divide the possible improper-rotational DSs to three classes: (i) static symmetries (with no temporal operator), (ii) time-translation based DSs, and (iii), time-reversal based DSs. Now discussed is each class separately and derive the resulting constraints for locally chiral fields:

First, $\vec{E}(t)$'s characterizing DS point-group must exclude static improper-rotational elements (i.e., $\hat{s}\_n$ for any order n, $\hat{\sigma}$, and $\hat{i}$ operations). Importantly, if $\vec{E}(t) \neq 0$ then it cannot be invariant under $\hat{s}\_n$ operations for n>1, because such an invariance implies: $\hat{s}\_n \cdot \vec{E}(t) = \vec{E}(t)$, which can only be upheld for $\vec{E}(t) \equiv 0$, or for the order n=1 (a static reflection operation, $\hat{\sigma}$). As a result, the inventors arrive at the first constraint for locally chiral light—its DS point-group must exclude reflections; hence, $\vec{E}(t)$ cannot be contained within a plane. Notably, this gives rise to two immediate conditions: (a) a non-collinear beam geometry is required for locally chiral light, as derived in the main text, and (b), the field must contain at least two different carrier frequency components (as is the case for the chiral field in Eq. (2) in the main text).

Second, $\vec{E}(t)$'s DS point-group must exclude any DSs that involve time-translations accompanied by spatial improper-rotations. There is a finite amount of such operations [2], which are mapped out for clarity, with their resulting restrictions:

Time-translations by T/2 accompanied by spatial inversion. Therefore, $\vec{E}(t)$ cannot exhibit the following DS: $\vec{E}(t)=\hat{i}\cdot\vec{E}(t+T/2)=-\vec{E}(t+T/2)$. Using the selection-rules described herein, an immediate constraint is derived: to be locally chiral, $\vec{E}(t)$ must be comprised of both even and odd harmonics of $\omega$, as for instance is the case for the field in Eq. (2) in the main text.

Time-translations by T/2 accompanied by spatial reflection. Therefore, $\vec{E}(t)$ cannot exhibit the following DS: $\vec{E}(t)=\hat{\sigma}\cdot\vec{E}(t+T/2)$. Using the selection-rules described herein, an immediate constraint is derived: to be locally chiral, the even and odd harmonics of $\omega$ in $\vec{E}(t)$ (which must be there due to the condition above) either cannot be transverse to one another, or if they are transverse, then at least one odd component of $\omega$ cannot be linearly polarized. For example, the field in Eq. (2) in the main text contains $\omega$ and $2\omega$ components which are transverse, but indeed the $\omega$ field is elliptically polarized, leading to locally chiral light. Alternatively, the bi-elliptical field in FIG. 6 contains non-transverse $\omega$ and $2\omega$ components.

Dynamical improper rotations of odd order that are comprised of time-translations by $T/(2\cdot(2n+1))$ accompanied by odd-order improper rotations, $\hat{s}\_2(2n+1)$. Therefore, $\vec{E}(t)$ cannot exhibit these types of DSs if it is locally chiral: $\vec{E}(t)=\hat{s}\_(2(2n+1))\vec{E}(t+T/(2(2n+1)))$. Notably, if this DS is a member in the point-group of $\vec{E}(t)$, then dynamical inversion is also a member of the point group due to closure. As a result, exclusion of these symmetries leads to the same constraints as derived above for locally chiral light fields.

Dynamical improper rotations of even orders that are comprised of time-translations by $T/(2n)$ accompanied by even-order improper rotations $\hat{s}\_2n$. Therefore, $\vec{E}(t)$ cannot exhibit these types of DSs if it is locally chiral: $\vec{E}(t)=\hat{s}\_2n\cdot\vec{E}(t+T/2n)$. Similar to the case above, if n is odd then dynamical inversion is also a member of the point group due to closure, and there are no further restrictions. If n is even, then these types of DSs must be excluded from the point-group of $\vec{E}(t)$. Using the selection-rules described herein, an immediate constraint is derived: to be locally chiral it is sufficient that the even and odd harmonics of $\omega$ in $\vec{E}(t)$ aren't transverse. If they are, then $\vec{E}(t)$ must either contain some even harmonics other than $n(2q+1)\omega$ (where q is any integer), or it must contain some odd harmonics other than $(2 nq\pm1)\omega$, or at least one of these odd harmonics cannot be circularly polarized.

Third, DSs that involve time-reversal accompanied by spatial improper rotations is discussed. There is a variety of such DS operations as derived as described herein]. A priori, one would expect that these symmetries should be excluded from the point-group of $\vec{E}(t)$ to make it locally chiral. However, chirality must be described by time-even pseudoscalars [3], such as the correlator functions described in the main text. Hence, these time-reversal related DSs (which are time-odd operators) are irrelevant for locally chiral light, and do not need to be excluded for a field to be locally chiral.

For example, the field in Eq. (2) is invariant under the transformation: $\vec{E}(t)=\hat{\sigma}\_xz\cdot\vec{E}(T/2-t)$, but still induces a chiral response.

Overall, these symmetry constraints determine whether a field is locally chiral (a chiral reagent), or locally achiral. It can be summarized that the constraints $\vec{E}(t)$ must uphold to be locally chiral from a symmetry perspective, much like a flow chart used for molecules:

$\vec{E}(t)$ must be a non-collinear field that exhibits polarization in full 3D, and not within a plane.

$\vec{E}(t)$ cannot be a quasi-monochromatic field and must exhibit both even and odd harmonics of $\omega=2\pi/T$ in its carrier waves, where T is the field's minimal temporal period.

The even and odd harmonics of $\omega$ must either not be transverse (some odd and even components of $\omega$ are polarized along the same spatial axis), or if they are transverse, then at least one of the odd harmonics of $\omega$ must by elliptically polarized (non-linear).

If the even and odd harmonics of $\omega$ are indeed transverse, then it is sufficient that at least one of the odd harmonics is non-circularly polarized. Otherwise there are more complex restrictions for the allowed frequencies in the pump to prevent even order dynamical improper rotations of high order (derived above).

Globally Chiral Fields

For analyzing globally chiral fields one cannot neglect the spatial dependence of the field, which is characterized by the time-periodic vector: $\vec{E}(\vec{r},t)=\{E\_x(\vec{r},t),E\_y(\vec{r},t)E\_z(\vec{r},t)\}$, where $\vec{r}$ is a macroscopic spatial coordinate.

The symmetry based definition of globally chiral fields then trivially follows from the previous sub-section—the field must be locally chiral at least at one point $\vec{r}\_0$ in space, and cannot exhibit any spatial (macroscopic) DSs that involve inversions, reflections, or improper rotations, same as for the microscopic coordinates. The exclusion of spatial improper rotation symmetries of the form $\vec{E}(\vec{r},t)=\vec{E}(\hat{s}\_n\cdot\vec{r},t)$ effectively prevent any Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Dynamical Symmetry Breaking in Chiral Media

The inventors first briefly review dynamical symmetries (DSs) and selection rules in high harmonic generation (HHG), and how these can be utilized for chiral spectroscopy. The inventors focus on the microscopic response of a molecule to an intense laser pulse, $\vec{E}(t)$. Since the pulse has a femtosecond duration, the Born-Oppenheimer approximation is employed, and in example the inventors also employ the dipole approximation (DA) unless stated otherwise. The microscopic Hamiltonian of a single molecule interacting with a laser field is then given in atomic units and in the length gauge by:

$$H_\Omega(t) = -\frac{1}{2}\sum_j \vec{\nabla}_j^2 + \frac{1}{2}\sum_{i\neq j}\frac{1}{|\vec{r}_i - \vec{r}_j|} + \sum_j V_\Omega(\vec{r}_j) + \sum_j \vec{E}(t)\cdot\vec{r}_j \quad (1)$$

where $H_\Omega(t)$ is the time-dependent multi-electron Hamiltonian, $\vec{r}_j$ is the coordinate of the j'th electron, $\vec{\nabla}^2_j$ is the Laplacian operator with respect to $\vec{r}_j$, $V_\Omega(\vec{r})$ is the molecular potential, and $\Omega$ represents the molecular orientation (as that of a rigid body). The Hamiltonian in eq. (1) describes the interaction of an oriented molecule with a laser pulse, which due to the nonlinear laser-matter interaction (the right-most term in eq. (1)) generates new harmonic frequencies. Quantum mechanically, the emitted harmonics are expressed by the second order time-derivative of the molecular-induced polarization:

$$\vec{P}_\Omega(t) = -\langle \Psi_\Omega(t) | \vec{r} | \Psi_\Omega(t) \rangle \qquad (2)$$

where $\Psi_\Omega(t)$ is the full multi-electron wave function for the orientation $\Omega$, and the integration is performed over all electronic and spin coordinates. The emitted harmonic spectrum is extremely sensitive to the presence of symmetries in $H_\Omega$. For example, only odd harmonics are emitted if $H_\Omega$ is invariant under a half-wave rotational DS, and only circularly polarized harmonics are emitted if $H_\Omega$ is invariant under an n-fold rotational DS (for n>2). More generally, selection rules are derived as constraints that are a consequence of the invariance of $H_\Omega$ with respect to a unitary spatio-temporal transformation.

When the media is non-oriented, the laser pulse interacts with all possible rigid-body orientations of the molecule uniformly. Therefore, the induced polarization from all orientations should be summed:

$$\vec{P}_{tot}(t) = \int \vec{P}_\Omega(t) d\Omega \qquad (3)$$

The interaction is described by an effective Hamiltonian for the orientation-averaged ensemble, H(t), which exhibits a higher symmetry than $H_\Omega(t)$. As a consequence, many of the molecular properties are 'washed-out' in HHG experiments. For instance, HHG from molecular $SF_6$ gas and atomic Argon gas driven by the same pump result in identical selection rules, because in both cases the orientation averaged Hamiltonian is spherically symmetric. It is important to note that if the orientation-averaged molecular potential is spherically symmetric (as in achiral media), then selection rules arise only as a consequence of the DSs of the driving laser and not of the microscopic medium (which can be the analyte). Accordingly, in spherically symmetric media one may engineer a desired spectral selection rule by wisely choosing the pump beam geometry.

Consider a chiral ensemble of randomly oriented (chiral) molecules, and an achiral ensemble that could be a medium (which can be the analyte) of randomly oriented achiral molecules or a racemic mixture. Both ensembles are invariant under rotations (i.e., SO(3)), as they are isotropic. However, only the achiral ensemble is invariant under reflections and inversions (i.e., under O(3)), since chiral media by definition cannot exhibit reflection and inversion symmetry elements (note that inversion is a product of a reflection about a plane and a $\pi$ rotation around the axis normal to that plane). This property can be used in order to distinguish between the ensembles and generate a purely chiral high harmonic signal. To achieve this separation, pump fields can be used by: (i) generate bright high harmonics; (ii) exhibit a reflection or inversion related DS that leads to forbidden harmonic selection rules in achiral media (easy to observe) that are broken in chiral media; and (iii), do not exhibit other DSs that also lead to the same selection rule but are not broken by chiral media (such as rotational DSs). To elucidate this last requirement, consider the following counter example: within the DA, a single monochromatic beam (linearly, elliptically, or circularly polarized) exhibits a dynamical inversion symmetry that forbids even harmonic generation. Thus, one may expect to measure even harmonics from chiral media driven by such a field. However, monochromatic fields also uphold trivial 180° rotational DSs around their propagation axis that are not broken by chiral media, and lead to the exact same selection rule. Consequently, the propagating HHG emission from a single monochromatic pump beam cannot detect chirality within the DA.

In this paper the inventors present three representative HHG geometries that uphold these requirements. Each example utilizes one of the following three DSs:

$$\hat{\sigma}_{xz} \qquad (4)$$

$$\hat{Z} = \hat{\sigma}_{xz} \cdot \hat{\tau}_2 \qquad (5)$$

$$\hat{F} = \hat{\iota} \cdot \hat{\tau}_2 \qquad (6)$$

Following the notation, where $\hat{\sigma}_{ij}$ represents reflection about the ij plane, $\hat{\tau}_2$ represents temporal translation by half of the fundamental period (T), and $\hat{\iota}$ represents spatial inversion. Hence, eq. (4) describes a 'static' space-only reflection transformation about the xz plane (y→−y), $\hat{Z}$ in eq. (5) is a dynamical reflection symmetry about the xz plane (y→−y, t→t−T/2), and $\hat{F}$ in eq. (6) is a dynamical inversion symmetry ($\vec{r} \to -\vec{r}$, t→t−T/2). The three DSs in eqs. (4)-(6) lead to different selection rules on the emitted harmonic spectrum from the spherically symmetric ensemble: $\hat{\sigma}_{xz}$ results in forbidden y-polarized HHG emission, $\hat{Z}$ results in forbidden x-polarized odd harmonic emission and forbidden y-polarized even harmonic emission, and $\hat{F}$ results in forbidden even harmonic emission. These symmetries are all upheld by randomly oriented achiral media, but broken by chiral media, causing an emission of a background free (up to noise) chiral signal in the form of new harmonics, where the medium's (which can be the analyte) handedness can be retrieved by measuring the harmonic's helicities.

Example 2

Chirality-Sensitive HHG Spectroscopy Based on Dynamical Symmetry Breaking

In this section the inventors present three schemes for chiral spectroscopy based on cHHG symmetry breaking using pump beam geometries that uphold the symmetries in eqs. (4)-(6). The inventors numerically explore these schemes by: (i) solving the time dependent Schrödinger equation (TDSE) for a model chiral potential within the single active electron approximation, (ii) with a DFT-based model for bromochlorofluoromethane, and (iii), using a strong-field model for propylene oxide.

A. 'Static' Reflection Symmetry Breaking

Starting with the simplest case of the space-only reflection symmetry, $\hat{\sigma}_{xz}$ in eq. (4). In order to engineer a laser field that exhibits this symmetry and upholds the desired requirements, one must consider non-collinear HHG schemes. Any collinear scheme necessarily exhibits dynamical τ rotations that prevent chiral sensitivity in the propagating modes. The inventors therefore consider the following ω-2ω non-collinear HHG scheme:

$$\vec{E}_A(t; \vec{r}) = A(t) \cdot E_0 \left( e^{i\left(\omega t - \vec{k}_1 \cdot \vec{r} + \phi\right)} \hat{e}_1 + \Delta \cdot e^{i\left(2\omega t - 2\vec{k}_2 \cdot \vec{r}\right)} \hat{e}_2 \right) \quad (7)$$

where ω is the optical frequency, $\vec{k}_1 = k(\sin(\alpha)\hat{x} - \cos(\alpha)\hat{z})$ is the wave vector for the ω beam, $\vec{k}_2 = -k(\sin(\alpha)\hat{x} + \cos(\alpha)\hat{z})$ is the wave vector for the 2ω beam, $\hat{e}_1 = \cos(\alpha)\hat{x} + \sin(\alpha)\hat{z}$, $\hat{e}_2 = \cos(\alpha)\hat{x} - \sin(\alpha)\hat{z}$, α is half the opening angle between the two beams in the xz plane, k is the magnitude of the wave vector related to the optical frequency, A(t) is a dimensionless envelope function, $E_0$ is the field amplitude, Δ is the amplitude ratio between the beams, and ϕ is an arbitrary phase. The spatial envelope of the field in eq. (7) is neglected in the DA (plane wave treatment). Overall, $\vec{E}_A(t, \vec{r})$ comprises a linearly polarized fundamental ω beam propagating in the xz plane, and a linearly polarized 2ω beam propagating in tandem. Both beams are polarized in the xz plane, and their coherent superposition generates a microscopic field that is invariant under $\hat{\sigma}_{xz}$, independently of the values of the parameters ϕ and Δ (see 1A). This field is not invariant under any other DS (except $\hat{\sigma}_{xz}$), hence all harmonic orders are allowed with general elliptical polarization in the xz plane, while emission of y-polarized harmonics are forbidden, yet should occur in chiral media due to the reflection symmetry breaking. The microscopic pump field may differ in areas far from the beam center, but this does not hamper the scheme since $\hat{\sigma}_{xz}$ symmetry holds for any phase or intensity ratio between the ω and 2ω beams.

Figure 1B:
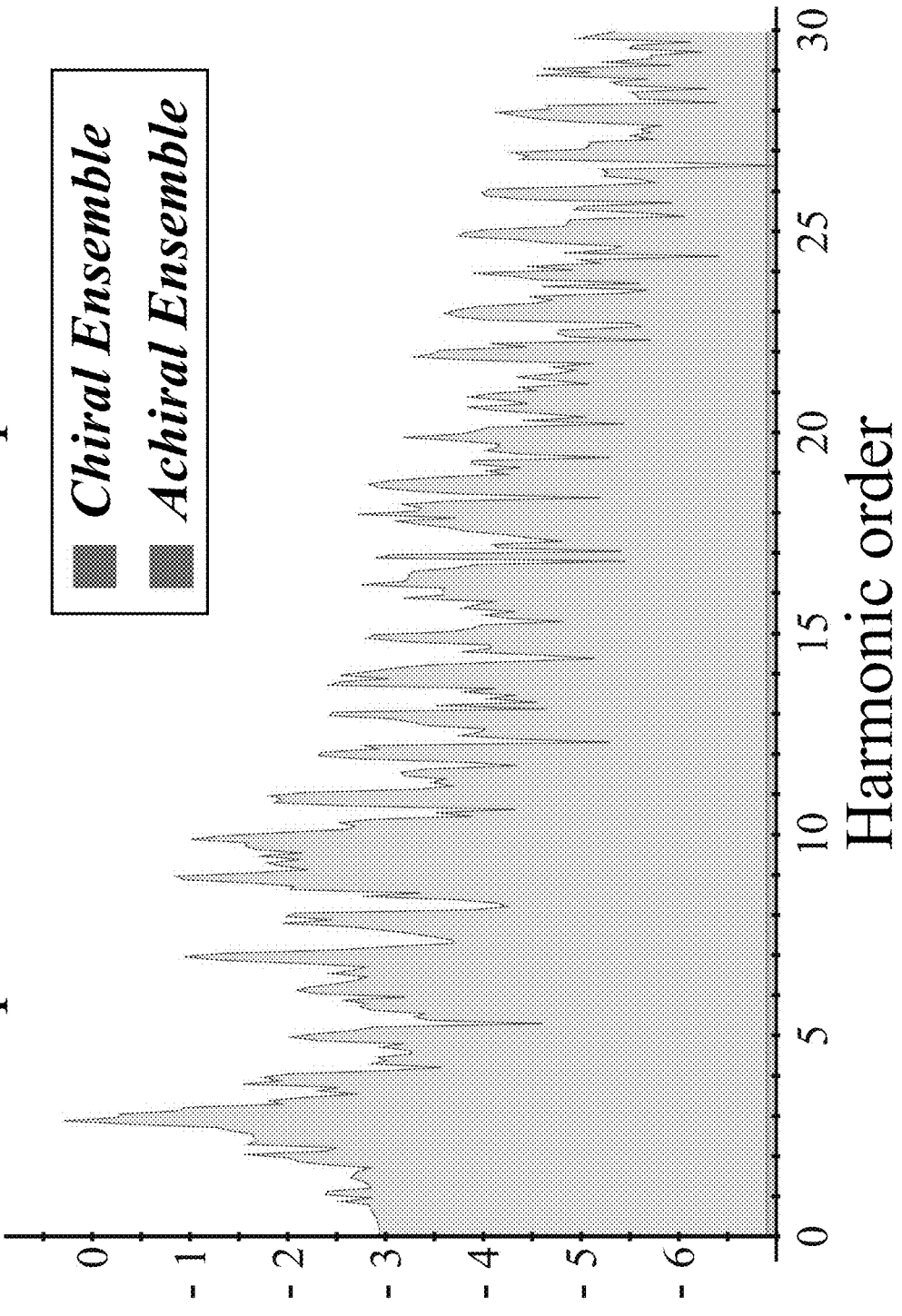
Figure 2:
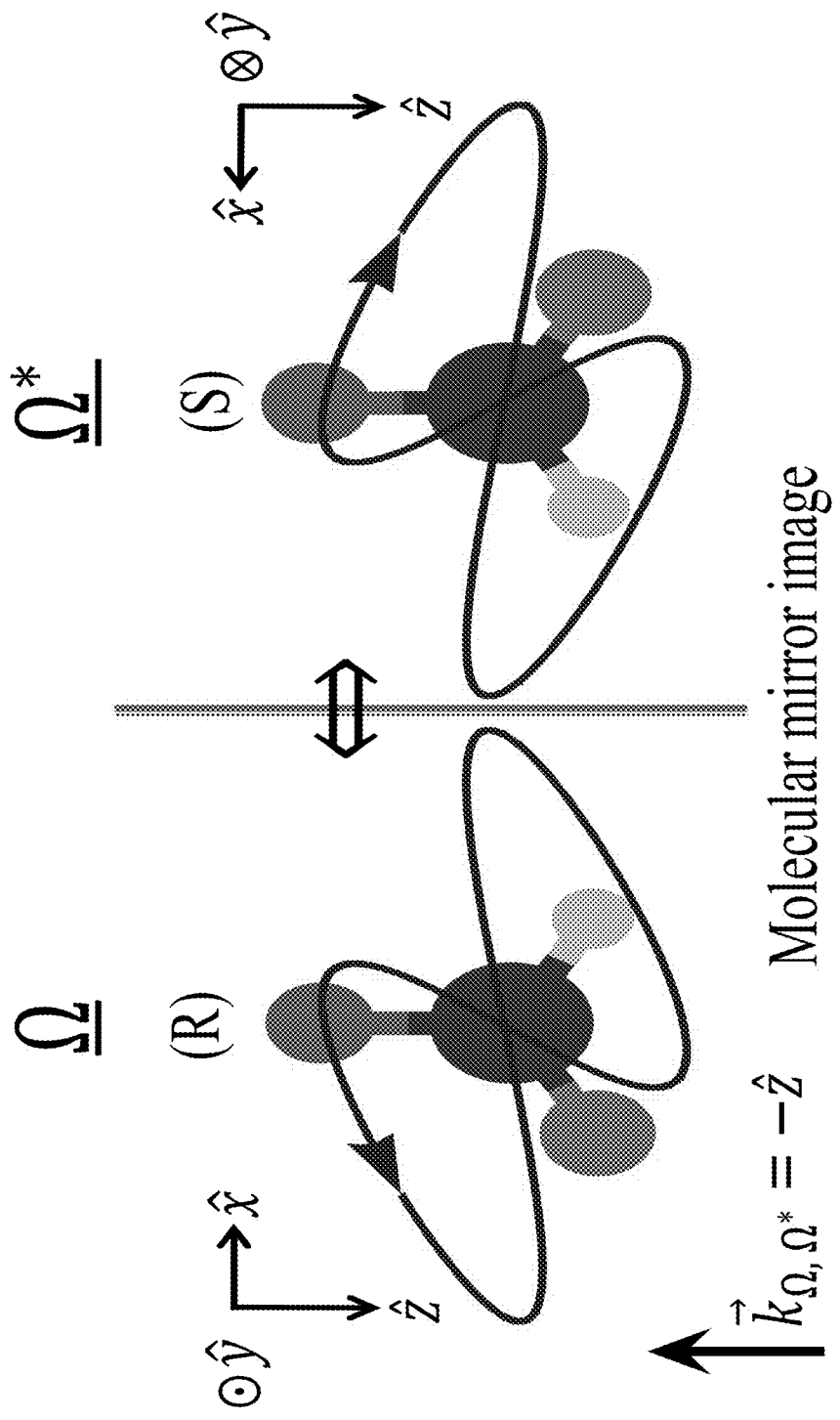
FIG. 2 presents a non-limiting scheme of the mechanism for destructive interference in achiral HHG illustrated in FIG. 1A: for every orientation $\Omega$ of enantiomer (R), a DA equivalent orientation $\Omega^*$ for enantiomer (S) exists due to the reflection symmetry of the pump and the mirror image relation between the (R) and (S) enantiomers. These two orientations exactly destructively interfere for y-polarized HHG emission in the achiral ensemble (which differs by a sign between the two enantiomers for every orientation $\Omega$). However, by definition no two such configurations exist in the chiral ensemble. The purple Lissajou plot shows the overall vector pump field in the dipole approximation.

FIG. 1B shows the microscopic y-polarized HHG emission from the model potential chiral ensemble, where y-polarized harmonics survive orientation averaging. In contrast, the y-polarized spectrum from the racemic mixture is zero, i.e. y-polarization components do not survive orientation averaging. This occurs within the DA, and due to a different accumulated phase by the partner enantiomers in the ensemble—an (R) enantiomer driven by an orientation Ω is equivalent to an (S) enantiomer driven by the reflected orientation Ω*, because the pump is reflection invariant. However, in the reflected orientation Ω2*, they-emission acquires an overall minus sign (π phase). Hence, in the achiral ensemble these contributions exactly interfere destructively (this is schematically illustrated in FIG. 2). In other words, there exists a mapping between the HHG emission from the (R) and (S) ensembles due to the mirror symmetry in the pump. On the other hand, there is no such mapping in the chiral ensemble, because by definition, there is no orientation for which the molecule can be superposed onto its mirror image. Importantly, the y-polarized chiral emission is perpendicular to the plane of incidence and can therefore conserve momentum and propagate.

Figure 1C:
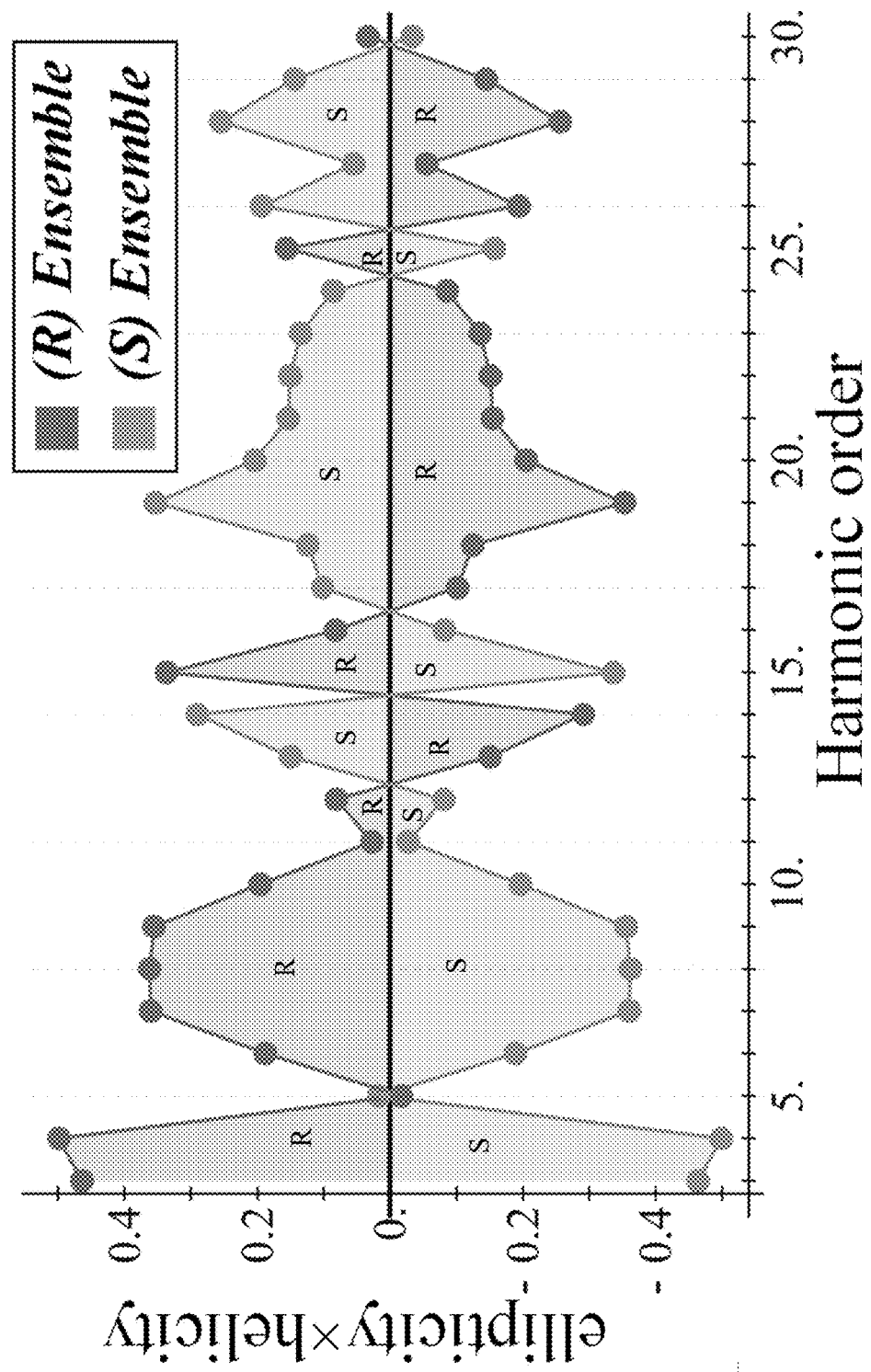

This interference-based mechanism means that the cHHG spectra from partner chiral ensembles have identical spectral intensities, and are distinguishable in the DA only through the global π phase shift—the chiral signal emitted with y-polarization changes sign with the medium's handedness, while the x-polarized emission does not. This global phase shift is directly reflected in the emitted harmonics ellipticities, which change their handedness between (R) and (S) media as shown in FIG. 1C. The ellipticities of some harmonics reaches as high as ±0.5, hence they can be used to characterize the medium's handedness in a single-shot measurement (a single perturbative or non-perturbative harmonic order is enough). Furthermore, the inventors note that this electric-dipole based response does not require interference between different HHG channels, because it is a result of the coherent interference of emissions from different molecular orientations, making our scheme general and system-independent (the only perquisite is that harmonics are generated in the first place). It is also worth mentioning that the pump field in eq. (7) leads to chiral selectivity even though it is comprised from linearly polarized beams (that are individually achiral). This is because the coherent superposition of the beams generates an overall helical field with non-zero optical chirality.

Figure 1D:
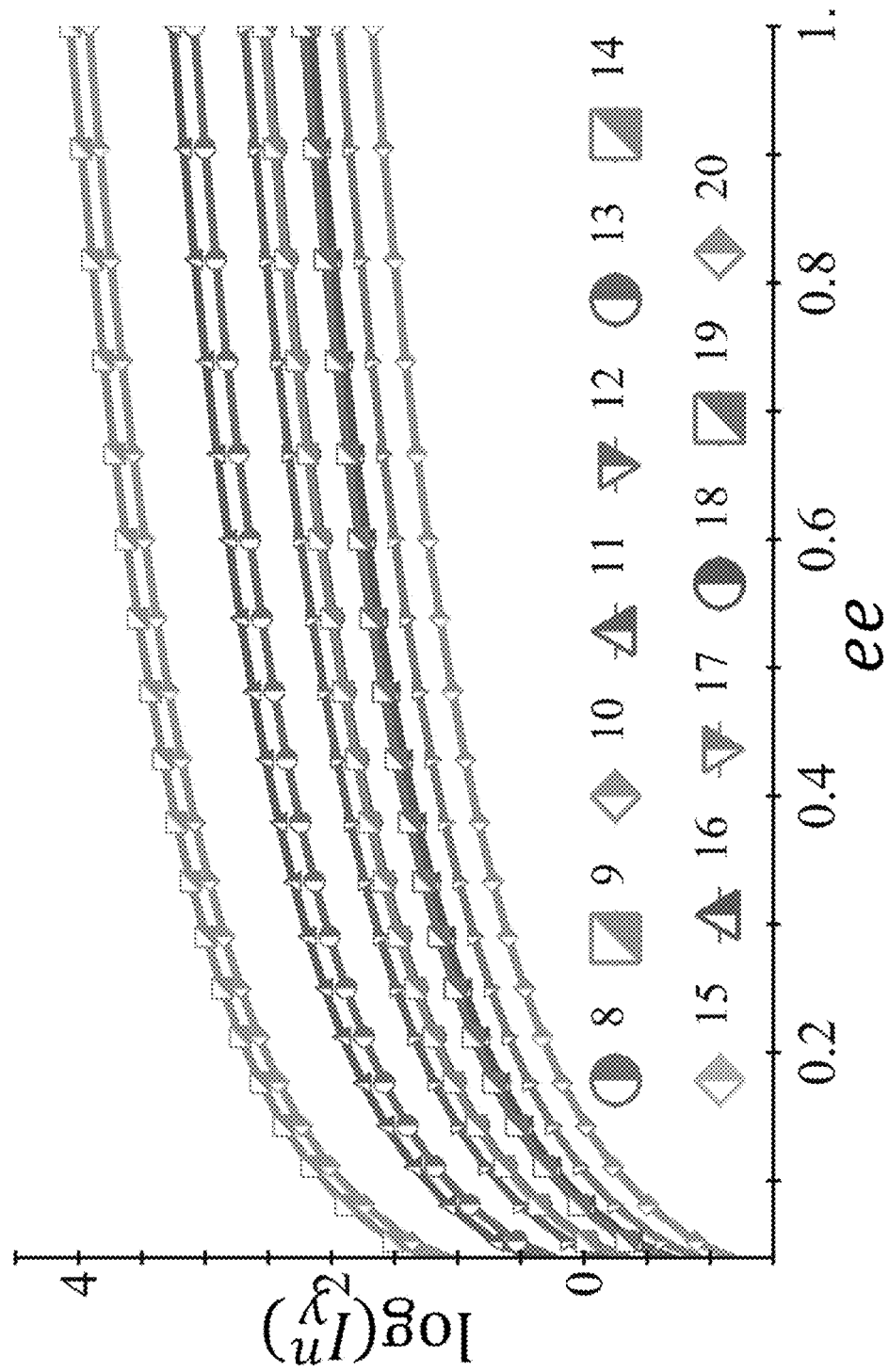

FIG. 1D presents the integrated intensity of the y-polarized emission per harmonic order vs. the medium's enantiomeric excess (ee), which is numerically calculated by coherently adding the polarization from both enantiomers and renormalizing:

$$\vec{P}_{tot}^{ee}(t) = \frac{(1+ee)\vec{P}_{tot}^{(R)}(t) + (1-ee)\vec{P}_{tot}^{(S)}(t)}{2} \quad (8)$$

where ee is the enantiomeric excess. The intensity of the y-emission increases parabolically as a function of the ee for ee∈[0,1], and results in extremely large chiral/achiral signals that are effectively single-shot, because the intensity of the 'forbidden' emission can always be normalized with respect to the 'allowed' emission that is chirality-insensitive. The spectroscopy technique can therefore be used for single-shot high resolution ee measurements. The inventors define the chiral/achiral signal between the two ensembles per harmonic order n as:

$$S_n = \frac{I_n^{ee=1} - I_n^{ee=0}}{I_n^{ee=1} + I_n^{ee=0}} \quad (9)$$

which ranges from 0 to 100% (note that $S_n$ discriminates between the chiral and achiral ensembles, not the (R) and (S) ensembles, and differs by a factor two from standard definitions for chiral signals). A similar measure can be defined through the HHG helicity in the xy plane to distinguish the (R)/(S) ensembles:

$$H_n = h_n^{ee=1} - h_n^{ee=-1} \quad (10)$$

where $h_n$ is the helicity of the $n^{th}$ harmonic. The product of $H_n$ and $S_n$ provides the standard (R)/(S) chiral selectivity that ranges from −200% to 200% per harmonic order. Other effective chiral observables can also be defined. For example, one may average $S_n$ over all harmonic orders to increase the signal to noise ratio. Numerically, the inventors find a 100% disparity between chiral and achiral media for the y-polarized emission, and perfect (R)/(S) handedness selectivity through the helicity of the emitted harmonics. The maximal signal is attributed to the fact that $\hat{\sigma}_{xz}$ is an exact symmetry of our model (this symmetry has no temporal part and is therefore not broken by the finite duration of the laser pulse, or by ionization). In reality, magnetic interactions that are neglected in this analysis may increase the noise in accordance with standard cHHG (~5%), possibly slightly reducing the signal.

B. Dynamical Reflection Symmetry Breaking

Figure 3A:
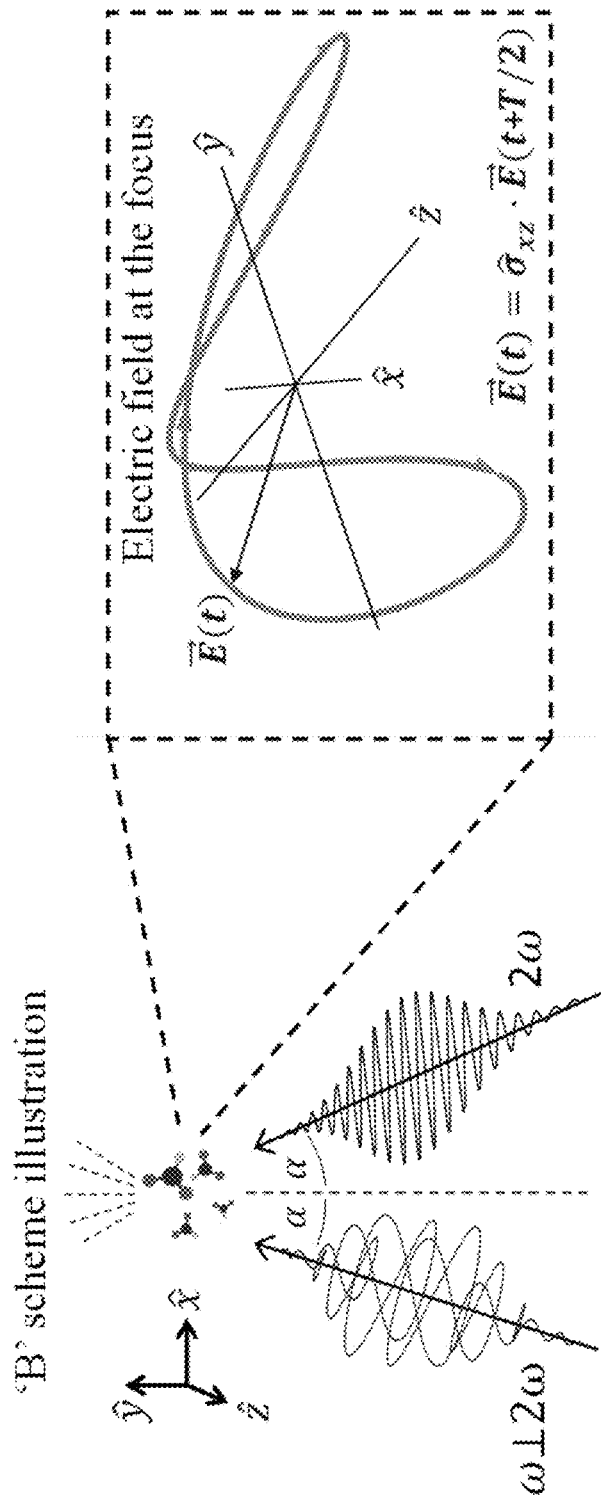
FIGS. 3A-D present the dynamical reflection symmetry breaking based chirality detection in HHG: numerical model potential results: illustration of scheme (B) with the pump field in eq. (11) (FIG. 3A), inset shows the 3D Lissajou plot of the microscopic electric field vector in the focus, which exhibits a dynamical reflection symmetry (arrows along the Lissajou represent the direction of time; x-polarized high harmonics emitted from the chiral/achiral ensembles ($\psi_6$ in model potential), for fundamental wavelength $\Lambda$=900 nm, $I_{max}$=4.2×10$^{13}$ [W/cm$^2$], $\phi$=$\pi$/9, $\Delta_1$=1.1, $\Delta_2$=0.97, 15°, and a trapezoidal envelope with 4 cycle turn-on/off and 4 cycle flat-top (FIG. 3B); calculated harmonic ellipticities in the xy plane from (R) and (S) ensembles—the helicity changes sign with the medium's handedness (FIG. 3C); and integrated power of the y-polarized odd harmonics 9-19 vs. the ee in log scale (FIG. 3D)

Considering symmetry breaking of the dynamical reflection symmetry in eq. (5). In order to engineer a laser field that exhibits $\hat{Z}$ symmetry and upholds the desired requirements the inventors consider the following bi-chromatic non-collinear ω-2ω geometry:

$$\vec{E}_B(t; \vec{r}) = A(t) \cdot E_0 \left( e^{i(\omega t - 2\vec{k}_1 \cdot \vec{r} + \phi)} \hat{y} + \Delta_1 \cdot e^{i(2\omega t - 2\vec{k}_1 \cdot \vec{r})} \hat{e}_1 - i\Delta_2 e^{i(2\omega t - 2\vec{k}_2 \cdot \vec{r})} \hat{e}_2 \right) \quad (11)$$

where $\Delta_{1,2}$ are relative amplitude ratios between the beams, and other symbols are as previously defined. $\vec{E}_B(t; \vec{r})$ is comprised of a 2ω beam linearly polarized in the xz plane and propagating with a wave vector $\vec{k}_2$, and a bi-chromatic cross-linearly polarized ω-2ω beam propagating with a wave vector $\vec{k}_1$ (see FIG. 3(a) for illustration). The superposition of these non-collinear bi-chromatic beams is invariant in the DA under $\hat{Z}$ DS, independently of the phase relation ϕ and amplitude ratios $\Delta_{1,2}$, even though the microscopic field is a 3D vector field (see inset in FIG. 3A). This results from the fact that the ω-wave is polarized along the y-axis, and is always transverse to the 2ω waves that form a general elliptical polarization in the xz plane.

Figure 3B:
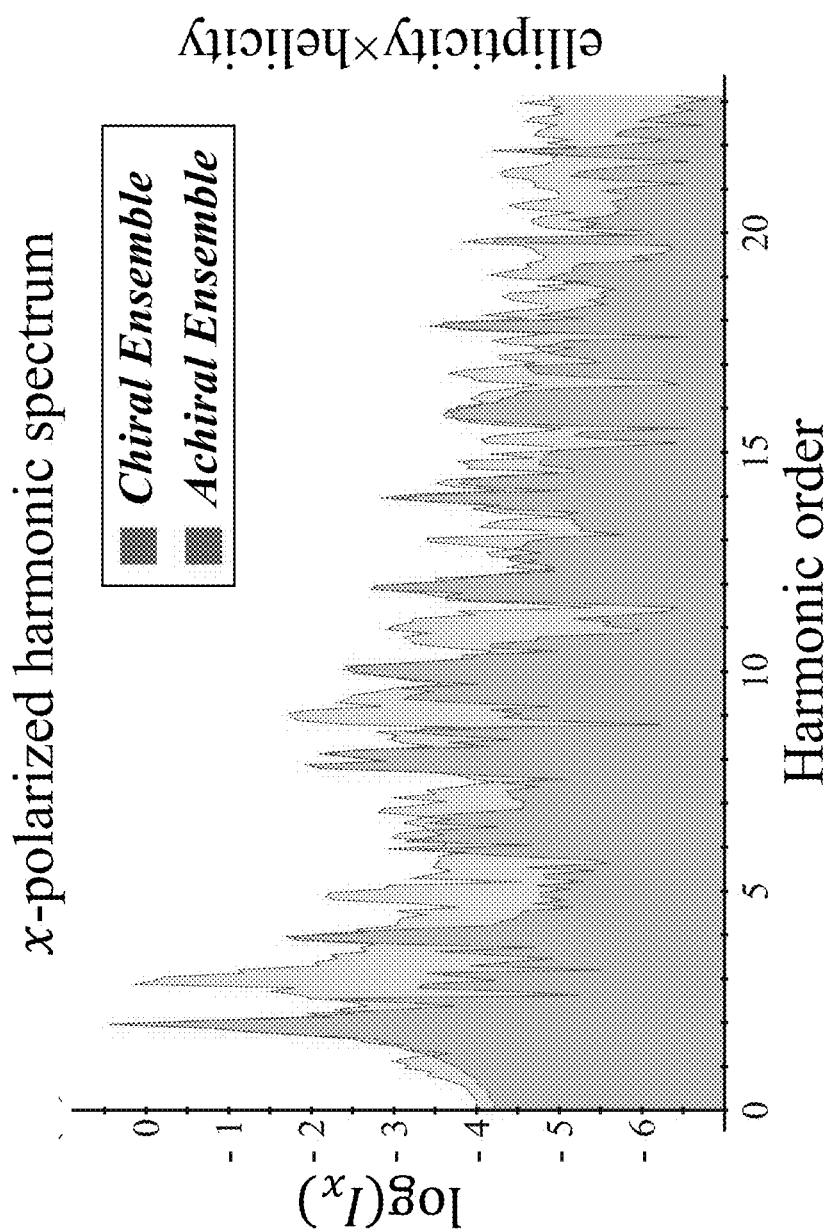
Figure 3C:
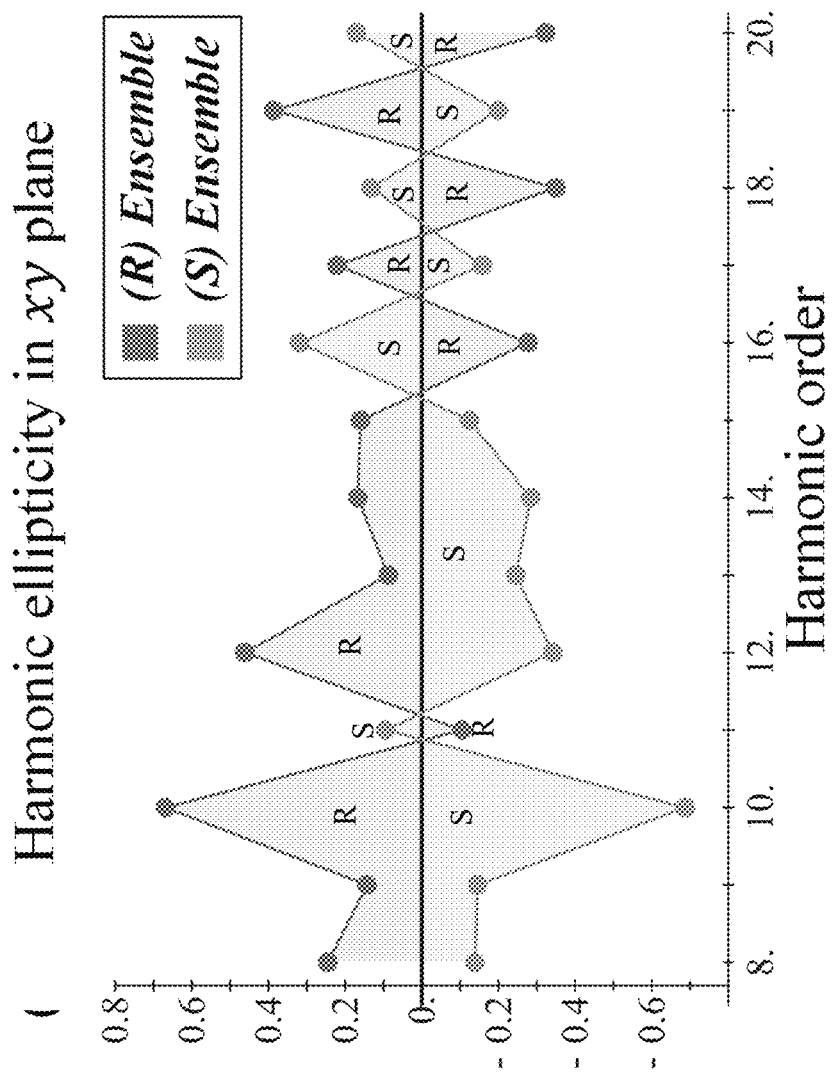
Figure 3D:
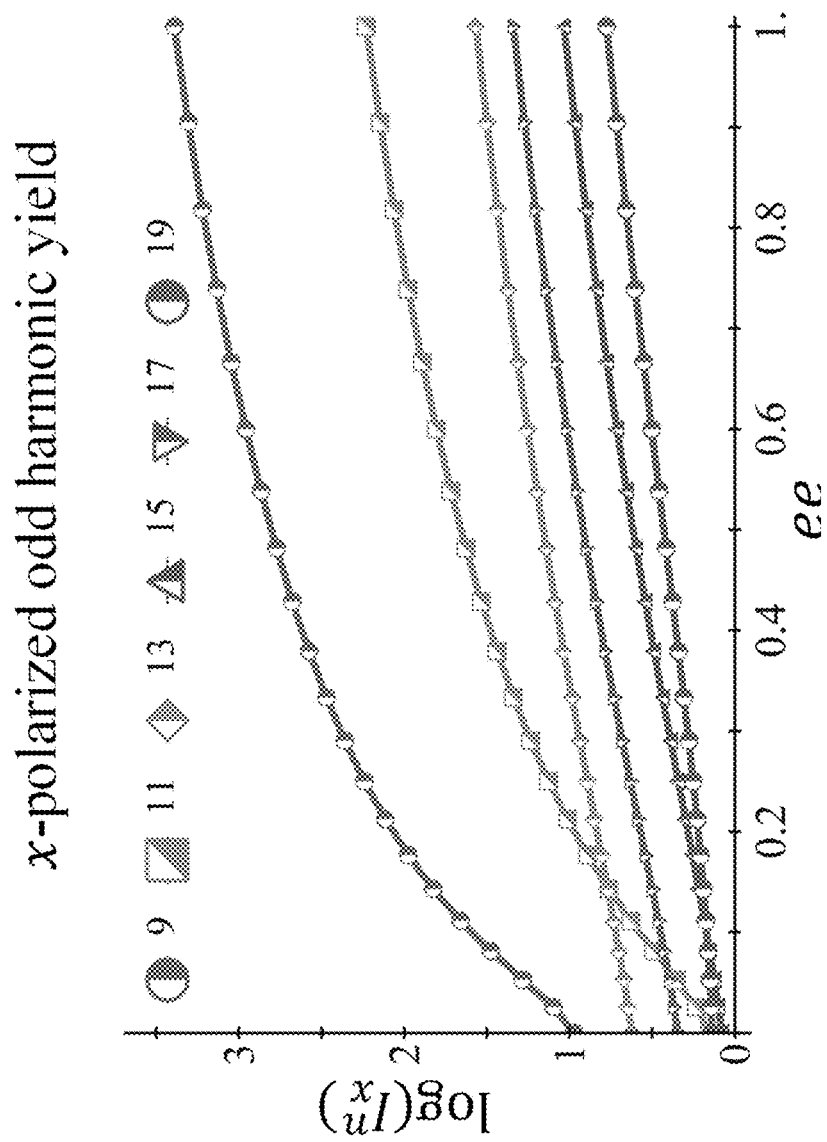

FIG. 3B presents the intensity of the emitted harmonics polarized along the x-axis from the model potential chiral and achiral ensembles. As seen, x-polarized odd harmonics do not survive orientation averaging in the achiral ensemble due to the selection rules imposed by $\hat{Z}$ DS. However, they do survive orientation averaging in the chiral ensemble. The mechanism for this effect is identical to that in the static symmetry breaking case described in FIG. 2, though here the signal to noise ratio is lower since $\hat{Z}$ DS is also somewhat broken by the finite duration of the pulse and by ionization in the medium (i.e., some odd harmonics can also be emitted from the achiral ensemble). Similarly to scheme (A), the mapping between HHG emission from (R) and (S) ensembles leads to a global π phase shift for the chiral signal, while the achiral emission is identical between the (R) and (S) ensembles. Consequently, the ellipticity of the odd harmonics (see FIG. 3C) in the xy plane changes sign with the mediums handedness (because y-polarized odd harmonics constitute an achiral signal). Note that in FIG. 3B, the intensity of the even 'allowed' harmonics does not depend on the chirality, and can be used as a normalization to make the scheme single-shot. FIG. 3D presents the integrated power of x-polarized odd harmonics vs. the ee, for ee∈[0,1], showing that this scheme is highly sensitive over a wide spectral range, with the same parabolic scaling as in scheme (A). The inventors find a disparity of 99% between the chiral and achiral ensembles through the integrated x-polarized odd harmonic power, though magnetic interactions will slightly decrease this signal (by ~5% according to standard cHHG).

It is worthwhile mentioning that $\hat{Z}$ DS also leads to forbidden y-polarized even harmonic emission selection rules. As a result, y-polarized even harmonics also constitute a nearly background-free chiral signal. Their ellipticity also changes sign with the medium's handedness, since the x-polarized even harmonics are achiral, and can be used as a single-shot reference (FIG. 3C that presents the ellipticities of both even an odd harmonics). This scheme therefore favorably leads to chiral signal emission in all polarization axes, unlike scheme (A).

C. Dynamical Inversion Symmetry Breaking

Figure 4A:
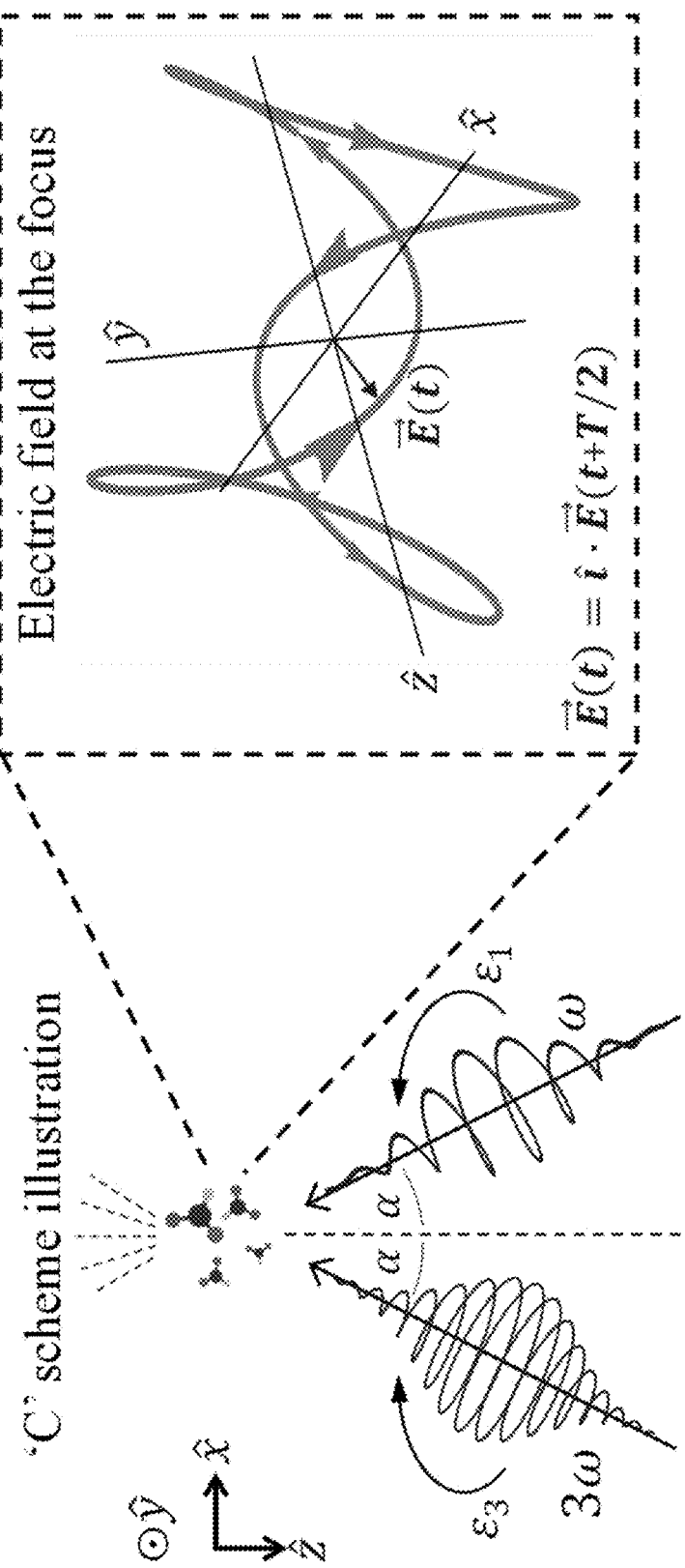
FIGS. 4A-C present the dynamical inversion symmetry breaking based chirality detection in HHG: numerical model potential results; Illustration of scheme (C) with the pump field given in eq. (12), inset shows the 3D Lissajou plot of the microscopic electric field vector in the focus, which exhibits a dynamical inversion symmetry (arrows along the Lissajou represent the direction of time) (FIG. 4A); high harmonics emitted from the chiral/achiral ensembles ($\psi_{15}$ in model potential), fundamental wavelength $\lambda=700$ nm, $I_{max}=10^{13}$ [W/cm$^2$], $\phi=\pi/2$, $\Delta=1$, $\varepsilon_1=0.4$, $\varepsilon_3=0.3$, 20°, and a trapezoidal envelope with 4 cycle turn-on/off and 5 cycle flat-top (FIG. 4B); and chiral/achiral signal from y-polarized even harmonics as a function of $\alpha$ for the same conditions as in (B) (FIG. 4C). Dashed line represents a ~sin(2$\alpha$) trend-line for the harmonic yield, roughly representing the increase of the chiral signal with $\alpha$.

Considering a third method for chiral spectroscopy through dynamical inversion symmetry breaking (eq. (6)) that is driven by the following non-collinear bi-chromatic ω-3ω beam geometry:

$$\vec{E}_C(t; \vec{r}) = A(t) \cdot E_0 \left( e^{i(\omega t - \vec{k}_2 \cdot \vec{r} + \phi)} (\hat{e}_2 - i\varepsilon_1 \hat{y}) + \Delta \cdot e^{i(3\omega t - 3\vec{k}_1 \cdot \vec{r})} (\hat{e}_2 + i\varepsilon_3 \hat{y}) \right) \quad (12)$$

where ε1 is the ellipticity of the ω beam, ε3 is the ellipticity of the 3ω beam, and other symbols are as previously defined (see FIG. 4(a) for illustration). $\vec{E}_C(t; \vec{r})$ is comprised from two elliptical beams propagating in tandem in the xz plane with carrier frequency ratios 1:3, which upholds $\vec{F}$ symmetry for all coordinates along the beam paths, for any ellipticities $\varepsilon_{1,2}$, amplitude ratio Δ, opening angle α, phase ϕ, as well as in the presence of ω components in the 3ω beam.

Figure 4C:
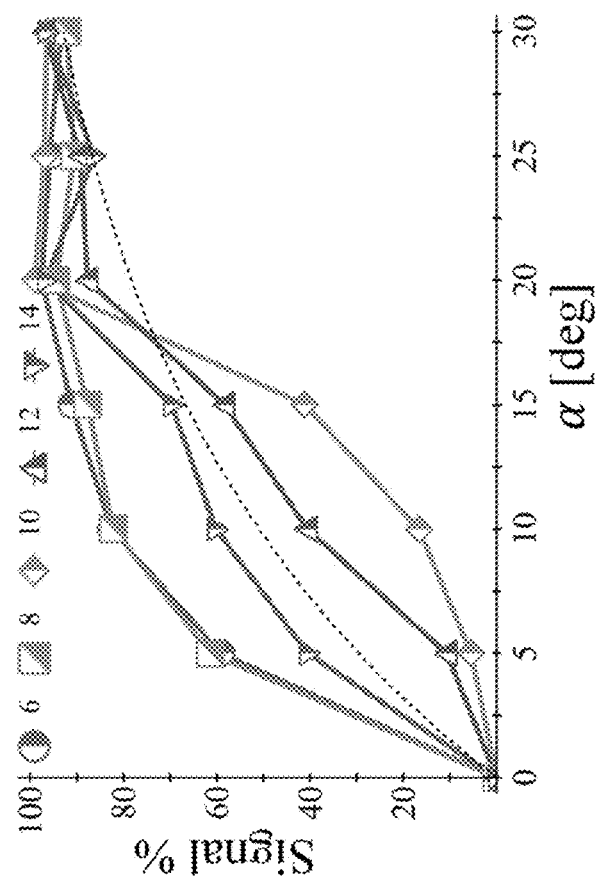
Figure 4B:
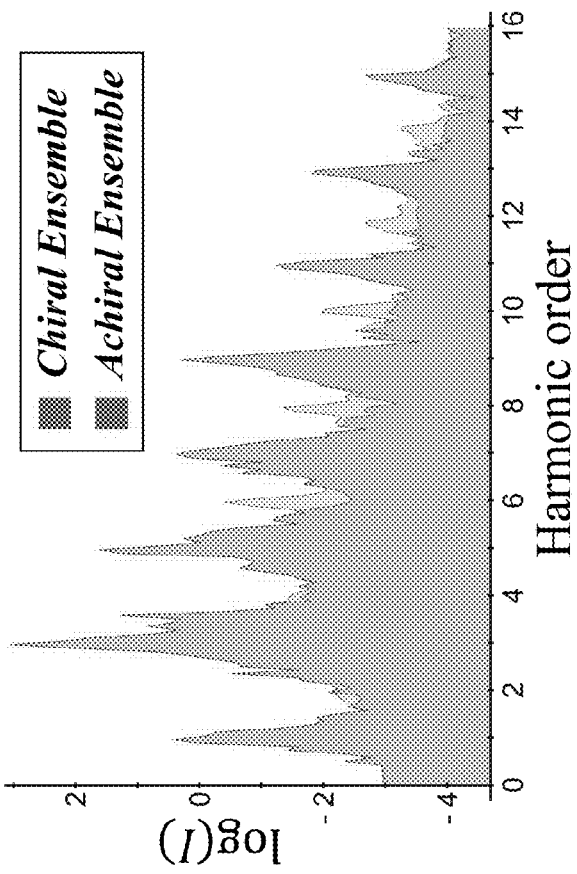

FIG. 4B shows that in the model potential, $\vec{F}$ symmetry is broken by the chiral ensemble and leads to the generation of even harmonics, while this symmetry is upheld in the achiral ensemble where even harmonics are forbidden. A disparity of 96% is obtained in the even harmonic intensities, while odd harmonics provide an achiral reference signal. Similarly to schemes (A) and (B), the chiral even harmonic emission is globally phase shifted by π when the medium's handedness is switched. However, in this case there is no achiral emission of even harmonic frequencies, therefore this phase is difficult to measure, as it is not directly reflected in the harmonic ellipticities. Still, scheme (C) has some advantage, because here the chiral signal is nearly background-free regardless of its polarization components. Notably, there are 7 independent degrees of freedom in the bi-chromatic beam $\vec{E}_C(t, \vec{r})$, including ellipticities, opening angles, etc., which give one a large freedom for optimizing the signal to noise ratio. Due to limited computational time the inventors cannot fully optimize these parameters (each calculation for a single orientation takes ~24 hrs on a Tesla K80 GPU, and many calculations need to be performed to orientation average both ensembles). Thus, the inventors focus on the most important DOF.

FIG. 4D presents TDSE calculations of the chiral/achiral signal of several harmonic orders as a function of the opening angle, α. For α→0, the signal diminishes, which is expected because for =0 the microscopic field is invariant under a 180° rotational DS that forbids even harmonic generation, and is not broken by chiral media; hence, the signal diminishes as this DS is approached. The non-collinear scheme is thus necessary to break this rotational DS. The chiral/achiral signal ratio shows an overall increase trend with the longitudinal pump field amplitude, which depends linearly on sin(α). This behavior is complex and different for different harmonic orders, as shown in FIG. 4(d). The trend also applies to scheme (A) and (B)—a non-collinear beam geometry is essential for chiral signal propagation. Similarly, the inventors expect the chiral signal to decrease when any other parameter choices lead to a 180° rotational DS in eq. (12), such as Δ→0. Another prominent principle for choosing the values of the free parameters is maximizing the harmonic yield.

Figure 5A:
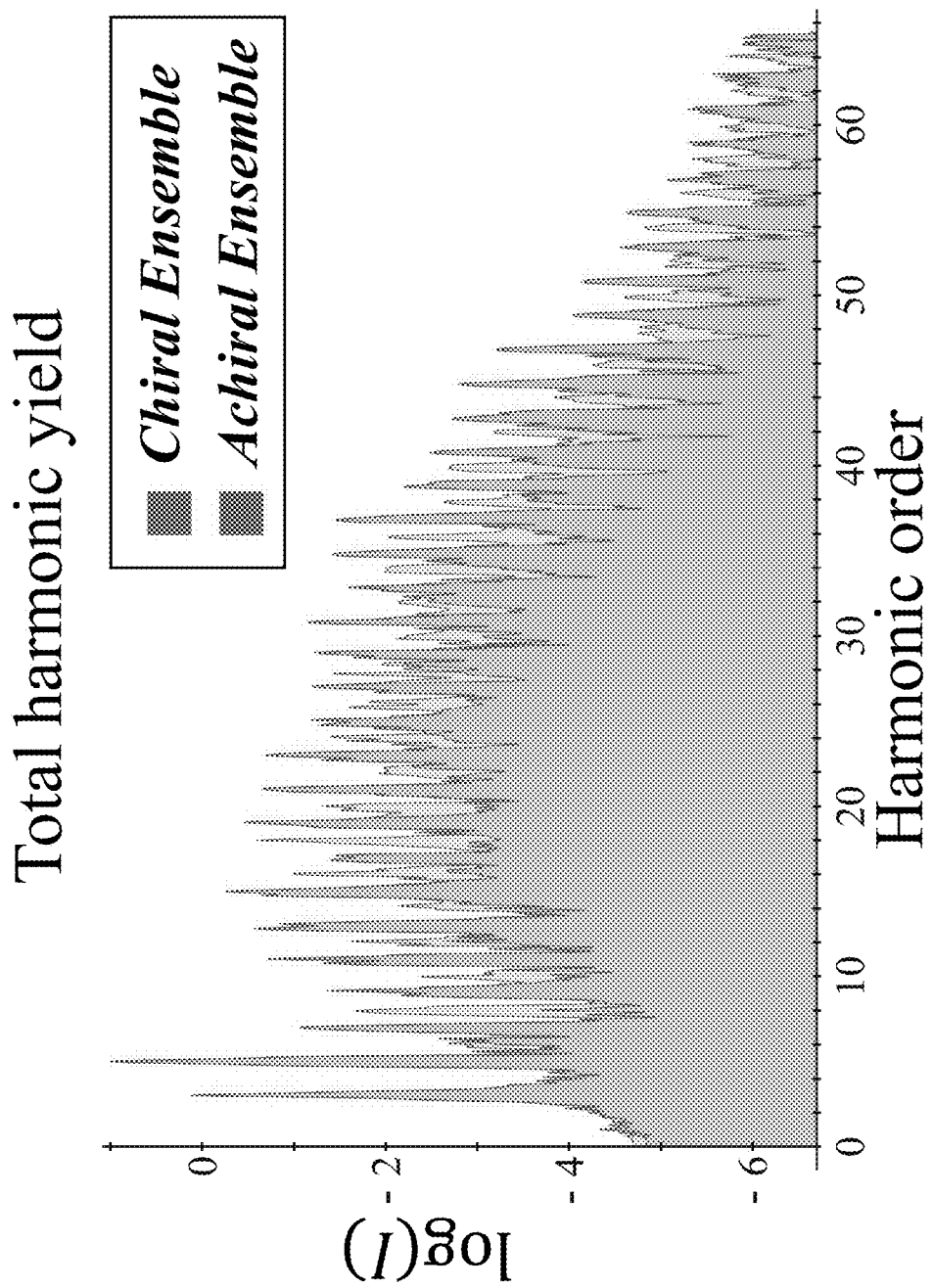
FIGS. 5A-E present the dynamical inversion symmetry breaking based chirality detection in HHG from DFT-based calculations for CBrClFH (FIGS. 5A-C) and a molecular strong-field model for $C_3H_6O$ (FIGS. 5D-Ee): total orientation averaged high harmonic signal from the chiral/achiral ensembles of CBrClFH from a DFT based model for fundamental wavelength $\lambda=3300$ nm, frequency ratios $3\omega$-$5\omega$ in the pump field, $I_{max}=1.2\times10^{13}$ [W/cm$^2$], $\phi=\pi/2$, $\Delta=1$, $\varepsilon_1=0.4$, $\varepsilon_3=0.3$, 20°, and a trapezoidal envelope with 4 cycle turn-on/off and 3 cycle flat-top (FIG. 5A); Same as FIG. 5A but for y-polarized emitted harmonic signal (FIG. 5B); chiral/achiral signal per harmonic order defined through the harmonic integrated y-polarized signal, reaching as high as 99% (FIG. 5C)
Figure 5B:
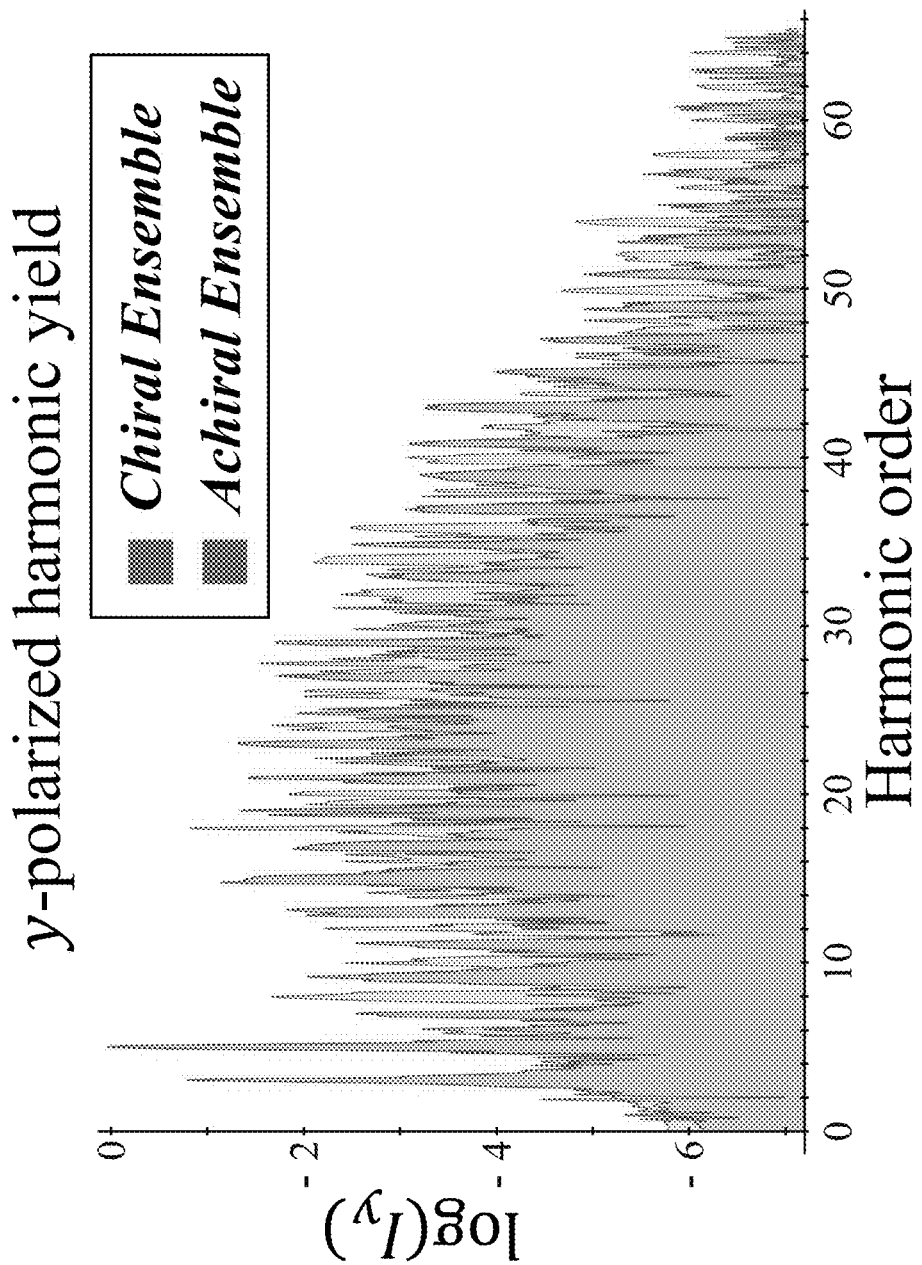

For scheme (C) the inventors also present density functional theory (DFT) based model calculations for the chiral molecule bromochlorofluoromethane (CBrClFH), and molecular strong-field model calculations for the chiral molecule propylene oxide ($C_3H_6O$). Generally, the chiral/achiral signal may differ in different systems due to dependence on various parameters, including the molecular structure, ionization potential, and other chemical and physical properties. It is therefore useful to perform quantitative calculations on real systems other than the examined model potential. For this purpose, the inventors employed a DFT based model for CBrClFH using the real-space grid based octopus code. Scheme (C) was realized using $3\omega$-$5\omega$ frequency ratios in the pump field where $\omega$ corresponds to 3300 nm light ($\vec{F}$ symmetry may also be obtained by any pair of beams with frequency ratios $\omega_1:\omega_2$ that in reduced fractional form are odd integers, where for 1:1 ratio from monochromatic beams scheme (C) reduces to (A)). Results are presented in FIGS. 5A-C, and confirm the model potential calculations—the disparity between chiral/achiral ensembles reaches as high as 99%, and the odd harmonic signal remains achiral, corroborating the generality of our approach. Moreover, a molecular strong-field model was employed in $C_3H_6O$ as is presented in FIGS. 5D, E, which supports previous analytical and numerical results (though here the signal reaches exactly 100% because the strong field model is perfectly time-periodic).

It is worth noting that the chiral/achiral signal obtained from CBrClFH is larger than the one obtained from the model potential under a similar setting (the mean intensity ratio between chiral even harmonic to their reference achiral neighboring odd harmonics is larger by a factor of 3 in CBrClFH than in the model potential). This naturally reflects the degree of chirality of these two systems, where the model potential exhibits a relatively low chirality compared to that of a real molecule with chiral valence orbitals.

To summarize, the inventors proposed and numerically demonstrated a novel system-independent approach for cHHG that is based on dynamical symmetry breaking spectroscopy (and not on the detailed mechanism of the HHG process). Our approach relies solely on intense electric-dipole transitions, and not on the interplay of both magnetic and electric dipoles as all other cHHG schemes, making it strong and highly robust. The inventors explored different feasible realizations for the scheme by systematically engineering pump fields with various dynamical symmetry properties that are broken in chiral media. This approach is general, and can be applied via an infinite set of geometries (i.e. our suggested schemes (A), (B) and (C) are representative and may also be implemented by other geometries). Remarkably, the technique results in extremely high chiral/achiral sensitivity of up to 99%, which outperforms by far the ability of previous cHHG techniques to discern chiral media. It also allows direct access to the medium's handedness by measuring the harmonic's helicities, which change sign when the medium's handedness is switched. Notably, here the inventors predicted and analyzed cHHG based on electric dipole interactions microscopically. In our future paper, the inventors will show that cHHG based on electric dipole interactions can: (a) provide very large chiral sensitivity, both in the microscopic response and also in the macroscopic emission when propagation effects are considered, and (b), also allow for intensity-based enantio-selectivity.

At first glance, the conditions at which chiral sensitivity can be observed within the electric-dipole approximation may seem arbitrary. For instance, schemes (B) and (C) only differ by beam frequency ratios, but one allows (R)/(S) chiral sensitivity while the other only allows chiral/achiral sensitivity. Nonetheless, these seemingly minute differences are a manifestation of the underlying dynamical symmetry group of the pump beam, and which symmetry elements are included or excluded from it.

Model Chiral Potential—Numerical Details:

A chiral superatom was described by the following model chiral core potential:

$$V(\vec{r}) = -\frac{z_1}{\sqrt{(\vec{r}-\vec{r}_1)^2+a}} - \frac{z_2}{\sqrt{(\vec{r}-\vec{r}_2)^2+a}} - \frac{z_3}{\sqrt{(\vec{r}-\vec{r}_3)^2+a}} - \frac{z_4}{\sqrt{(\vec{r}-\vec{r}_4)^2+a}} \tag{13}$$

where $z_{1,2,3,4}$=1.5, 1.25, 1, 0.75, respectively, $\vec{r}_1$=0, $\vec{r}_2$=$-\hat{x}$, $\vec{r}_3$=$\hat{y}$, $\vec{r}_4$=$\hat{z}$ bohr, and $\alpha$=0.05 a.u. The iso-surface plot for this potential is presented in Figures A. The enantiomeric atom is found by reflecting along the yz plane (i.e., $\vec{r}^*_2$=$\hat{x}$). The eigenstates for this potential are found by complex time propagation of the TDSE (as detailed in A.2) and a Gram-Schmidt algorithm, implemented to a self-consistency convergence $<10^{-8}$ hartree, and $<10^{-5}$ in the maximal wave function difference. The initial states chosen in calculations are the $6^{th}$, $14^{th}$, and $15^{th}$ excited states. Their ionization potentials are: Ip=1.112, 0.776, 0.633 hartree, respectively, which were converged in the grid parameters $<10^{-3}$ hartree. The iso-surface plots for these orbitals are presented in Figures (b, c, d), and clearly show a chiral nature (the lack of any reflection or inversion symmetries). Notably, the main text presents numerical results for this model chiral potential even though its orbitals are not highly chiral (see Figures—the orbitals do not exhibit exact reflection or inversion symmetries, but are not far from it). In a realistic molecular system with valence orbitals that are localized on the chiral center, the signal is even higher. This prediction is supported by numerical calculations from different initial orbitals that show that orbitals with larger chirality lead to larger disparity, as well as in comparison to the much more chiral case of CBrClFH. This example highlights the importance of the chirality of the initial state, and not just that of the chiral molecular potential.

DFT-Based Model for Bromochlorofluoromethane:

The DFT-based model for a chiral molecule was constructed using real space grid based ground state density functional theory (DFT) calculations performed with the octopus code. Calculations were performed using the Perdew-Burke-Ernzerhof (PBE) exchange-correlation functional of the generalized gradient approximation (GGA), which was previously shown useful for describing the optical properties in CBrClFH. The frozen core approximation was assumed, and inner core orbitals were treated using norm-conserving pseudopotentials, where a total of 26 valence electrons are used in the neutral molecule. Specifically, the $[Ar]3d^{10}$, [Ne], [He], and [He] shells of Br, Cl, F, and C atoms were described with pseudopotentials, respectively. The Kohn-Sham (KS) equations were solved to self-consistency with a tolerance $<10^{-9}$ hartree, and the grid spacing was converged to $\Delta x$=0.4 bohr, such that the total energy per electron was converged <$10^{-4}$ hartree, and the KS highest occupied molecular orbital (HOMO) eigenvalue is converged <$10^{-4}$ hartree.

Figure 7B:
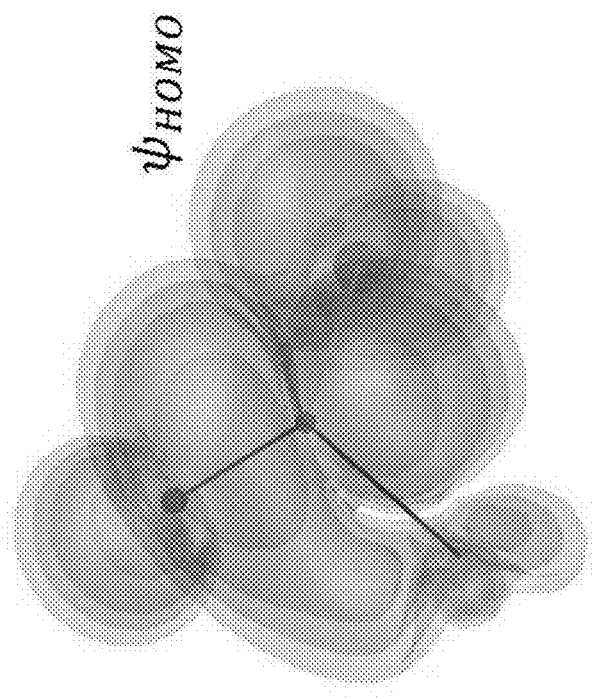
FIGS. 7A-B present the effective KS potential for the molecular ion (FIG. 7A), and the HOMO orbital for the effective KS potential used in calculations (FIG. 7B). Blue, purple, yellow, red and green spheres stand for C, F, Cl, Br, and H atoms, respectively. Iso-surfaces for the potential are: s=0.05,0.1,0.25,0.75$|\psi|_{max}^2$.
Figure 7A:
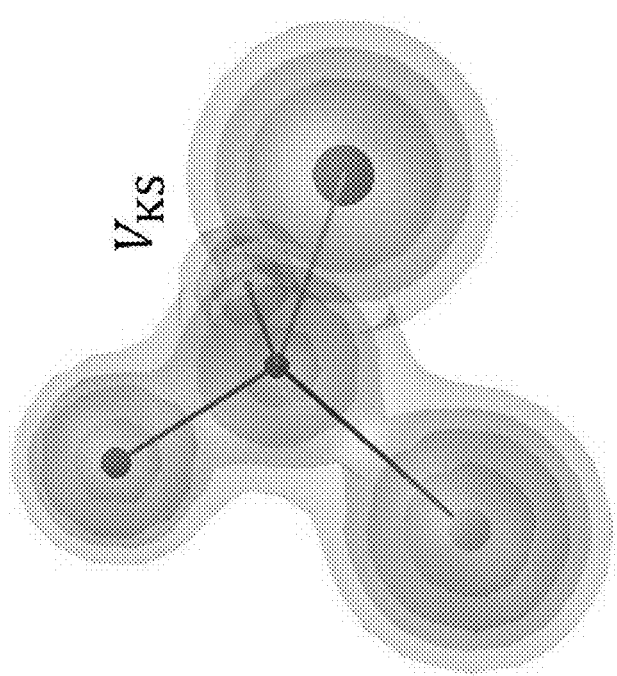
Figure 8A:
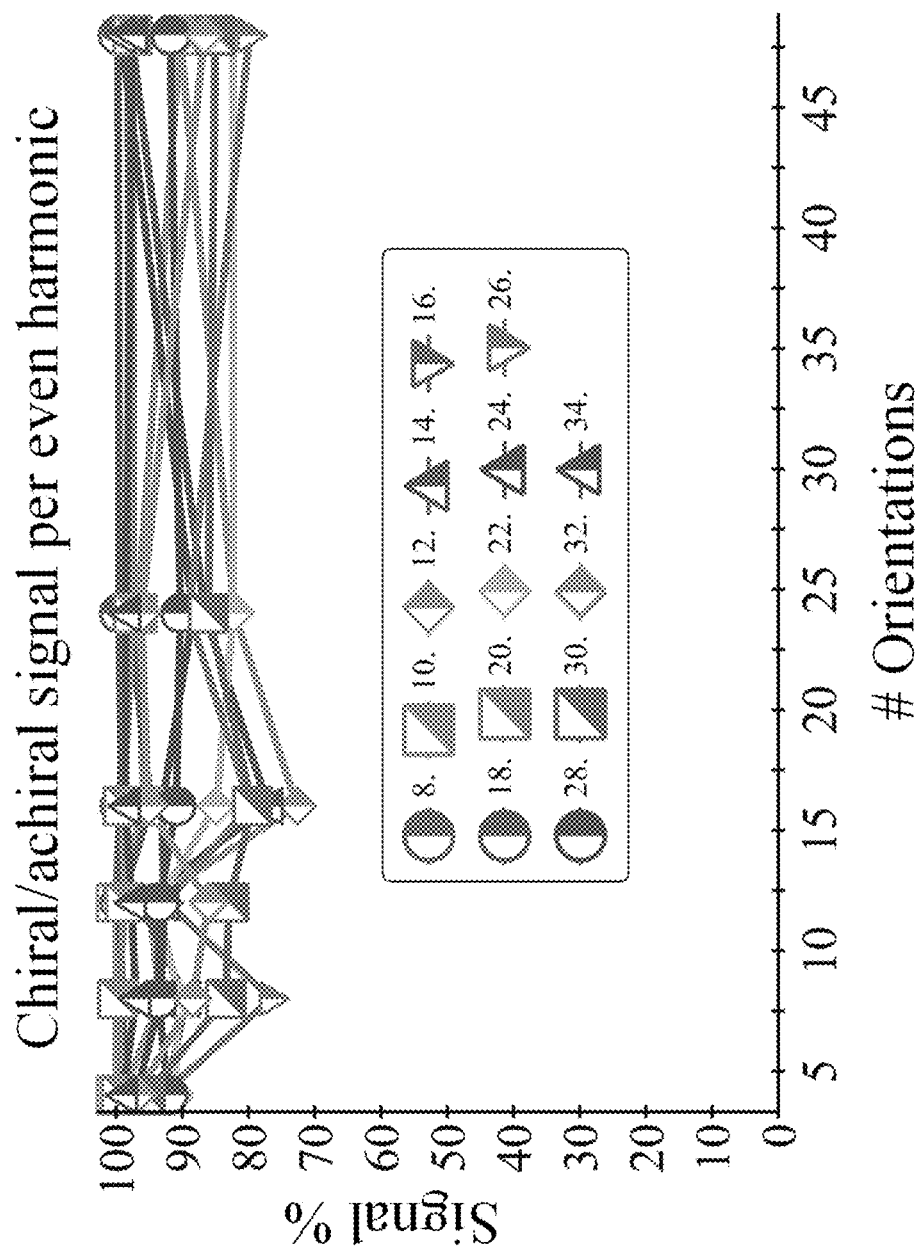
FIGS. 8A-C present the convergence with respect to angular grid density in scheme (C) for the DFT-based model, with the same parameters as FIG. 5 in main text.
Figure 8B:
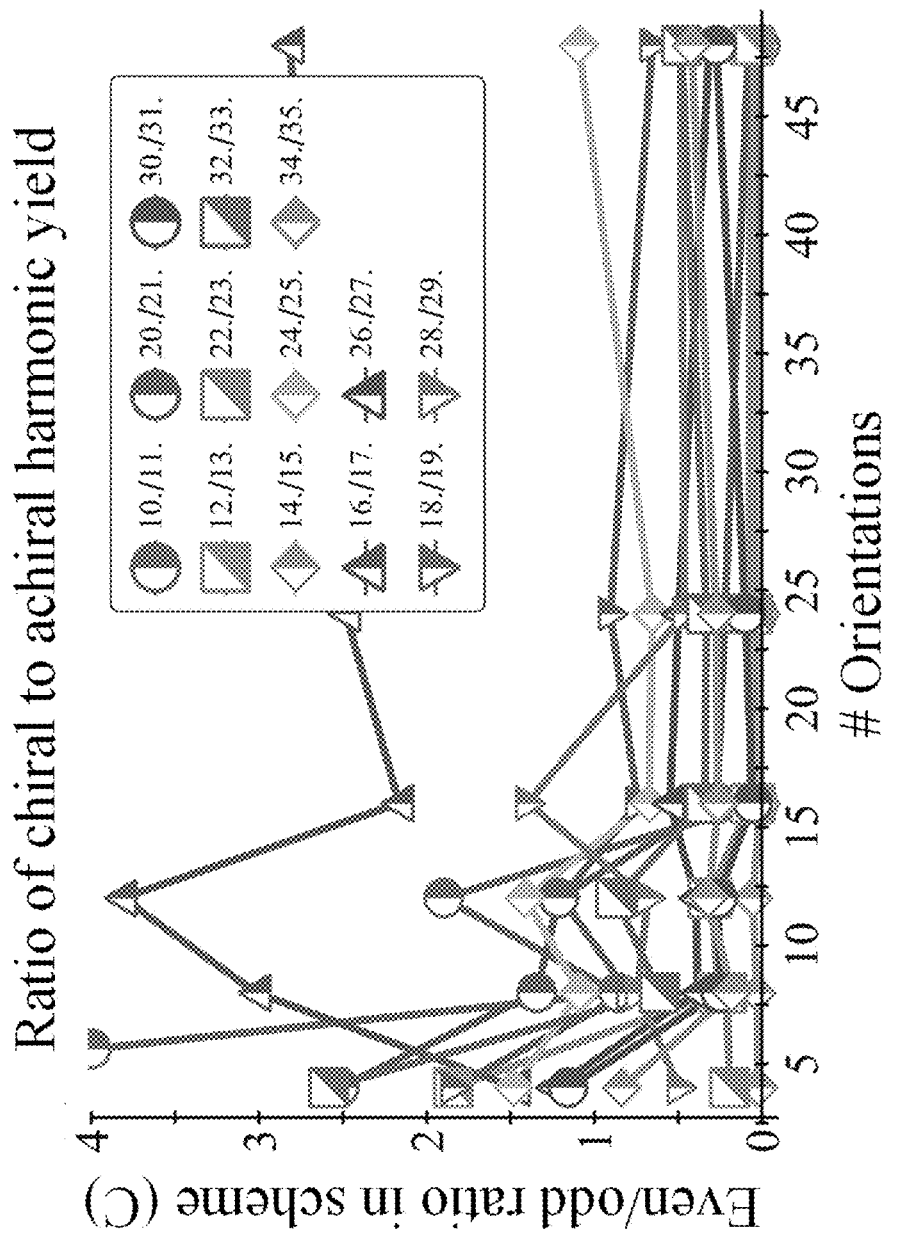
Figure 8C:
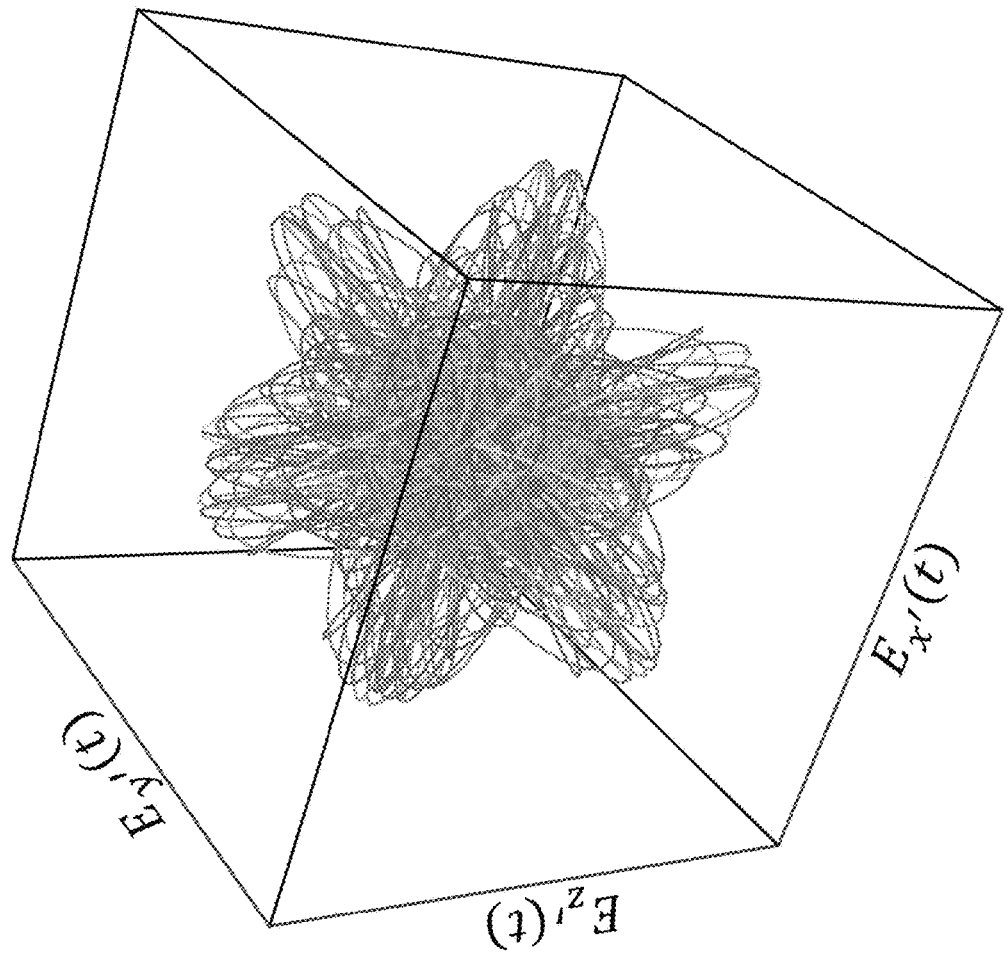
Figure 9A:
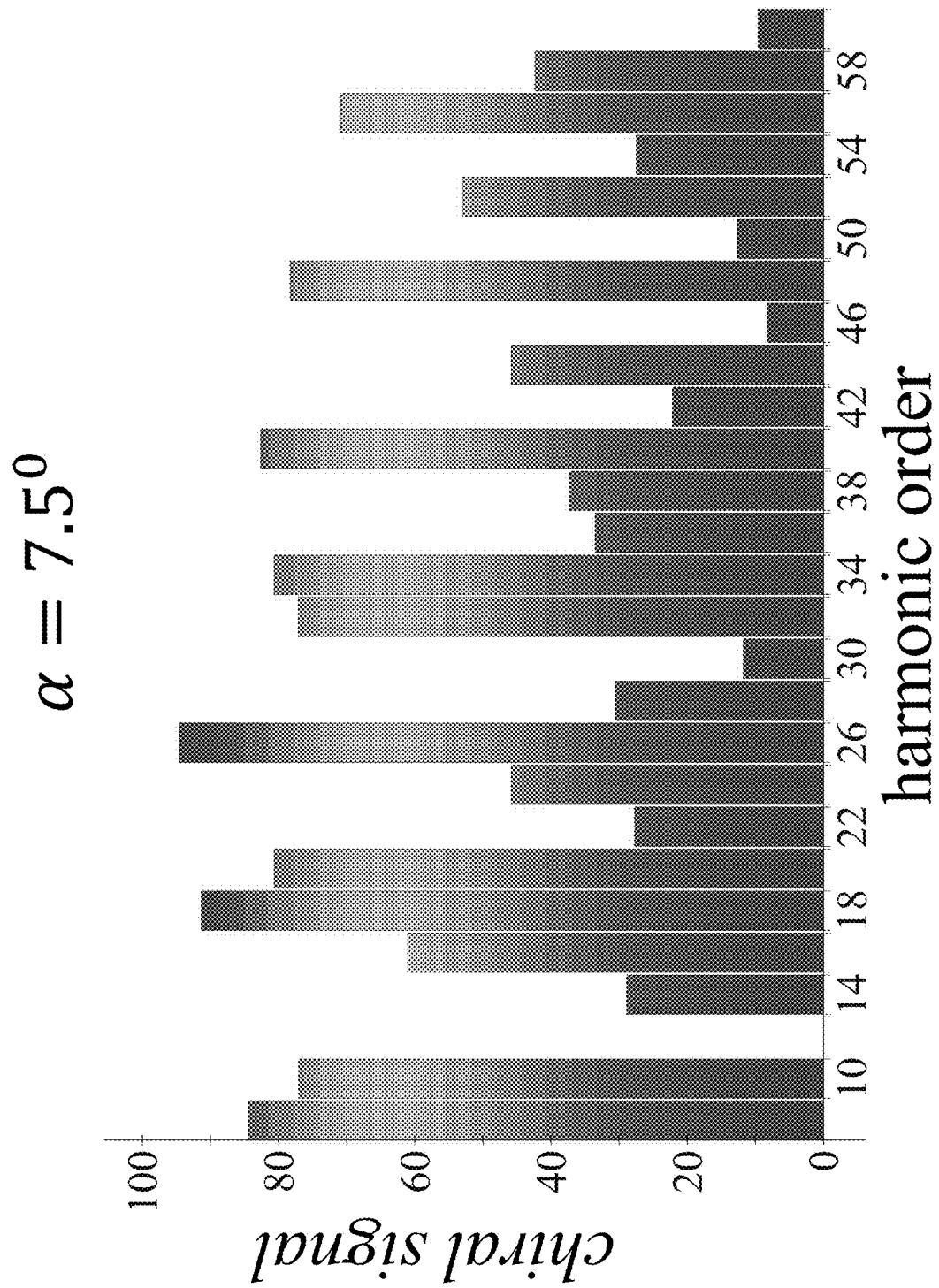
FIGS. 9A-C present the dynamical inversion symmetry breaking based chiral selectivity in HHG from DFT-based model calculations for CBrClFH. Chiral signal per harmonic order defined through the harmonic integrated y-polarized yield for fundamental wavelength $\lambda=3300$ nm, frequency ratios $3\omega$-$5\omega$ in the pump field, $L_{max}1.2\times10^{13}$ W/cm$^2$, $\phi=\pi/2$, $\Delta=1$, $\varepsilon_1=1$, $\varepsilon_2=1$, for $\Delta=7.5°$, 13.75°, 20°, and a trapezoidal envelope with 4 cycle turn-on/off and 3 cycle flat-top.
Figure 9B:
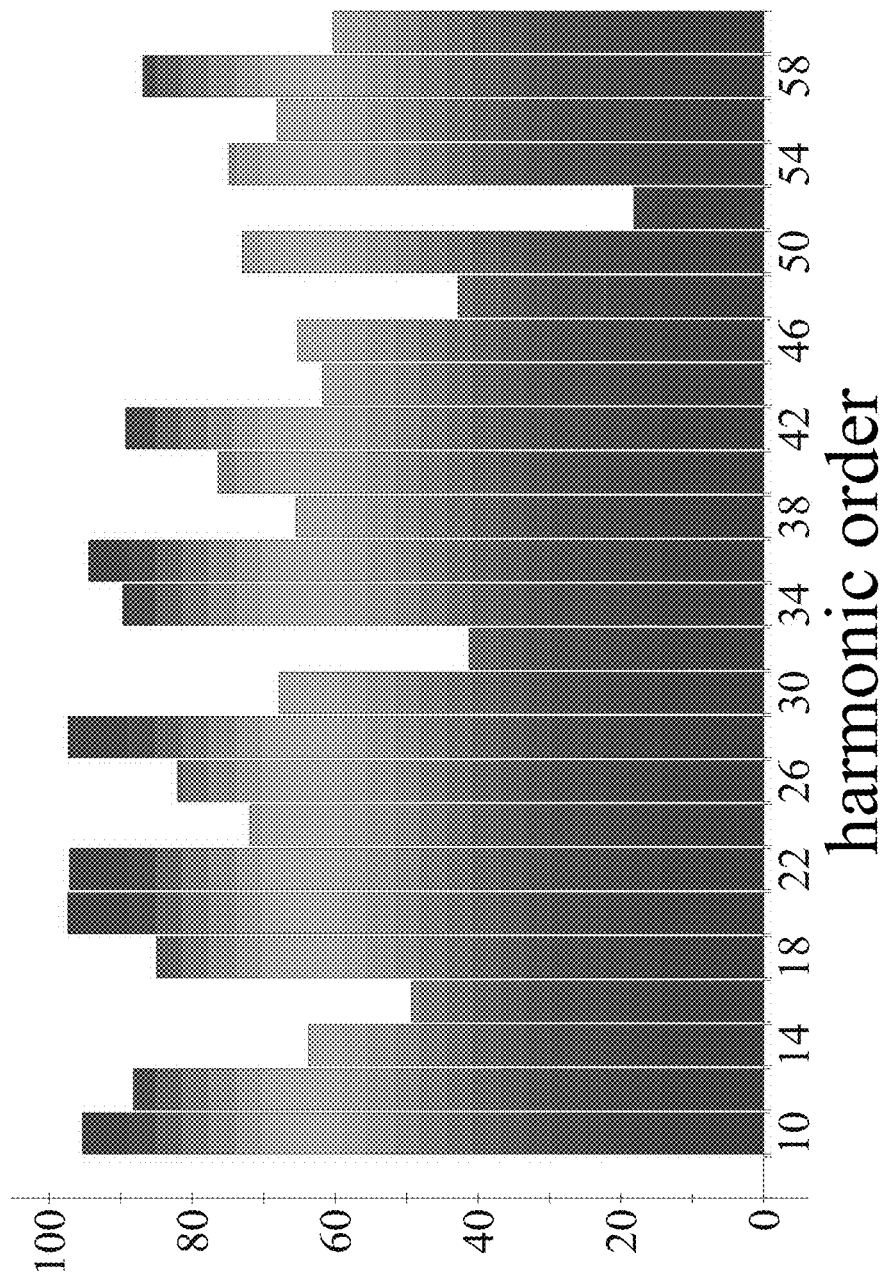
Figure 9C:
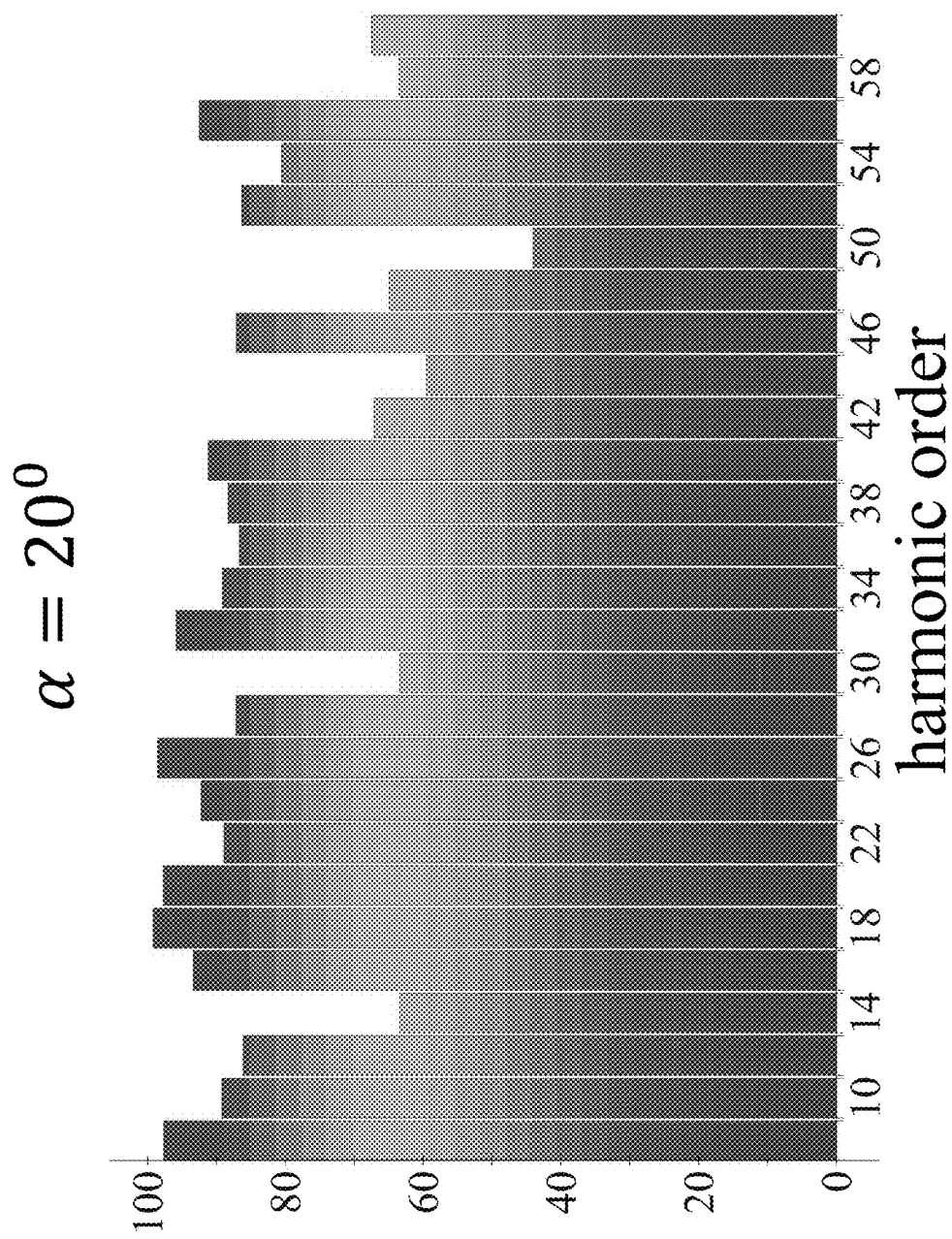

Firstly, the molecular structure of CBrClFH was relaxed <$10^{-4}$ hartree/bohr in forces within unpolarized DFT calculations (i.e., neglecting the spin degree of freedom). Secondly, in this relaxed geometry, spin-polarized DFT calculations were performed on the singly ionized system (the molecular ion). From these calculations the KS potential was extracted, which includes contributions from both the external molecular potential and mean-field electron-electron effects. This effective potential has the correct coulomb tail to describe the single HOMO electron, and is completely free of self-interaction for the HOMO orbital. Thirdly, this effective KS potential was diagonalized similarly to the chiral model potential in A.1, and the TDSE for the HOMO electron was solved as specified section A.3. The second enantiomer is found by reflecting the potential and HOMO orbital along the yz-plane. FIG. 7 describes the effective KS potential and HOMO.

TDSE—Numerical Details:

The TDSE defined by the Hamiltonian in eq. (1) in the main text was solved numerically on a 3D real space $L^3$ grid for L=100 bohr for the model potential, and L=120 bohr for the DFT-based model. The grid spacing was chosen equidistant with $\Delta x=\Delta y=\Delta z=0.2604$, and 0.4 bohr for the model potential, and DFT-based model, respectively. The numerical integration was performed using the $3^{rd}$ order split step method, with a time step of $\Delta t=0.02$ a.u. if $\lambda=900$ nm, 1500 nm, 3300 nm and $\Delta t=0.015$ a.u. if $\lambda=700$ nm. An imaginary absorbing potential was used to prevent reflection from the boundaries of the form:

$$V_{ab}(\vec{r}) = -i\eta(|\vec{r}| - r_0)^\gamma \Theta(|\vec{r}| - r_0) \quad (14)$$

where for the model potential: $\eta=1.5\times10^{-3}$, $r_0=36$ bohr, and $\gamma=4.3$ for $\psi_{15}$ and $\eta=10^{-3}$, $r_0=33$ bohr, and $\gamma=4$ for $\psi_6$, and for the DFT-based model: $\eta=10^{-3}$, $r_0=39$ bohr, and $\gamma=3.2$. The induced polarization was calculated according to eq. (2) In the main text on a twice reduced time grid (i.e. every other time step), and the dipole acceleration was calculated directly using a $5^{th}$ order finite difference approximation for the second order time-derivative:

$$\vec{a}(t) = \frac{d^2}{dt^2}\vec{P}_{tot}(t) \quad (15)$$

Orientation Averaging—Numerical Details

Orientation averaging for the models described in sections A.1 and A.2 was achieved by repeatedly solving the TDSE for varying beam propagation orientations, and realigning the calculated induced polarization along the correct axis with rotation matrices. This was done for 24 major alignments along the three Cartesian axes, which were pre-chosen such that for each orientation $\Omega$ in the ensemble, the inverted and reflected orientations $\Omega^*$ also exist, and verified against a 48-orientation ensemble that upheld similar constraints.

Two independent variables are required in order to define the orientation of a rigid body in 3D. The inventors used a normalized vector $\vec{v}$, that defines the z-axis in the frame of the propagating beams in terms of the Cartesian coordinates x', y', z' in the molecular frame of reference (which corresponds to the potential form in eq. (13), or the effective KS potential for the DFT-based model), accompanied by an angle $0<\theta\leq 2\pi$ that defines the relative rotation about the $\vec{v}$ axis (such that $\theta=0°$ corresponds to the x-axis in the beam's frame of reference). The orientations are given by all permutations of the angles $\theta=0°$, 90°, 180°, 270°, and $\vec{v}'=\pm\hat{x}'$, $\pm\hat{y}'$, $\pm\hat{z}'$, which all together span 24 rigid body orientations, and the 48-orientation ensemble against which convergence was attained was additionally spanned by the vectors $\vec{v}'(\pm\hat{x}'\pm\hat{y}'\pm\hat{z}')$.

Convergence is tested with respect to the amount of orientations, and is converged up to 3% in chiral signal strength (i.e. the chiral signal per harmonic changes on average by 3% between the 24 and 48 orientation ensembles, see FIG. A3(a)), and up to 15% in ratio of the chiral to nearby achiral harmonic emission, i.e., the relative yields of 2n/2n+1, even/odd, harmonic orders for integer n (see FIG. A3(b)). This relatively rapid converge can be explained as follows:

1. The grid is specifically chosen to hasten convergence of the DS selection rule—the mechanism relies on interference between the inverted molecular orientations, so a clever grid choice reduces the amount of orientations required for convergence.
2. The chiral signal is based on intense electric-dipole transitions. This is very different than standard magnetic effects that lead to small signals, where mild changes to the harmonic yield can drastically change the signal strength. Consider the following example—a reduction in the intensity of a harmonic by 10% (i.e., due to some unaccounted for orientations) only changes the chiral/achiral signal from 96.3% to 95.5%. By contrast, in a magnetic dipole based small signal (standard cHHG), a 5% chiral/achiral signal will change to 0% (no chiral signal) if the intensity is changed by the same mere 10%, because the achiral signal is much larger than the chiral one. This means that such techniques require very dense angular grids to reach convergence compared to our scheme.
3. The pump field spans all 3D coordinate space; thus, even a single orientation excites all three spatial axes in the molecular reference frame (see FIG. A3(c) for illustration of the 48-orientaion ensemble pump field Lissajou curves), meaning less orientations are required to probe full molecular response.

Selection Rules Derivation for the DSs in Schemes (A)-(C)

For self-completeness, the inventors derive the selection rules for the three DSs used in the main text. Firstly, the inventors expand the nonlinear polarization, $\vec{P}_{tot}(t)$ from eq. (3) in the main text to a Fourier series:

$$\vec{P}_{tot}(t) = \sum_n \vec{F}_n \exp(in\omega t) \quad (16)$$

where the coefficients $F_n$ are complex numbers, n is any integer that represents the n'th harmonic, and $\omega$ is the optical frequency. This is justified in the Floquet limit, where the HHG process is time-periodic and only discrete harmonics are emitted. Following the proofs, a DS of the full Hamiltonian is necessarily also a DS of the induced polarization in eq. (16). Using this rule, one can derive the constraints on the emitted frequency components $\vec{F}_n$ by enforcing the invariance of $\vec{P}_{tot}(t)$ under the DSs, which leads to eigenvalue problems in the frequency domain. For $\hat{\sigma}_{xz}$ presented in scheme (A) this means:

$$\sum_n \vec{F}_n \exp(in\omega t) = \sum_n \hat{\sigma}_{xz} \cdot \vec{F}_n \exp(in\omega t) \quad (17)$$

Eq. (17) can be simplified to the following constraint for all harmonic orders:

$$\hat{\sigma}_{xz} \cdot \vec{F}_n = \vec{F}_n \quad (18)$$

Assuming a general form for $\vec{F}_n$:

$$\vec{F}_n = (F_{n,x}, F_{n,y}, F_{n,z}) \quad (19)$$

Eq. (18) leads to the constraint $F_{n,y}=0$. This means that if $\hat{\sigma}_{xz}$ is upheld in the Hamiltonian, no microscopic y-polarized harmonics are emitted.

Similarly, the inventors derive the constraints for $\hat{Z}=\hat{\sigma}_{xz}\cdot\hat{t}_2$ DS used in scheme (B):

$$\sum_n \vec{F}_n \exp(in\omega t) = \quad (20)$$

$$\sum_n \hat{\sigma}_{xz} \cdot \hat{t}_2 \cdot \vec{F}_n \exp(in\omega t) = \sum_n \hat{\sigma}_{xz} \cdot \vec{F}_n \exp(in\omega(t - T/2))$$

Leading to the selection rules where $F_y$ emission is only allowed for odd harmonics, and $F_{x,z}$ emission is only allowed for even harmonics.

Lastly, the constraints for $\hat{F}=\hat{i}\cdot\hat{t}_2$ DS used in scheme (C) are:

$$\sum_n \vec{F}_n \exp(in\omega t) = \sum_n \hat{i} \cdot \hat{t}_2 \cdot \vec{F}_n \exp(in\omega t) = \sum_n -\vec{F}_n \exp(in\omega(t - T/2)) \quad (21)$$

Leading to selection rules where no even harmonic emission is allowed. Because these DSs involve a reflection operation (inversion is a product of reflection and a rotation), they are upheld in achiral media, and break in chiral media, emitting a nearly background-free chiral signal.

Notably, one may also consider time-reversal DSs for chiral spectroscopy. However, these DSs lead to linear polarization restrictions that do not allow background-free detection when broken (because the selection rules do not lead to forbidden emission). Furthermore, time-reversal is also slightly broken due to strong-field ionization, which reduces the signal to noise ratio. Hence, the inventors do not consider these DSs for chiral spectroscopy.

Numerical Calculations for Different α Values and Bi-Circular Beams

Presented herein are calculations for scheme (C) for the DFT-based model of CBrClFH under several parameter setting different than those presented in FIGS. 4 and 5 in the main text. FIG. A4 presents the chiral signal per harmonic order for several opening angles α, but for $\varepsilon_1=\varepsilon_2=1$, i.e., a bi-circular beam (whereas in FIGS. 4 and 5 in the main text results are presented for a bi-elliptical beam). The same qualitative scaling of the chiral signal is observed for $\alpha \to 0$.

Numerical Model for Strong-Field HHG Calculations in Propylene Oxide

The high-order harmonic response of a gas-phase ensemble of randomly oriented propylene oxide molecules was evaluated for a single ionization-recombination channel. The harmonic intensity is given by [34]:

$$I_n = (n\omega)^4 |\vec{D}(n\omega)|^2 \quad (22)$$

where ω is the fundamental frequency, n is the harmonic number, and $\vec{D}$ is the frequency-domain dipole induced by the strong field, which results from adding coherently the contributions from all possible molecular orientations:

$$\vec{D}(n\omega) = \int d\Omega \int d\alpha \vec{D}_{\Omega\beta}(n\omega) \quad (23)$$

where $\vec{D}_{\Omega\beta}$ is the harmonic dipole associated with a given molecular orientation (denoted by two solid angles, Ω and β). The integration over the solid angle Ω was calculated using the Lebedev quadrature of order 17, i.e. employing 110 Lebedev points. For each Lebedev point, the integration over β was performed within the trapezoid method, using 40 different geometries. The single-molecule dipole response $\vec{D}_{\Omega\beta}$ associated with a given orientation was evaluated using the saddle-point method for HHG. Within this method $\vec{D}_{\Omega\beta}$ is factorized to three terms:

$$\vec{D}_{\Omega\beta}(n\omega) = a_{\Omega\beta}^{ion}(n\omega) \cdot a_{\Omega\beta}^{prop}(n\omega) \cdot \vec{d}_{\Omega\beta}^{rec}(n\omega) \quad (24)$$

which are associated with strong-field ionization, propagation and radiative recombination, respectively. Strong-field ionization amplitudes were evaluated using the following expression:

$$a_{\Omega\beta}^{ion} = \left(\frac{2\pi}{i\partial^2 S(t_r, t_i, \vec{p})/\partial t_i^2}\right)^{1/2} \cdot \exp(-iS(t_i', t_i, \vec{p})) \cdot \vec{E}(t_i') \cdot \vec{d}_{\Omega\alpha}^{ion}(t_i') \quad (25)$$

where $t_i=t_i'+it_i''$ is the complex ionization time, $\vec{p}$ is the canonical momentum (related to the kinetic momentum, $\vec{k}(t)=\vec{p}+\vec{A}(t))$, $\vec{A}(t)$ is the vector potential (related to the time-dependent electric field $\vec{E}(t)=-\partial_t\vec{A}(t)$), $\vec{d}_{\Omega\alpha}^{ion}(t_i')$ is the dipole-transition amplitude from the initial state to the Volkov state with kinetic momentum $\text{Re}\{\vec{k}(t_i')\}$, and $$S(t, t', \vec{p}) = \frac{1}{2}\int_{t'}^{t}(\vec{p}+\vec{A}(\tau))^2 d\tau + I_p(t-t') \quad (26)$$

where $I_p$ is the ionization potential. For the single-channel response considered here, propagation amplitudes can be written as:

$$a_{\Omega\beta}^{prop} = \left(\frac{2\pi}{i(t_r - t_i)}\right)^{3/2} \exp\left(-iS(t_r', t_i', \vec{p})\right) \qquad (27)$$

where $t_r = t'_r + it_r''$ is the complex recombination time. Recombination amplitudes are given by:

$$d_{\Omega\beta}^{rec} = \left(\frac{2\pi}{i\partial^2 S(t_r, t_i, \vec{p})/\partial t_r^2}\right)^{1/2} \cdot \exp\left(-iS(t_r, t'_r, \vec{p}) + in\omega t_r\right) \cdot \vec{d}_{\Omega\beta}^{rec}(\vec{k}(t'_r)) \qquad (28)$$

where $\vec{d}_{\Omega\beta}^{rec}$ is the corresponding photorecombination matrix element. These matrix elements were computed within static-exchange DFT method.

Example 3

Locally and Globally Chiral Fields for Ultimate Control of Chiral Light Matter Interaction Chirality is a ubiquitous property of matter, from its elementary constituents to molecules, solids, and biological species. Chiral molecules appear in pairs of left and right handed enantiomers, where their nuclei arrangements present two non-superimposable mirror twins. The handedness of some macroscopic objects can be identified using a mirror, but how does one distinguish the handedness of a microscopic chiral object?

One powerful strategy that uses light relies on the concept of "chiral observer". This concept unites several revolutionary techniques of chiral discrimination, which analyze experimental observables with respect to a chiral reference frame defined by the experimental setup. Two axes of the reference frame are fixed by two non-collinear electric field vectors interrogating the chiral system, such as the two components of a circularly polarized laser pulse. The third laboratory axis is defined by the direction of observation, for example, by the position of the photo-electron detectors in photo-electron circular dichroism measurements.

Probing chirality can also involve interaction between two chiral objects, one of them with known handedness. This principle relies on using a well-characterized chiral reagent—another chiral molecule, or chiral light.

There is a fundamental difference between a chiral observer and a chiral reagent [30]. A chiral observer detects opposite directions or phases of signals excited in the two enantiomers, such as the opposite photo-electron currents generated by photo-ionization with circularly polarized light. But it does not influence the total signal, i.e. the total number of photo-electrons. In contrast, a chiral reagent leads to different total signal intensity in left and right enantiomers, such as in standard absorption circular dichroism in chiral media. Gaining control over intensity of light emission or absorption by chiral matter requires a chiral photonic reagent—chiral light.

Circularly polarized light, while chiral, is ill-suited for this purpose. The pitch of the light helix in the optical domain is too large compared to the size of the molecule, hindering chiro-optical response. To control chiral objects much smaller than the light wavelength efficiently, one needs a field that is chiral locally, in the electric-dipole approximation, without invoking light evolution in space.

Here the inventors introduce, characterize and use freely propagating locally chiral electromagnetic fields, which also maintain their handedness globally in space. Their global chirality map can be engineered by tuning their handedness locally, at every point. The inventors show that such fields enable the highest possible degree of control over the chiral non-linear optical response, quenching it in one enantiomer, while maximizing it in its mirror twin.

Figure 10A:
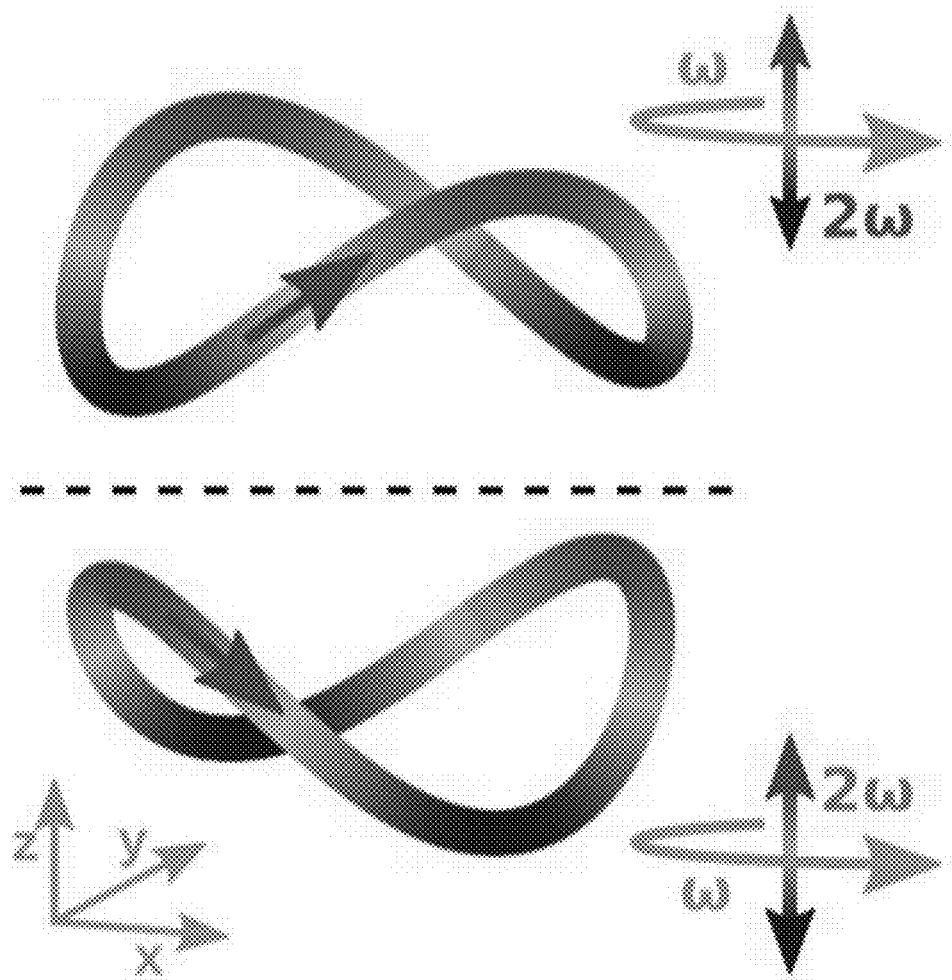
FIGS. 10A-C present the control with locally chiral fields: trajectory of the locally chiral field in Eq. (2), color shows z coordinate. Reflection through the xy plane changes the sign of the z field component and thus the field's handedness (FIG. 10A). Inset shows that the field is a superposition of a component of frequency $\omega$ elliptically polarized in the xy plane, and a component of frequency $2\omega$ linearly polarized along z (see Eq. (2)).

In locally chiral fields, the tip of the electric field vector follows a chiral trajectory in time (FIG. 10A). Here time plays a role of an additional dimension and a locally chiral field can be viewed as a "geometrical" object local in space, but non-local in time. Any symmetry analysis applicable to chiral molecules can be applied to locally chiral light fields, once dynamical symmetries describing its evolution in time are included. However, a symmetry analysis does not allow us to quantify their handedness. A previously employed measure of optical chirality is equivalent to light helicity and vanishes in the electric-dipole approximation. To quantify the handedness of locally chiral fields the inventors need a new approach. The inventors take snapshots of the electric field vector at three different instants of time and evaluate the triple product of these three vectors, forming a ubiquitous chiral measure. Once this triple product is averaged over time to sample the entire trajectory, the inventors find that this measure presents a special, chiral, three-point correlation function (see Methods), which distinguishes locally chiral fields. Thanks to the triple product, it forms a pseudoscalar, which changes sign if the inventors mirror-reflect the field trajectory, distinguishing left-handed and right-handed locally chiral fields. What's more, it describes the interaction of locally chiral fields with matter.

The lowest order chiral field-correlation function in the frequency domain is given by $$h^{(3)}(-\omega_1 - \omega_2, \omega_1, \omega_2) \equiv F^*(\omega_1 + \omega_2) \cdot [F(\omega_1) \times F(\omega_2)]. \qquad (1)$$

and its complex conjugate counterpart (see Methods), where $F(\omega_i)$ are the Fourier components of the electric field vector at three different frequencies. A non-zero triple product means that the field trajectory defines a local chiral reference frame via the three non-coplanar vectors $F(\omega_1)$, $F(\omega_2)$ and $F(\omega_1+\omega_2)$. This is why to have non-zero $h^{(3)}$, a locally chiral field needs at least three different frequency components. $h^3$ governs perturbative light-matter interaction, such as absorption circular dichroism induced solely by laser electric fields (see Methods) and enantiosensitive population of rotational states in chiral molecules using microwave fields.

One may think that if $h^{(3)}=0$, then the field is not locally chiral. This is not true, $h^{(3)} \neq 0$ is a sufficient but not necessary condition to have a locally chiral field. One can easily verify that the electric field vector of the very simple two-color field (FIG. 1a):

$$F_\omega \cos(\omega t)x + \varepsilon F_\omega \sin(\omega t)y + F_{2\omega}\cos(2\omega t + \phi_{\omega,2\omega})z \qquad (2)$$

traces a chiral trajectory in time, even though its $h^{(3)}=0$. Its chirality manifests in higher order time-correlations, which can be perfectly put to use in higher order non-linear light matter interactions. Indeed, the next order correlation function for this field (see Methods)

$$h^{(5)}(-2\omega, -\omega, \omega, \omega, \omega) \equiv \{F^*(2\omega) \cdot [F^*(\omega) \times F(\omega)]\}[F(\omega) \cdot F(\omega)] \qquad (3)$$

is non-zero. Eq. (3) shows that the ω-2ω field also forms a local chiral coordinate frame, and the inventors can identify three non-coplanar vectors upon temporal averaging. Here, the system absorbs three photons of frequency ω with x polarization, emits one photon of frequency ω with y polarization and emits one 2ω photon with z polarization. The handedness $h^{(5)}$ of this locally chiral field depends on $\phi_{\omega,2\omega}$, the ω-2ω phase delay. The spatial map of such delays is under our full control. It determines the $h^{(5)}$ map globally in space. Thus, the inventors now have a chiral photonic reagent, whose handedness can be tailored locally to address specific regions in space and specific multiphoton orders of interactions, with extremely high efficiency.

The mechanism of control over enantiosensitive optical response in the perturbative multiphoton regime is as follows. In isotropic chiral media, in the electric-dipole approximation the chiral response occurs only due to interactions involving an even number of photons both the in weak-field and strong-field regimes, but the non-chiral contribution must involve an odd number of photons, just like in ordinary isotropic media. Note that this difference allows one to differentiate between chiral and non-chiral media in the intensity of non-linear optical response associated with even number of absorbed photons. However, this intensity is the same for right-handed and left-handed enantiomers, and their response differs only by a global phase. In contrast, locally chiral fields make the signal intensity enantio-sensitive and allow one to control its strength depending on the molecular handedness.

Indeed, consider the intensity of the optical response triggered by the ω-2ω field (FIG. 1a) at frequency 2ω. Since the enantiosensitive second order susceptibility $\chi^{(2)}(2\omega; \omega, \omega)=0$ (see e.g. [16]), the lowest order enantio-sensitive multiphoton process involves four photons of frequency ω in the chiral channel and one photon of frequency 2ω in the achiral channel:

$$|P(2\omega)|^2 = |\chi^{(4)}[F^*(\omega) \times F(\omega)][F(\omega) \cdot F(\omega)] + \chi^{(1)}F(2\omega)|^2 = \quad (4)$$

$$(\text{diagonal terms}) + \chi^{(1)*}\chi^{(4)}h^{(5)} + c.c.$$

Figure 10B:
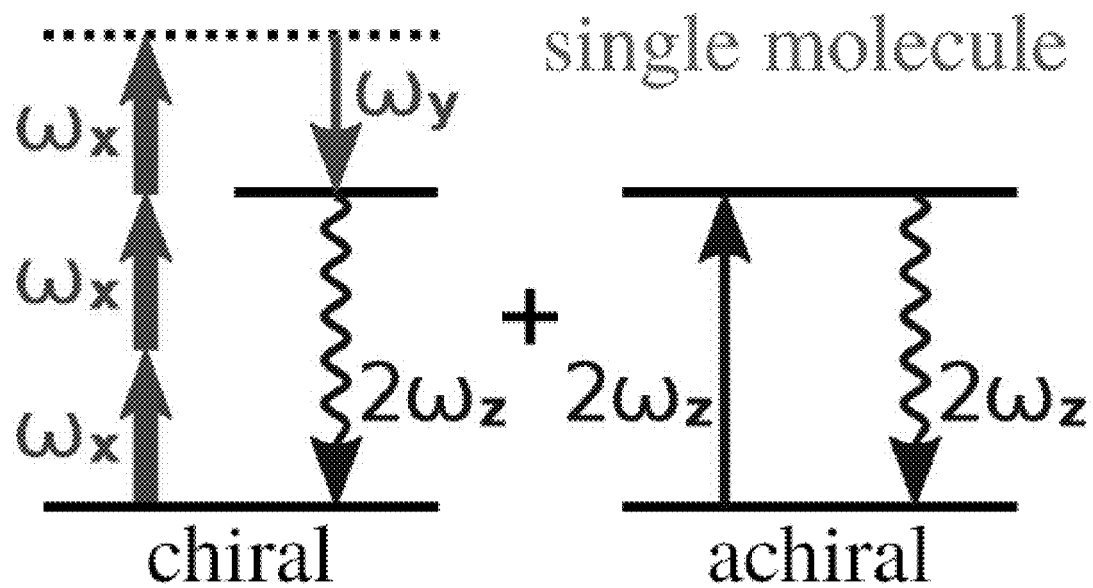
Figure 10C:
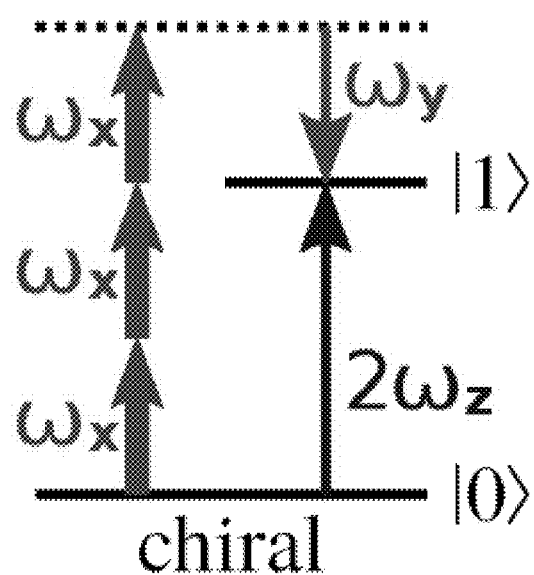

Here P(2ω) is the induced polarization at 2ω, $\chi^{(4)}=\sigma_M|\chi^{(4)}|e^{i\phi_4}$ is the enantiosensitive fourth-order susceptibility (see Methods), and $\chi^{(1)}=|\chi^{(1)}|\mu e^{i\phi_1}$ is the achiral linear susceptibility. The interference term $$2\sigma_M\sigma_L|\chi^{(1)}||\chi^{(4)}||h^{(5)}|\cos(\phi_M + \phi_{\omega,2\omega}) \quad (5)$$

is controlled by the chiral-field correlation function $h^{(5)}=\sigma_L|h^{(5)}|e^{i\phi_{\omega,2\omega}}$. It depends on the molecular phase $\phi_M=\phi_4-\phi_1$ associated with complex susceptibilities, the relative phase $\phi_{\omega,2\omega}$ between the ω and 2ω field components, the handedness of the molecule $\sigma_M=\pm 1$, and the sense of in-plane rotation of light $\sigma_L=\pm 1$. Eqs. (5) show that tuning the strengths and the relative phase $\phi_{\omega,2\omega}$ between the ω and 2ω fields the inventors can achieve perfect constructive/destructive interference and fully suppress or maximally enhance the signal intensity in the selected enantiomer (see FIG. 10B). No additional achiral background channels are allowed due to selection rules. The exact same interference, as is clear from FIG. 10C, controls absorption of the 2ω field.

Figure 11A:
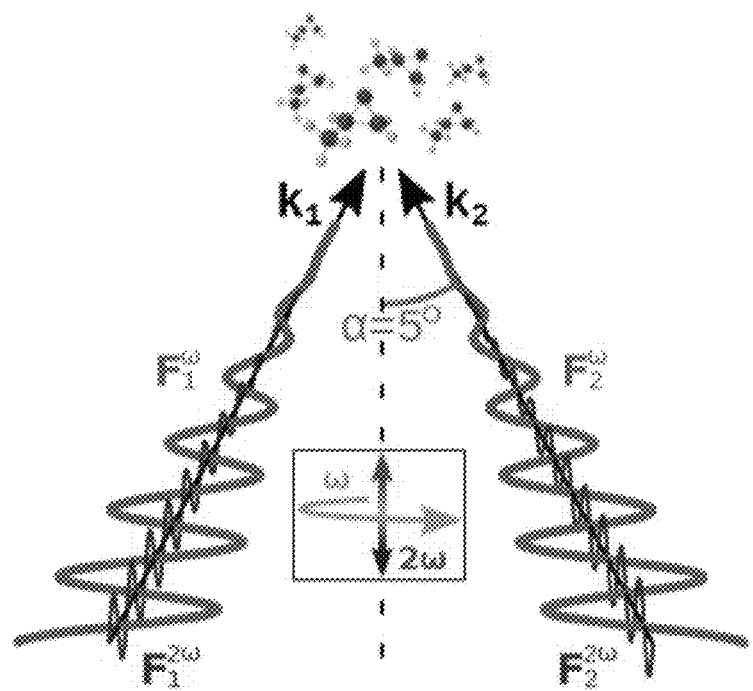
FIGS. 11A-D present locally and globally chiral field: the setup for generating a locally and globally chiral field includes two non-collinear laser beams, each carrying a strong $\omega$ field and a weak, orthogonally polarized, $2\omega$ field (FIG. 11A). The total $\omega$ field is elliptical in the xy plane, the $2\omega$ field is linear along z. Ellipticity of $\omega$ field (grey) and amplitude of the $2\omega$ field (purple) across the focus (FIG. 11B). The ellipticity flips sign at the same position in the focus where the $2\omega$ field changes its oscillation phase by $\pi$, ensuring that this locally chiral field maintains its handedness globally in space. Panel of FIG. 11C shows that the chiral temporal structure at different points across the focus, shown in top-row boxes, maintains its handedness.
Figure 11B:
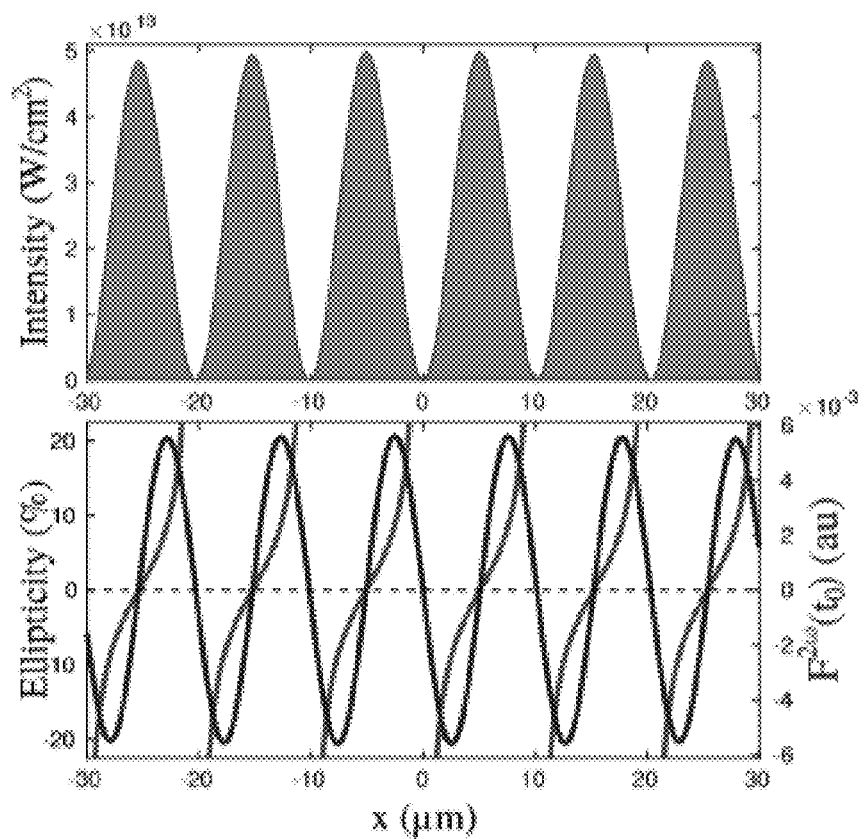
Figure 11C:
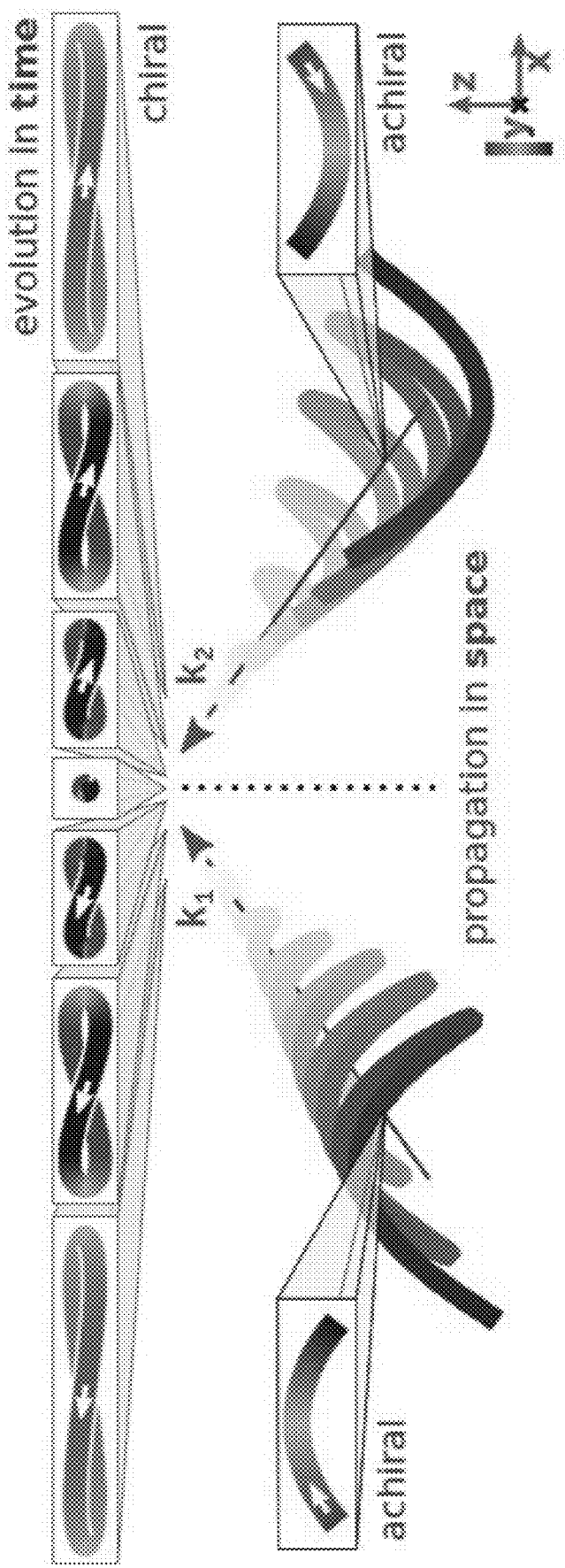
Figure 11D:
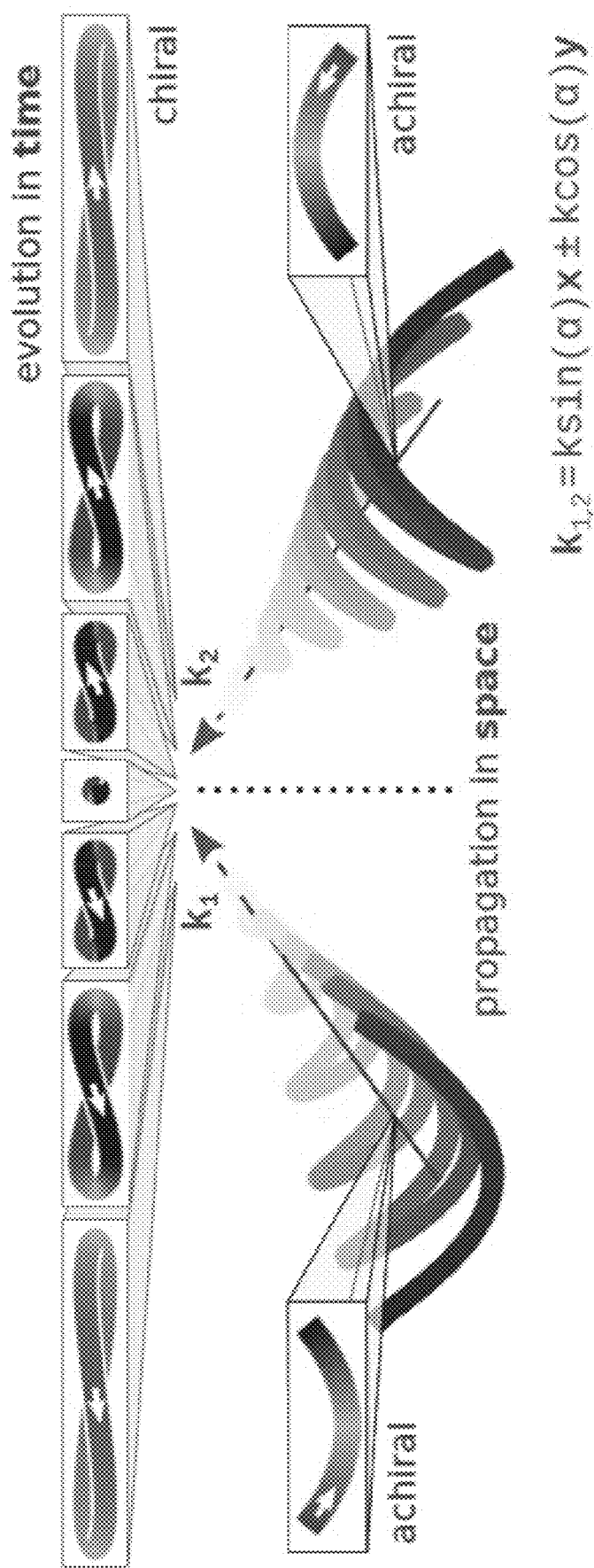

Turning now to quantitative analysis and focus on high harmonic generation, a ubiquitous process in gases, liquids and solids. The required locally chiral field shown in FIG. 1a can be easily generated using the setup in FIG. 11A. It involves two non-collinear beams with wavevectors $k_1$ and $k_2$ propagating in the xy plane at small angles ±α to the y axis (here α=5°). Each beam is made of linearly polarized ω and 2ω fields with orthogonal polarizations and controlled phase delays (see Methods). Thanks to the non-zero α, the ω field is elliptically polarized in the xy plane, with the minor component along the propagation direction y. The handedness of the locally chiral field does not change globally in space: the amplitude of the 2ω field, polarized along z, and the ellipticity of ω field, confined in the xy plane, flip sign at the same positions (see FIG. 11B and Supplementary Information). The chiral structure of the field trajectory in time maintains its handedness across the focus, as can be seen in the top rows of FIGS. 11C-D.

Figure 12A:
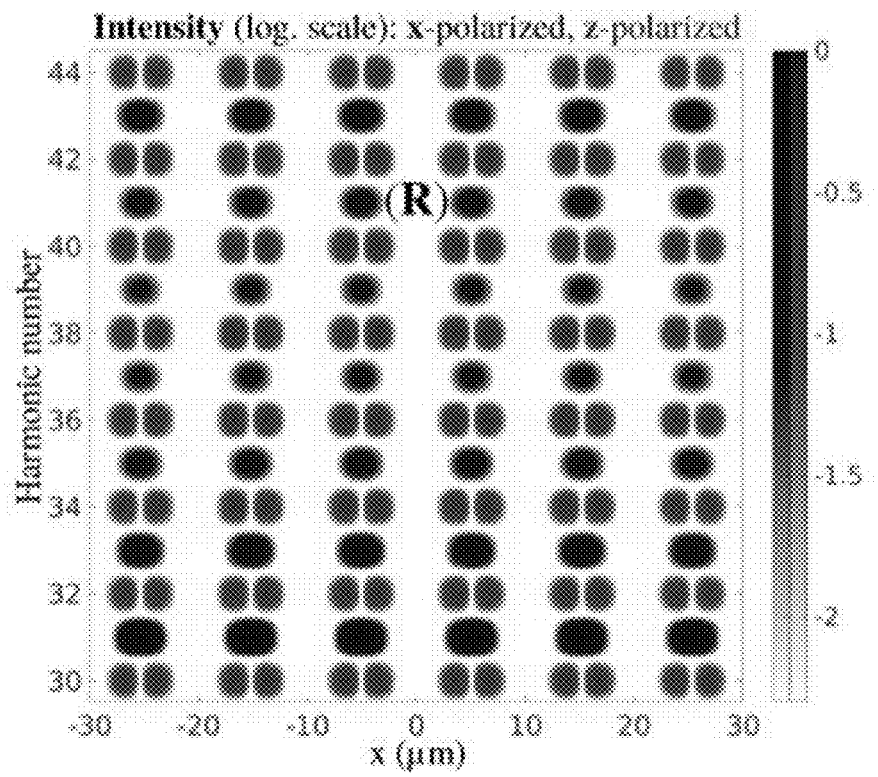
FIGS. 12A-D present the near field enantio-sensitive high harmonic generation by a locally chiral field. Enantiosensitive polarization grating created in enantiopure samples of R and S propylene oxide molecules: intensity (FIGS. 12A-B) and phase (FIGS. 12C-D). The fundamental wavelength is $\lambda=1.77$ μm, intensity $I_\omega=1.3\cdot10^{13}$ W/cm$^2$, $I_{2\omega}=1\%$ $I_\omega$, $\phi_{\omega,2\omega}=0$, pulse duration 23 fsec at constant intensity, 5°, and focal diameter 400 μm.
Figure 12B:
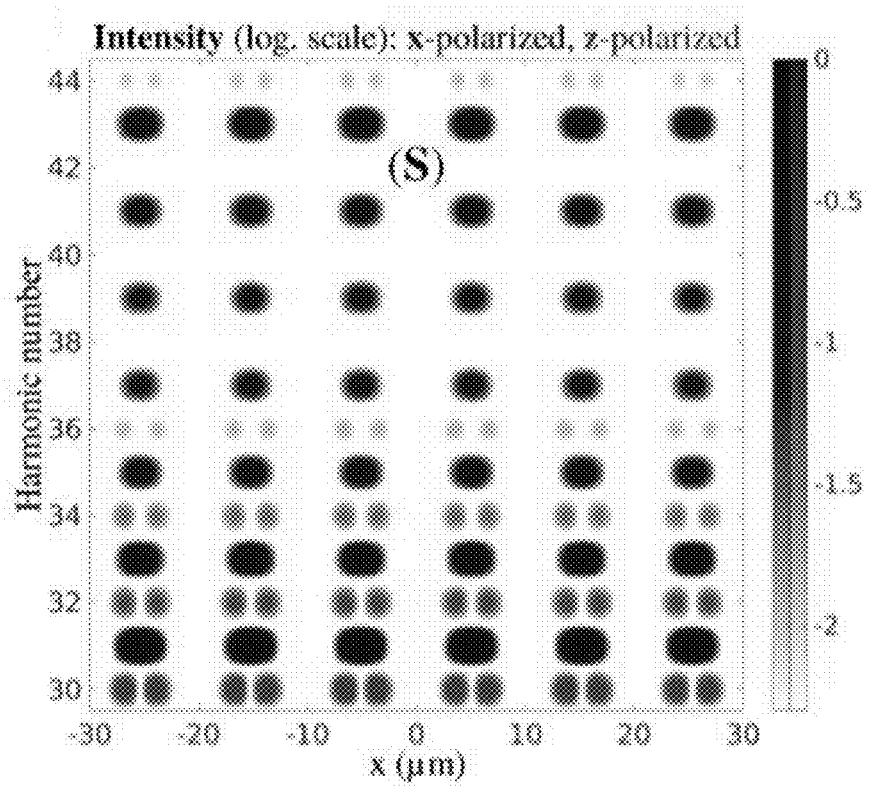
Figure 12C:
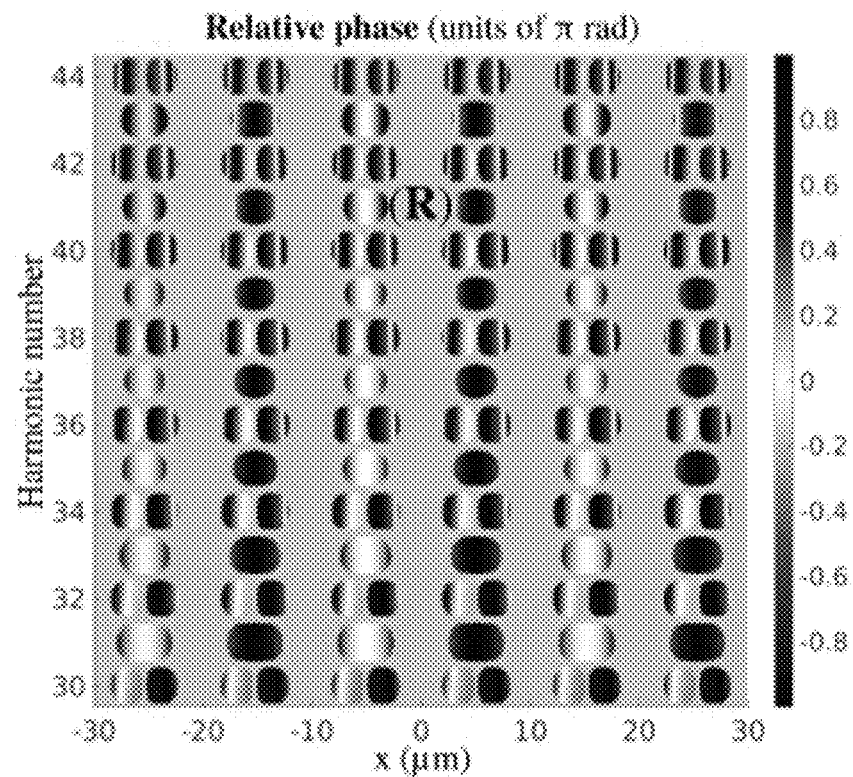
Figure 12D:
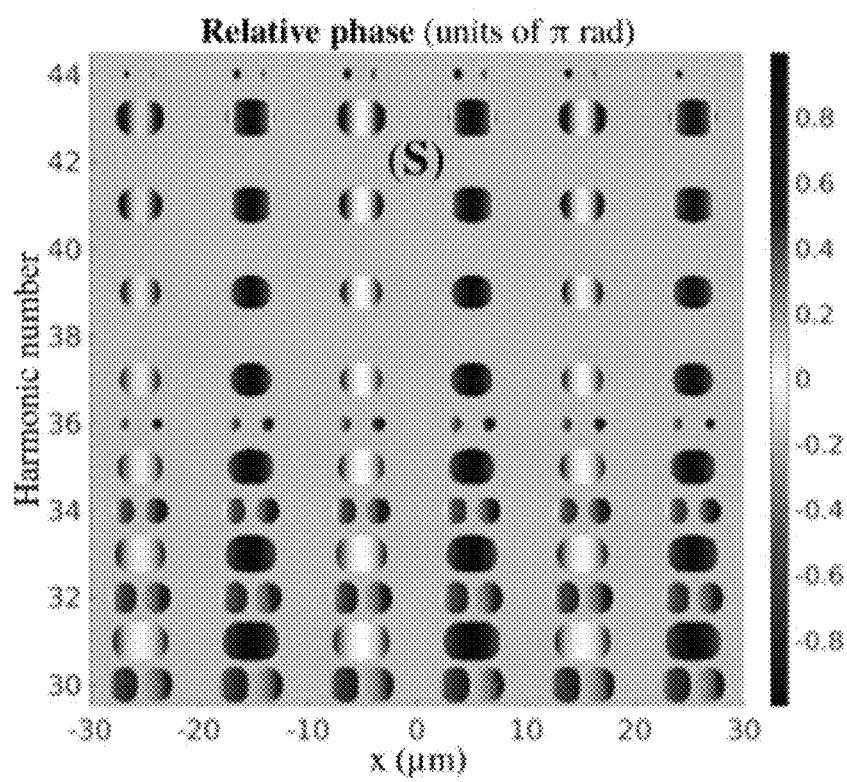

To describe the non-linear response of an isotropic chiral medium, the inventors developed a quantitative model of high harmonic response in randomly oriented propylene oxide, and verified it against experimental results, with excellent agreement. The periodic locally chiral structure of the field along the x axis leads to the amplitude (FIGS. 12A-B) and phase (FIGS. 12C-D) gratings of the generated chiral response. Here the intensity of the second harmonic field has been set to 1% of the fundamental, and $\phi_{\omega,2\omega}=0$. The gratings in FIGS. 3a-d are completely different for the right and left enantiomers, demonstrating enantio-sensitive intensity of the optical response already at the single-molecule level.

Figure 13A:
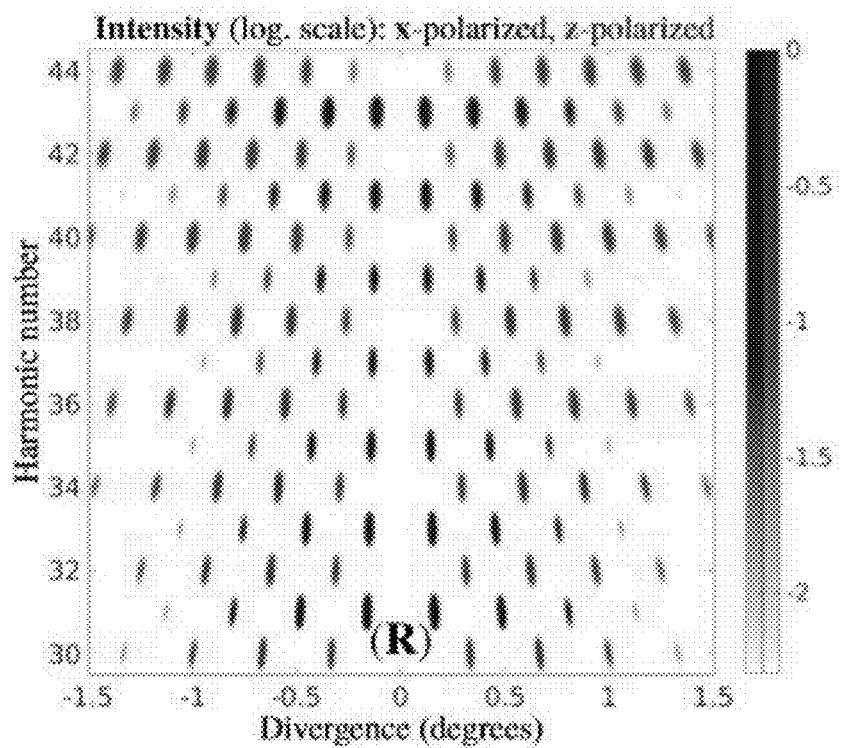
FIGS. 13A-F present ar-field harmonic intensity and chiral dichroism. a, b, Harmonic intensity for randomly oriented enantiopure R and S propylene oxide molecules, for the same field as in FIG. 12, $I_{2\omega}/I_\omega=0.01$ and $\phi_{\omega,2\omega}=0$. Shifting $\phi_{\omega,2\omega}$ by $\pi$ is equivalent to exchanging the enantiomer (FIGS. 13A-B). Chiral dichroism in harmonic intensity (FIG. 13C). Total angle-integrated even harmonic intensity and chiral dichroism (FIG. 13D). Chiral dichroism in H40 versus $\phi_{\omega,2\omega}$.f, Intensity ratio between H40 and H41 as a function of the enantiomeric excess when $I_{2\omega}/I_\omega=0.01$ and $\phi_{\omega,2\omega}=0$ (red) and $\phi_{\omega,2\omega}=\phi$ (blue) (FIG. 13E)
Figure 13B:
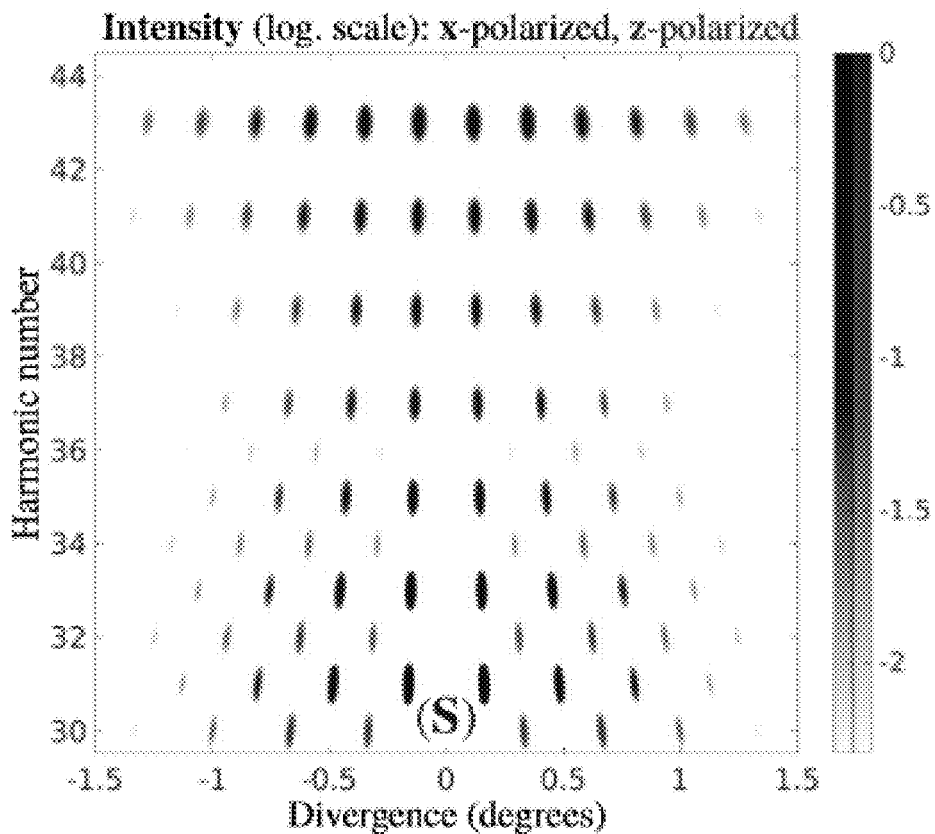
Figure 13C:
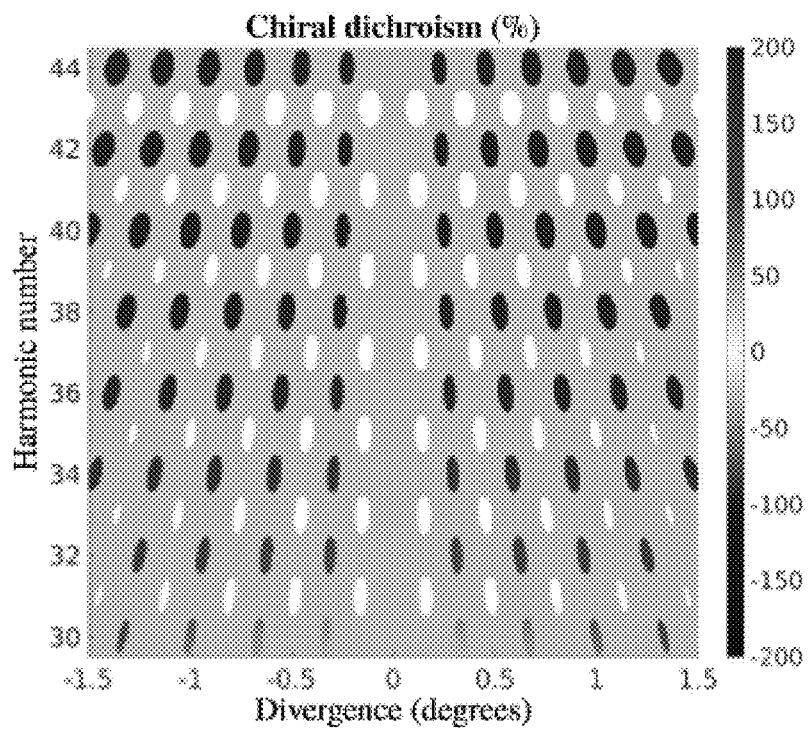

FIGS. 13A-B show how the enantiosensitive gratings translate into the far field (see Methods). Even and odd harmonics are emitted in different directions. Their spatial separation follows from momentum conservation upon net absorption of the corresponding number of photons. Thus, even harmonics constitute a background-free measurement of the molecular handedness, separated from the achiral signal in frequency, polarization and space. Note that, in isotropic media, the harmonic signal at even frequencies of the fundamental can only be z-polarized, but odd harmonics are polarized along the x axis.

Figure 13D:
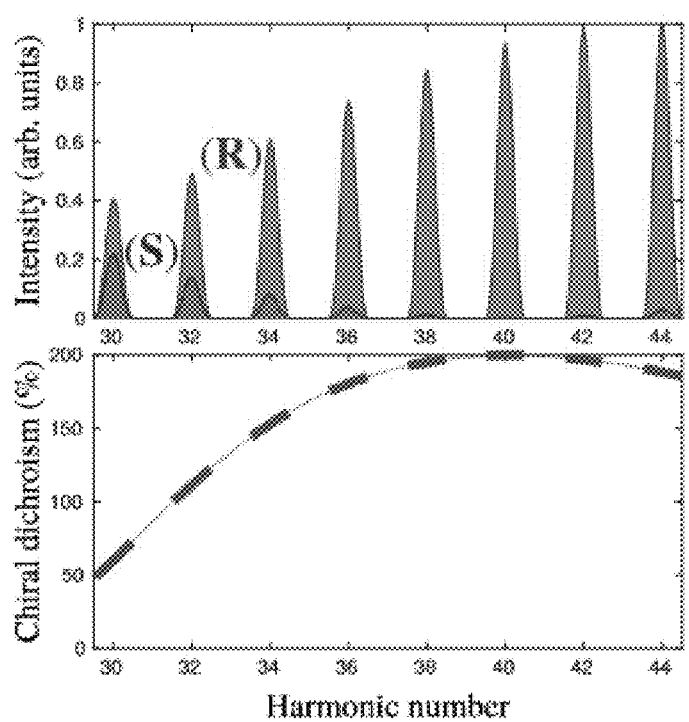
Figure 13E:
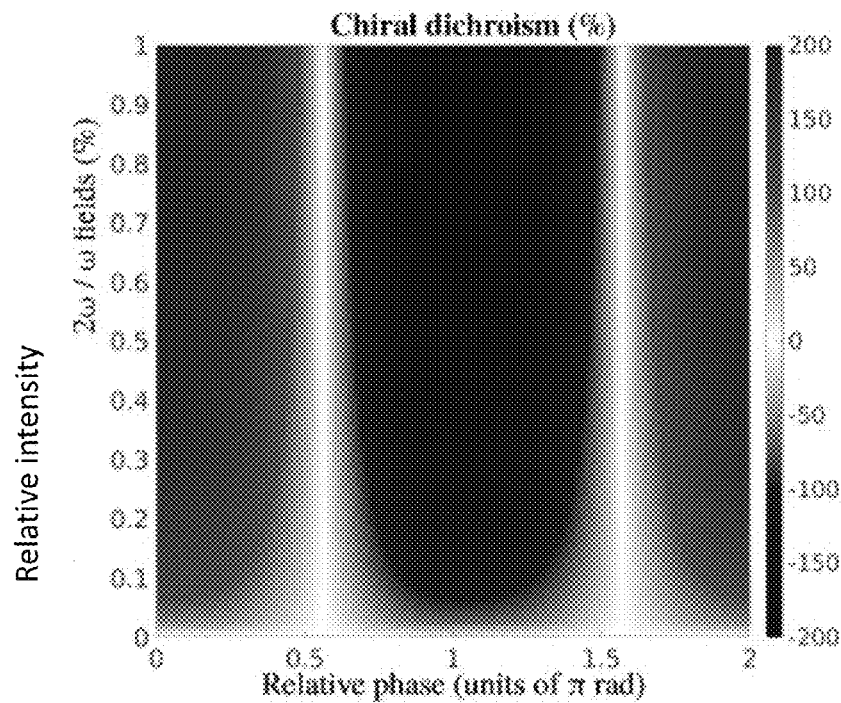
Figure 13F:
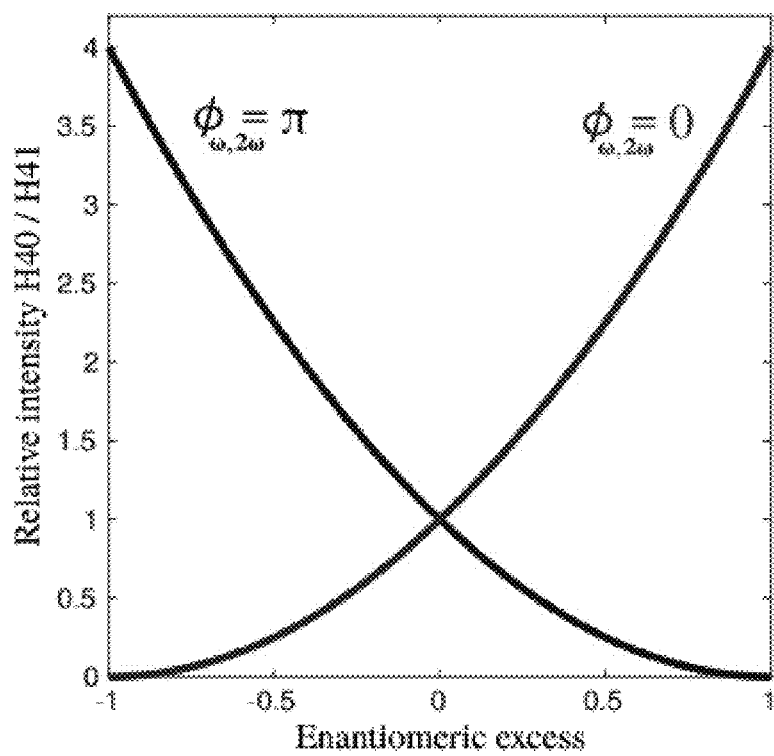

The intensity of even harmonics is determined by the interference between chiral and achiral pathways $\propto \cos(\phi_M + f_N(\phi_{\omega,2\omega}))$, where the controlled phase $f_N(\phi_{\omega,2\omega})$ is a non-linear function of $\phi_{\omega,2\omega}$, for every harmonic number (see Supplementary Information). This interference can be controlled by changing $\phi_{\omega,2\omega}$ and the intensity of the 2ω field. The inventors can therefore selectively quench the harmonic emission from the S enantiomer and enhance the signal of its mirror image, yielding unprecedented enantiosensitive response. The signal $I_S$ from the left handed molecule is completely suppressed for H40, the chiral dichroism reaches 200% (see FIG. 4c,d). Shifting $\phi_{\omega,2\omega}$ by π the inventors reverse the handedness of the driver and thus obtain the exactly opposite result: suppression of $I_R$ and enhancement of $I_S$ (see FIG. 13E). The harmonic number(s) that exhibit 200% chiral dichroism can be selected by tuning the parameters of the second harmonic field and used for concentration-independent determination of both the amplitude and the sign of the enantiomeric excess ee in macroscopic mixtures from simple intensity measurements (see FIG. 13F). Indeed, for such harmonics the intensity ratio between consecutive harmonics is $$\frac{I_{2N}}{I_{2N+1}} \simeq (1 \pm ee)^2 \frac{I_{2N}}{I_{2N+1}}|_{ee=0}, \text{ where } \frac{I_{2N}}{I_{2N+1}}|_{ee=0}$$

is the intensity ratio in a racemic mixture (see FIG. 3f and Methods). The intensity of even harmonics is controlled at the level of total, integrated over emission angle, signal (FIG. 13D). Such control is only possible because the handedness of the field is maintained globally in space. One can also create locally chiral fields which carry several elements of chirality or change their helicity in space (see Supplementary Information). They may present alternative opportunities for studying matter with similar spatial patterns of chirality, or for exciting such patterns on demand.

The mechanism responsible for efficient control of chiral optical response with locally and globally chiral fields is general for isotropic chiral media in gases, liquids, solids, and plasmas. Locally and globally chiral fields open new routes for chiral discrimination, enantio-sensitive imaging including selective monitoring of enantiomers with a specific handedness in non-enantiopure samples undergoing a chemical reaction, with ultrafast time resolution, laser-based separation of enantiomers, and efficient control of chiral matter. They can also be used to imprint chirality on achiral matter, extending the recent proposal from molecular rotations to various media and various degrees of freedom. For example, (i) optical excitation of chiral electronic states in achiral systems such as the hydrogen atom, (ii) efficient enantiosensitive population of chiral vibronic states in molecules that are achiral in the ground state, e.g. formamide [38], or (iii) exciting chiral dynamics in delocalized systems that are not chiral, such as a free electron or, more generally, collective electronic excitations in metals and plasmas. Looking broadly, these opportunities can be used to realize laser-driven achiral-chiral phase transitions in matter.

As global control over the handedness of locally chiral fields creates enantio-sensitive time and space periodic structures, it may open interesting opportunities for exploring self-organization of quantum chiral matter and in the interaction of such fields with nano-structured chiral metamaterials.

Methods

Chiral-Field Correlation Functions.

For a locally chiral field with polarization vector F(t) the lowest order chiral-field correlation function is a pseudoscalar $$H^{(3)}(\tau_1, \tau_2) \equiv \frac{1}{2\pi} \int dt F(t) \cdot [F(t+\tau_1) \times F(t+\tau_2)]. \quad (6)$$

Its complex counterpart in the frequency domain, $$h^{(3)}(-\omega_1 - \omega_2, \omega_1, \omega_2) \equiv \int d\tau_1 \int d\tau_2 H^{(3)}(\tau_1, \tau_2) e^{-i\omega_1\tau_1} e^{-i\omega_2\tau_2}, \quad (7)$$

yields Eq. (1) of the main text.

$h^{(3)}$ describes perturbative enantio-sensitive three-photon light matter interaction. For example, it appears as a light pseudoscalar in absorption circular dichroism in the electric-dipole approximation, analogously to how the helicity of circularly polarized light contributes to standard absorption circular dichroism beyond the electric-dipole approximation.

Consider a field with frequencies $\omega_1$, $\omega_2$, and $\omega_+ \equiv \omega_2 + \omega_1$ $$F(t) = F_1 e^{-i\omega_1 t} + F_2 e^{-i\omega_2 t} + F_+ e^{-i\omega_+ t} + c.c. \quad (8)$$

The contribution from second order induced polarization is enantio-sensitive [16] and can be written as (see also [17]):

$$P^{(2)}(\omega_3) = \frac{1}{3} \epsilon_{\alpha\beta\gamma} \chi^{(2)}_{\alpha\beta\gamma}(\omega_3 = \omega_1 + \omega_2)[F(\omega_1) \times F(\omega_2)]. \quad (9)$$

Note that $P^{(2)}(\omega_3)$ vanishes if $\omega_1 = \omega_2$ [16]. Thus, for the field in Eq. (8) the inventors obtain:

$$P^{(2)}(\omega_1) = \frac{1}{3} \epsilon_{\alpha\beta\gamma} \chi^{(2)}_{\alpha\beta\gamma}(\omega_1 = \omega_+ - \omega_2)(F_+ \times F_2^*), \quad (10)$$

$$P^{(2)}(\omega_2) = \frac{1}{3} \epsilon_{\alpha\beta\gamma} \chi^{(2)}_{\alpha\beta\gamma}(\omega_2 = \omega_+ - \omega_1)(F_+ \times F_1^*), \quad (11)$$

$$P^{(2)}(\omega_+) = \frac{1}{3} \epsilon_{\alpha\beta\gamma} \chi^{(2)}_{\alpha\beta\gamma}(\omega_+ = \omega_2 + \omega_1)(F_2 \times F_1). \quad (12)$$

The second-order response at the difference frequency $\omega_1 - \omega_1$ does not contribute to absorption because this frequency is absent in the driving field. Using the standard definition for the total energy ε exchanged between the field and the molecule, $$\varepsilon = \int_{-\infty}^{\infty} dt F(t) \cdot \dot{P}(t) = -2\pi i \int d\omega \, \omega F(-\omega) \cdot P(\omega), \quad (13)$$

and replacing Eqs. (10), (11), and (12) in Eq. (13) the inventors obtain $$\varepsilon^{(2)} = \frac{4\pi}{3} \text{Im}\{[-\omega_1 \epsilon_{\alpha\beta\gamma} \chi^{(2)*}_{\alpha\beta\gamma}(\omega_1 = \omega_+ - \omega_2) + \omega_2 \epsilon_{\alpha\beta\gamma} \chi^{(2)*}_{\alpha\beta\gamma}(\omega_2 = \omega_+ - \omega_1) + \omega_+ \epsilon_{\alpha\beta\gamma} \chi^{(2)}_{\alpha\beta\gamma}(\omega_+ = \omega_2 + \omega_1)][F_+^* \cdot (F_2 \times F_1)]\}. \quad (14)$$

Equation (14) shows that enantio-sensitive light absorption is controlled by the third-order correlation function $h^{(3)}$ in Eq. (1). Indeed, it is proportional to the imaginary part of a product of two pseudoscalars: the first one is associated with chiral medium and involves second order susceptibilities, the second one is associated with the locally chiral field and is given by its correlation function $h^{(3)} = [F^*_+ \cdot (F_2 \times F_1)]$. An analogous expression applies for a field with frequencies $\omega_1$, $\omega_2$, and $\omega_1 - \omega_2$.

Chiral susceptibility tensor in Eqs. (5). The polarization corresponding to absorption of a single 2ω photon is given by $$P_i^{(1)}(2\omega) = \chi^{(1)}_{ij}(2\omega) F_j(2\omega), \quad (15)$$

where the orientation-averaged susceptibility is given by $$\chi_{ij}^{(1)} = \left(\int d\varrho\, l_{i\alpha} l_{j\beta}\right) \chi_{\alpha\beta}^{(1)} \quad (16)$$

$$= \frac{1}{3} \delta_{i,j} \delta_{\alpha,\beta} \chi_{\alpha\beta}^{(1)}$$

and yields $$P^{(1)}(2\omega) = \frac{1}{3}\chi_{\alpha\alpha}^{(1)}(2\omega) F(2\omega). \quad (17)$$

Here $l_{i\alpha}$ is the direction cosine between axis i in the lab frame and axis $\alpha$ in the molecular frame. The inventors use latin indices for the lab frame and greek indices for the molecular frame. The fourth-order term corresponding to absorption of three and emission of one $\omega$ photon reads as $$P_i^{(4)}(2\omega) = 4\chi_{ijklm}^{(4)}(2\omega = -\omega+\omega+\omega+\omega)F_j^*(\omega)F_k(\omega)F_l(\omega)F_m(\omega), \quad (18)$$

where the degeneracy factor 4 comes from the four possible photon orderings. The orientation-averaged fourth-order susceptibility in the lab frame is given by $$\chi_{ijklm}^{(4)} = \left(\int d\varrho\, l_{i\alpha} l_{j\beta} l_{k\gamma} l_{l\delta} l_{m\epsilon}\right) \chi_{\alpha\beta\gamma\delta\epsilon}. \quad (19)$$

Using standard expressions for the orientation averaging (see e.g. Refs. [30] and [2]) the inventors obtain (see also [16]):

$$P^{(4)}(2\omega) = \frac{2}{15}\chi_{\alpha\beta\gamma\delta\epsilon}^{(4)}(2\omega = -\omega+\omega+\omega+\omega)\times \quad (20)$$
$$(\epsilon_{\alpha\beta\gamma}\delta_{\delta\epsilon} + \epsilon_{\alpha\beta\delta}\delta_{\gamma\epsilon} + \epsilon_{\alpha\beta\epsilon}\delta_{\gamma\delta})[F^*(\omega)\times F(\omega)][F(\omega)\cdot F(\omega)].$$

Here, a shorthand notation is used for the first-order and the fourth-order susceptibilities, i.e.

$$\chi^{(1)} \equiv \frac{1}{3}\chi_{\alpha\alpha}^{(1)}(2\omega), \quad (21)$$

$$\chi_{\pm}^{(4)} \equiv \frac{2}{15}\chi_{\alpha\beta\gamma\delta\epsilon}^{(4)}(2\omega = -\omega+\omega+\omega+\omega)(\epsilon_{\alpha\beta\gamma}\delta_{\delta\epsilon} + \epsilon_{\alpha\beta\delta}\delta_{\gamma\epsilon} + \epsilon_{\alpha\beta\epsilon}\delta_{\gamma\delta}). \quad (22)$$

Note that for a field containing only frequencies $\omega$ and $2\omega$ the second-order response at frequency $2\omega$ vanishes [see Eq. (9)] and therefore there is no interference between $P^{(2)}(2\omega)$ and $P^{(3)}(2\omega)$. Although $P^{(3)}(2\omega)$ is non-zero, it behaves either as $|F(\omega)|^2 F(2\omega)$ or as $|F(2\omega)|^2 F(2\omega)$. The last term should be omitted, since the inventors keep only terms linear in F(2 $\omega$). As for the first term, which includes additional absorption and emission of $\omega$ photons, it merely describes the standard nonlinear modification of the linear response to the weak $2\omega$ field due to the polarization of the system by the strong $\omega$ field, leading e.g. to the Stark shifts of the states involved. Thus, while these terms do modify the effective linear susceptibility $\chi^{(1)}(2\omega)$, which should include the dressing of the system by the strong $\omega$ field, they do not modify the overall result.

Fifth-order chiral-field correlation function. The different chiral-field correlation functions $h^{(n)}$, with n odd, control the sign of enantio-sensitive and dichroic response in multiphoton interactions. For the locally chiral field employed in our work [see Eq. (2)] $h^{(5)}$ is the lowest-order non-vanishing chiral-field correlation function. Here the inventors show that $h^{(5)}$ has a unique form for this field, as may be anticipated from the derivation in the previous section.

Eq. (2) in the exponential form $$F(t) = (F_x\hat{x} + iF_y\hat{y})e^{-i(\omega t+\delta_\omega)} + F_z\hat{z}e^{-2i(\omega t+\delta_{2\omega})} + c.c., \quad (23)$$

and the fifth-order chiral-field correlation function as $$h^{(5)}(\omega_0, \omega_1, \omega_2, \omega_3, \omega_4) \equiv \quad (24)$$
$$\{F(\omega_0)\cdot[F(\omega_1)\times F(\omega_2)]\}[F(\omega_3)\cdot F(\omega_4)],$$
where
$$\omega_0 + \omega_1 + \omega_2 + \omega_3 + \omega_4 = 0. \quad (25)$$

First, note that $h^{(5)}$ is symmetric with respect to exchange of $\omega_3$ and $\omega_4$, and symmetric/anti-symmetric with respect to even/odd permutations of $\omega_0$, $\omega_1$, and $\omega_2$. Non-trivially different forms of $h^{(5)}$ result only from considering exchanges between $\{\omega_0, \omega_1, \omega_2\}$ and $\{\omega_3, \omega_4\}$. In the following the inventors show that the field (Eq. (2) of the main text) yields a unique non-zero form of $h^{(5)}$.

For $h^{(5)}$ to be non-vanishing, the triple product in $h^{(5)}$ must contain the three different vectors available in our field, namely $F_x\hat{x}+iF_y\hat{y}$, $F_x\hat{x}-iF_y\hat{y}$ (from the c.c. part), and $\hat{z}$. The remaining scalar product must have frequencies such that Eq. (25) is satisfied. This means that the inventors have the following four options for $h^{(5)}$:

$$h_a^{(5)} = h^{(5)}(-2\omega, -\omega, \omega, \omega, \omega) \quad (26)$$

$$h_b^{(5)} = h^{(5)}(-2\omega, \omega, -\omega, \omega, \omega) \quad (27)$$

$$h_c^{(5)} = h^{(5)}(2\omega, \omega, -\omega, -\omega, -\omega) \quad (28)$$

$$h_d^{(5)} = h^{(5)}(2\omega, -\omega, \omega, -\omega, -\omega) \quad (29)$$

Since $\vec{F}(\omega_2)\times\vec{F}(\omega_1) = -\vec{F}(\omega_1)\times\vec{F}(\omega_2)$ and $\vec{F}(t)$ is real, then $$h_b^{(5)} = -h_a^{(5)} \quad (30)$$

$$h_c^{(5)} = h_a^{(5)*} \quad (31)$$

$$F_n^\omega(r, t) = F_0 e^{-\rho_n^2/\tilde{\omega}^2}\cos(k_n\cdot r - \omega t - \phi_n^\omega)\hat{e}_n \quad (34)$$

$$F_n^{2\omega}(r, t) = r_0 F_0 e^{-\rho_n^2/\tilde{\omega}^2}\cos(2k_n\cdot r - 2\omega t - 2\phi_n^{2\omega})\hat{z} \quad (35)$$

where $F_0$ is the electric field amplitude, $r_0^2$ is the intensity ratio between the two colours, $\rho_n$ is the radial distance to beams' axis ($\rho=\rho_1\simeq\rho_2$ in the focus), $\tilde{\omega}$ is the waist radius, the propagation vectors of the fundamental field are defined as $$k_1 = k\sin(\alpha)\hat{x} + k\cos(\alpha)\hat{y} \quad (36)$$

$$k_2 = -k\sin(\alpha)\hat{x} + k\cos(\alpha)\hat{y} \quad (37)$$

$$\text{where } k = \frac{2\pi}{\lambda},$$

$\lambda$ being the fundamental wavelength, and the polarization vectors are given by $$\hat{e}_1 = \cos(\alpha)\hat{x} - \sin(\alpha)\hat{y} \quad (38)$$

$$\hat{e}_2 = \cos(\alpha)\hat{x} + \sin(\alpha)\hat{y} \quad (39)$$

The total electric field can be written as $$F(r,t) = 2F_0 e^{-\rho^2/\omega^2}[f_x(x)\cos(k\cos(\alpha)y - \omega t - \delta_+^\omega)\hat{x} + \quad (40)$$
$$f_y(x)\sin(k\cos(\alpha)y - \omega t - \delta_+^\omega)\hat{y} +$$
$$f_z(x)\cos(2k\cos(\alpha)y - 2\omega t - 2\delta_+^{2\omega})\hat{z}]$$
with $$f_x(x) = \cos(\alpha)\cos(k\sin(\alpha)x + \delta_-^\omega) \quad (41)$$

$$f_y(x) = \sin(\alpha)\sin(k\sin(\alpha)x + \delta_-^\omega) \quad (42)$$

$$f_z(x) = r_0\cos(2k\sin(\alpha)x + 2\delta_-^{2\omega}) \quad (43)$$

where $\delta_\pm^{m\omega} = (\phi_2^{m\omega} \pm \phi_1^{m\omega})/2$. Equations (40)-(43) show that the total electric field is locally chiral. It is elliptically polarized in the xy plane at frequency $\omega$ (with major polarization component along x) and linearly polarized along z at frequency $2\omega$.

Note that the relative phases between the three field components do not change along z, as the two beams propagate in the xy plane. They do not change along y either, since $k_1 \cdot y = k_2 \cdot y$. Indeed, one can easily see in Eq. (40) that a spatial translation $y \to y + \Delta y$ is equivalent to a temporal displacement $t \to t - \Delta t$, with $k\cos(\alpha)\Delta y = \omega \Delta t$. However, the relative phases between the field components do change along x, because $k_1 \cdot x \neq k_2 \cdot x$ (having $k_1 \cdot x = -k_2 \cdot x$ instead), and their modulation is given by $f_x(x)$, $f_y(x)$ and $f_z(x)$.

In order to generate a macroscopic chiral response, the inventors need to ensure that the handedness of the locally chiral field is locked throughout space. As $f_x$ and $f_y$ change along x, so does the ellipticity in the xy plane, which can be defined as $$\varepsilon(x) = \frac{f_y(x)}{f_x(x)} = \tan(\alpha)\tan(k\sin(\alpha)x + \delta_-^\omega) \quad (44)$$

One can easily see that the field's handedness depends on the relative sign between $\varepsilon(x)$ and $f_z(x)$. Thus, the inventors just need to make sure that both quantities change sign at the same positions. The spatial points where forward ellipticity flips sign satisfy $$k\sin(\alpha)x + \delta_-^\omega = n\frac{\pi}{2}, \quad (45)$$

with $n \in \mathbb{Z}$.

Whereas for $f_z$ the inventors have $$2k\sin(\alpha)x + 2\delta_-^{2\omega} = \frac{\pi}{2} + n\pi, \quad (46)$$

with $n \in \mathbb{Z}$.

Combining Eqs. (45) and (46), the inventors obtain the following general condition $$2\delta_-^\omega - 2\delta_-^{2\omega} = \frac{\pi}{2} + n\pi, \quad (47)$$

with $n \in \mathbb{Z}$

Let us consider now the situation where the two fundamental fields are out of phase (as in FIG. 3a), i.e. $\phi_1^\omega = \delta_+^\omega - \pi/2$ and $\phi_2^\omega = \delta_+^\omega + \pi/2$, and therefore $\delta_-^\omega = \pi/2$. Then, the condition given by Eq. (47) is verified if $2\delta_-^{2\omega} = \pi/2$, i.e. if the second harmonic fields are also out of phase, and then the inventors have $2\phi_1^{2\omega} = 2\delta_+^{2\omega} - \pi/2$ and $2\phi_2^{2\omega} = 2\delta_+^{2\omega} + \pi/2$. This means that the relative phase between the two colours has to be the same in both beams, $2\phi_n^{2\omega} - \phi_n^\omega = 2\delta_+^{2\omega} - \delta_+^\omega$. This analysis shows that the locally chiral field shown in FIG. 1a of the main text maintains its handedness globally in space. It can also be seen from the chiral-field correlation functions.

Global handedness in chiral-field correlation functions
Here the inventors analyze how the handedness of the chiral field Eq. (2) as defined via the chirality measure $h^{(5)}$ in Eq. (3) changes in space. From Eqs. (23), (33), and (40)-(43), the inventors can see that $h^{(5)}$ depends on x through $F_x$, $F_y$, and $F_z$. $F_x$ and $F_y$ oscillate with a frequency $k\sin\alpha$, and $F_z$ oscillates with a frequency $2k\sin\alpha$, as a function of x. Of course, $h^{(5)}$ also oscillates as a function of x, however, by decomposing $F_x$, $F_y$, and $F_z$ into exponentials with positive and negative frequencies, one can see that there is also a null-frequency component in $h^{(5)}$ that does not oscillate as a function of x. Ultimately, it is this null-frequency component which defines the global handedness of the field. It is given by $$[h_a^{(5)}]_0 = 2i[F_x F_y F_z(F_x^2 - F_y^2)]_0 e^{2i(\delta_+^{2\omega} - \delta_+^\omega)} \quad (48)$$
$$= \frac{1}{8}F_0^5 r_0 \sin(4\alpha)\sin(2\delta_-^{2\omega} - 2\delta_-^\omega)e^{i(2\delta_+^{2\omega} - 2\delta_+^\omega + \frac{\pi}{2})}.$$

This expression shows that the global handedness of the field vanishes when the relative phases satisfy $2\delta_-^{2\omega} - 2\delta_-^\omega = n\pi$ for integer n. On the other hand, the absolute value of the global handedness reaches a maximum when $2\delta_-^{2\omega} - 2\delta_-^\omega = (n+1)\pi/2$ for integer n, in accordance with Eq. (47). This condition is satisfied by the field shown in FIG. 11 of the main text. High harmonic response in propylene oxide. The inventors have adapted the method to describe high harmonic response in the chiral molecule propylene oxide, as in [3]. The macroscopic dipole driven in a medium of randomly oriented molecules results from the coherent addition of all possible molecular orientations, i.e.

$$D(N\omega) = \int d\Omega \int d\alpha \, D_{\Omega\alpha}(N\omega) \quad (49)$$

where ω is the fundamental frequency, N is the harmonic number, and $D_{\Omega\alpha}$ is the harmonic dipole associated with a given molecular orientation. The integration in the solid angle Ω was performed using the Lebedev quadrature of order 17. For each value of Ω, the integration in α was evaluated using the trapezoid method.

The contribution from each molecular orientation results from the coherent addition of all channel contributions [42]:

$$D_{\Omega\alpha}^{mn}(N\omega) = \sum_{mn} D_{mn}(N\omega) \tag{50}$$

where $D_{mn}$ is the contribution from a given ionization (m)—recombination (n) channel, in the frequency domain. the inventors have considered the electronic ground state of the ionic core (X) and the first three excited states (A, B and C), i.e. 16 channels, and found that only those involving ionization from the X and A states and recombination with the X, A and B states play a key role under the experimental conditions. The contribution from a single ionization-recombination burst can be factorized as a product of three terms:

$$D_{\Omega\alpha}^{mn}(N\omega) = a_{ion,\Omega\alpha}^{mn}(N\omega) \cdot a_{prop,\Omega\alpha}^{mn}(N\omega) \cdot a_{rec,\Omega\alpha}^{mn}(N\omega) \tag{51}$$

which are associated with strong-field ionization, propagation and radiative recombination, respectively.

Recombination amplitudes are given by $$a_{rec,\Omega\alpha}^{nm} = \left(\frac{2\pi}{i\partial^2 S_m(t_r, t_i, p)/\partial t_r^2}\right)^{1/2} e^{-iS_m(t_{r'},t_{i'},p)+iN\omega t_r} d_{rec,n}^{\Omega\alpha}(k(t_{i'})) \tag{52}$$

where $t_i = t_{i'} + it_{i''}$ and $t_r = t_{r'} + it_{r''}$ are the complex ionization and recombination times resulting from applying the saddle-point method, p represents the canonical momentum, which is related to the kinetic momentum by $k(t) = p(t) + A(t)$, $A(t)$ being the vector potential $(F(t) = -\partial A(t)/\partial t)$, $d_{rec,n}$ is the corresponding photore-combination matrix element, and $S_m$ is given by $$S_m(t, t', p) = \frac{1}{2}\int_{t'}^{t} d\tau [p + A(\tau)]^2 + IP_m(t - t') \tag{53}$$

Photorecombination matrix elements have been evaluated the static-exchange density functional theory (DFT) method.

Propagation amplitudes are given by $$a_{prop,\Omega\alpha}^{nm} = \left(\frac{2\pi}{i(t_r - t_i)}\right)^{3/2} e^{-iS_m(t_{r'},t_{i'},p)} a_{mn}^{\Omega\alpha}(t_{r'}, t_{i'}) \tag{54}$$

where $\alpha_{mn}^{\Omega\alpha}$ is the transition amplitude describing the laser-electron dynamics between ionization and recombination, which is obtained by solving the time-dependent Schrödinger equation numerically in the basis set of ionic states.

A reasonable estimation of the ionization amplitudes can be obtained using the following expression:

$$a_{ion,\Omega\alpha}^{nm} = 2\pi\left(\frac{1}{i\partial^2 S_m(t_r, t_i, p)/\partial t_i^2}\right)^{1/2} e^{-iS_m(t_{i'},t_i,p)} \mathcal{F}\{\Psi_m\}(\mathcal{R}\{k(t_{i'})\}) \tag{55}$$

where $F\{\Psi_m\}$ is the Fourier transform of the Dyson orbital associated with the initial state wave function $\Psi_m$. The evaluation of sub-cycle ionization amplitudes in organic molecules is very challenging because non-adiabatic and multi-electron effects influence the dynamics of laser-driven electron tunneling, and the estimations provided by Eq. (55) are not sufficiently accurate for the purpose of this work. Nonetheless, these quantities can be reconstructed from multi-dimensional HHG spectroscopy measurements, when available. Here the inventors have reconstructed the amplitudes and phases of the sub-cycle ionization amplitudes from the experimental results, using the estimations provided by Eq. (55) as a starting point for the procedure.

Evaluation of macroscopic chiral response The harmonic intensity in the far field has been evaluated using the Fraunhofer diffraction equation, i.e.

$$I(N\omega, \beta) \propto (N\omega)^4 \left|\int_{-\infty}^{\infty} D(N\omega, x)e^{-iKx}dx\right|^2 \tag{56}$$

where β is the far field angle (divergence), and K is given by $$K = \frac{N\omega}{c}\beta,$$

c being the speed of light, and $D(N\omega, x)$ is the harmonic dipole driven by the strong field in the focus (Eq. (49)), which has been computed along the transversal coordinate x using the procedure described in the previous section.

Accurate determination of the enantiomeric excess. Let us consider a macroscopic mixture of right handed and left handed molecules, with concentrations $C_R$ and $C_S$, respectively. The intensity of the odd harmonics, which is not enantiosensitive in the dipole approximation, depends on the total concentration of molecules, being proportional to $$I_{2N+1} \propto (C_R + C_S)^2 |D_{x,2N+1}|^2 \tag{57}$$

where $D_{x,2N+1}$ is dipole component along x, averaged over all molecular orientations. This component is essentially driven by the x component of the fundamental field. In other words, the dominant pathway giving rise to emission of even harmonics consists of the absorption of 2N+1 photons with frequency ω and x polarization. Thus, $I_{2N+1}$ is essentially unaffected by the presence of the second harmonic field, provided its intensity is weak.

Figure 16:
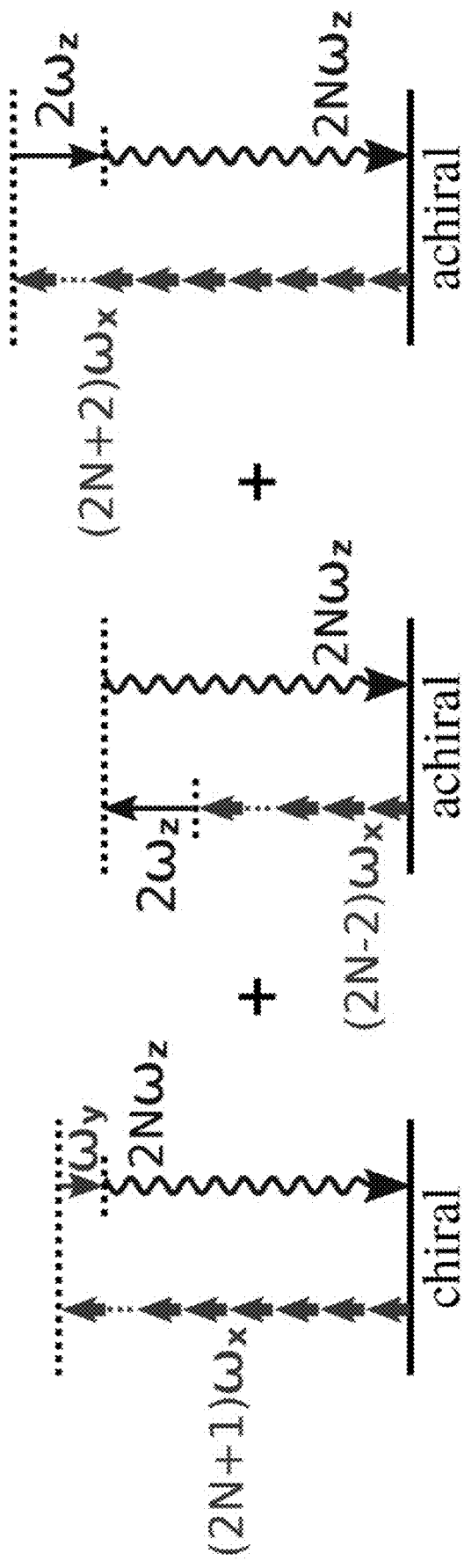
FIG. 16 presents the control over enantiosensitive high harmonic generation with locally chiral fields. Interference of chiral (left diagram) and achiral (central and right diagrams) pathways in even high harmonic generation.
Figure 17A:
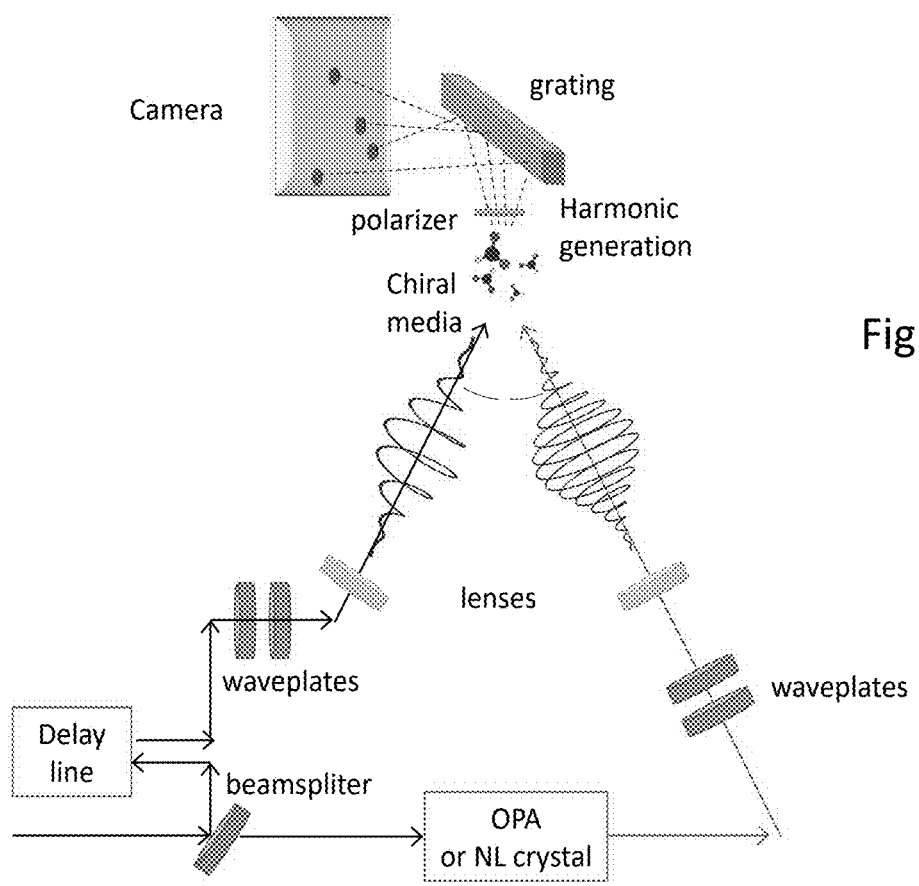
FIGS. 17A-17B present optional setups of optional layouts comprises two beams or one beam, with a compact and simple high numerical aperture objective (or reflective concave mirror) for introducing an angle larger than 10° between the beams and increase the intensity in the focal spot, according to exemplary embodiments.
Figure 17B:
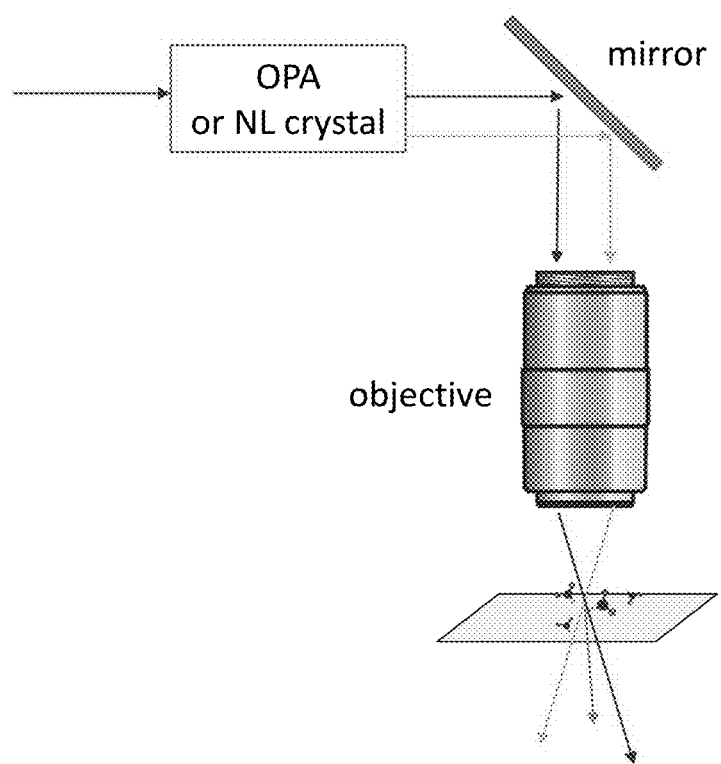
Figure 17C:
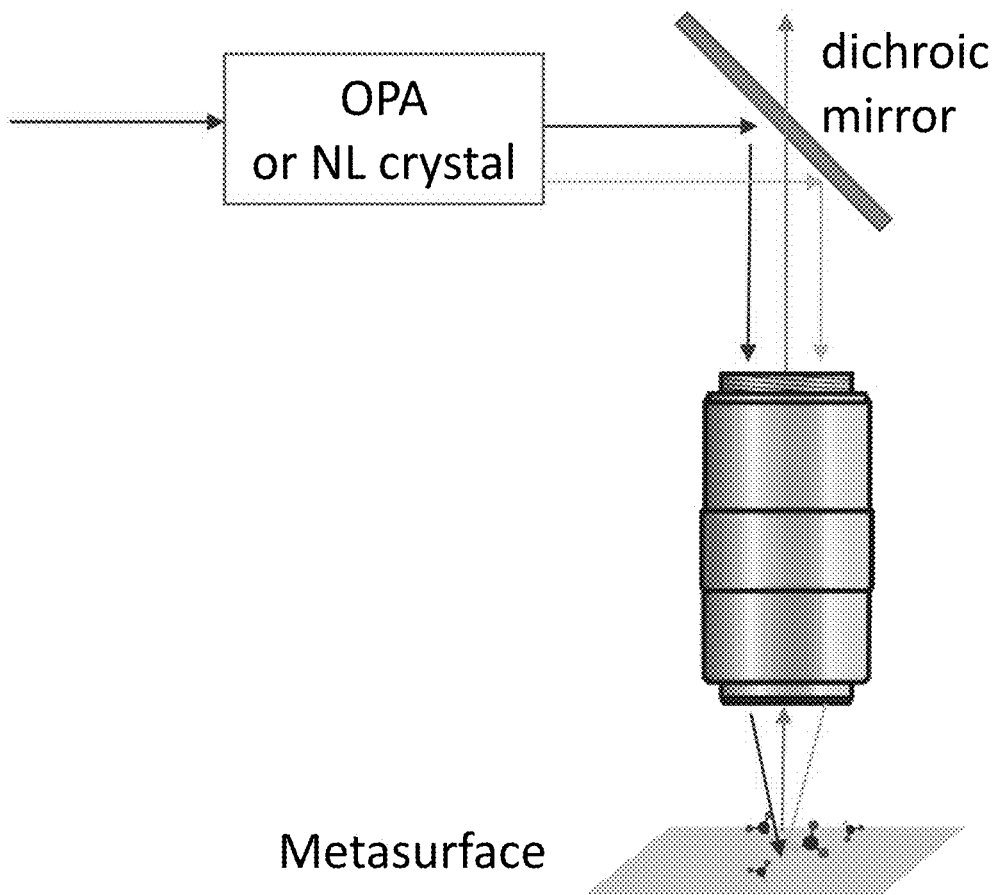
FIG. 17C presents an optional setup of optional layout providing for reflecting the emitted harmonics back to the objective for imaging the emitted harmonics, according to exemplary embodiments.
Figure 17D:
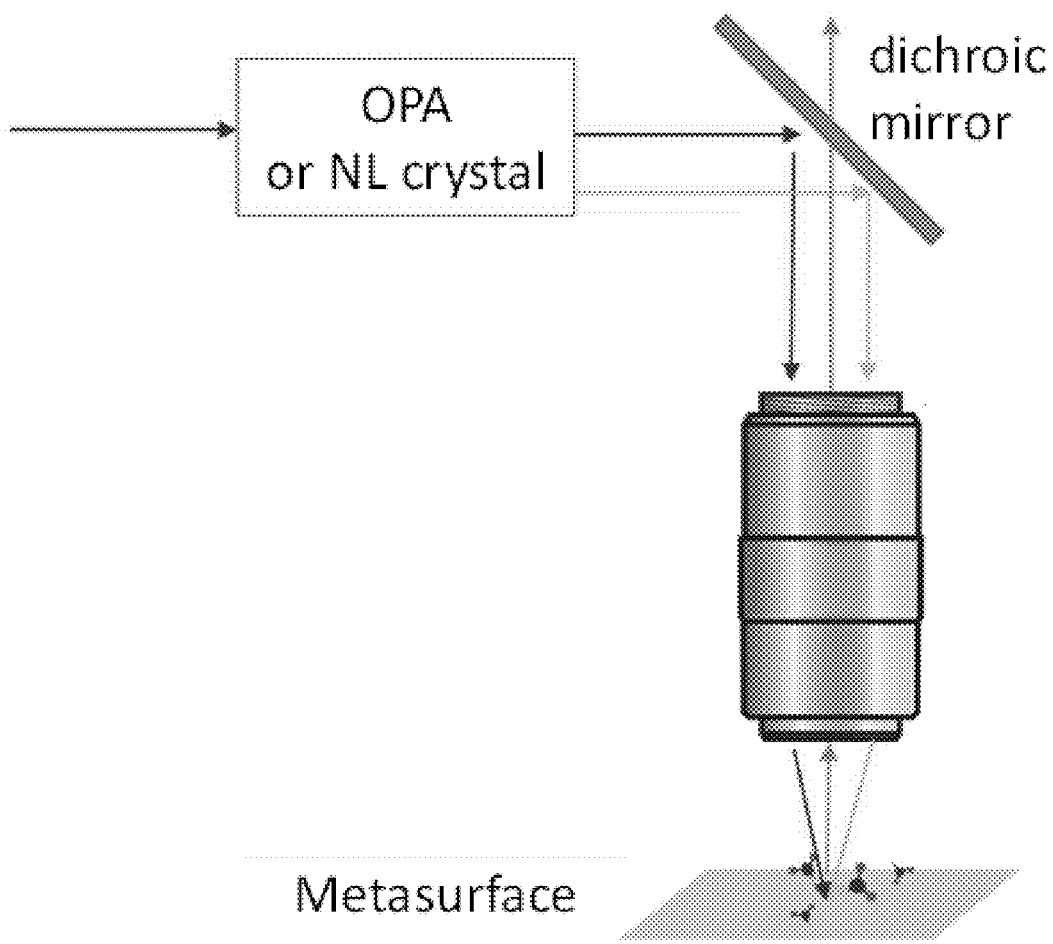
FIG. 17D presents an optional setup of optional layout with metasurfaces to change the polarization and spatial structure of the beams in order to control the field symmetry, wherein for cases where an analyte is located near field of the metasurface the interaction can be increased by the Purcell effect, according to exemplary embodiments.

Even harmonics are polarized along z, and they result from the interference between the chiral and achiral pathways depicted in FIG. 16 of the SI. The intensity of even harmonics is given by $$I_{2N} \propto |(C_R + C_S)D_{z,2N}^0 + (C_R - C_S)D_{z,2N}^{(R)}|^2 \tag{58}$$

where $D_{z,2N}^0$ is the non-enantiosensitive dipole component associated with the achiral pathways depicted in FIG. 7 of the SI and $D_{z,2N}^{(R)}$ is the enantiosensitive component associated with the chiral pathway, for the R enantiomer. The strength of chiral response depends on $(C_R-C_S)$ because the enantiosensitive dipole component is out of phase in opposite enantiomers, i.e. $D_{z,2N}^{(R)}=D_{z,2N}^{(S)}$. The effect of the second harmonic field on $D_{z,2N}^{(R)}$ is negligible, as this dipole component is driven by the fundamental. However, the achiral pathways giving rise to $D_{z,2N}^0$ involve the absorption or emission of one z-polarized photon of frequency $2\omega$, and thus this dipole component is controlled by the amplitude and phase of the second harmonic field. As the inventors show in the main text, the inventors can tune these parameters so that $D_{z,2N}^0 \simeq \pm D_{z,2N}^{(R)}$. If $D_{z,2N}^0 \simeq D_{z,2N}^{(R)}$, the ratio between consecutive harmonics can be written as $$\frac{I_{2N}}{I_{2N+1}} \propto (1+ee)^2 \frac{I_{2N}}{I_{2N+1}}\bigg|_{ee=0} \quad (59)$$

where ee is the enantiomeric excess, $$ee = \frac{C_R - C_S}{C_R + C_S}, \text{ and } \frac{I_{2N}}{I_{2N+1}}\bigg|_{ee=0}$$

is the intensity ratio between consecutive harmonics in a racemic mixture. Alternatively, one can adjust the amplitude and phase of the second harmonic field so that $D_{z,2N}^0 \simeq D_{z,2N}^{(S)}$, and then $$\frac{I_{2N}}{I_{2N+1}} \propto (1-ee)^2 \frac{I_{2N}}{I_{2N+1}}\bigg|_{ee=0} \quad (60)$$

Eqs. (59) and (60) provide an easy way to quantify the enantiomeric excess in macroscopic mixtures from a single measurement of the harmonic spectrum, with high accuracy and with sub-femtosecond time resolution. Note that, if ee>0, the inventors can determine its value more accurately if the inventors set $D_{z,2N}^0 \simeq D_{z,2N}^{(R)}$ and use Eq. (59), whereas setting $D_{z,2N}^0 \simeq D_{z,2N}^{(S)}$ and using Eq. (60) will provide a more accurate determination if ee<0 (see FIG. 13F).

Supplementary Information

1 Benchmark of Quantitative Model for High Harmonic Response in Propylene Oxide

Figure 14A:
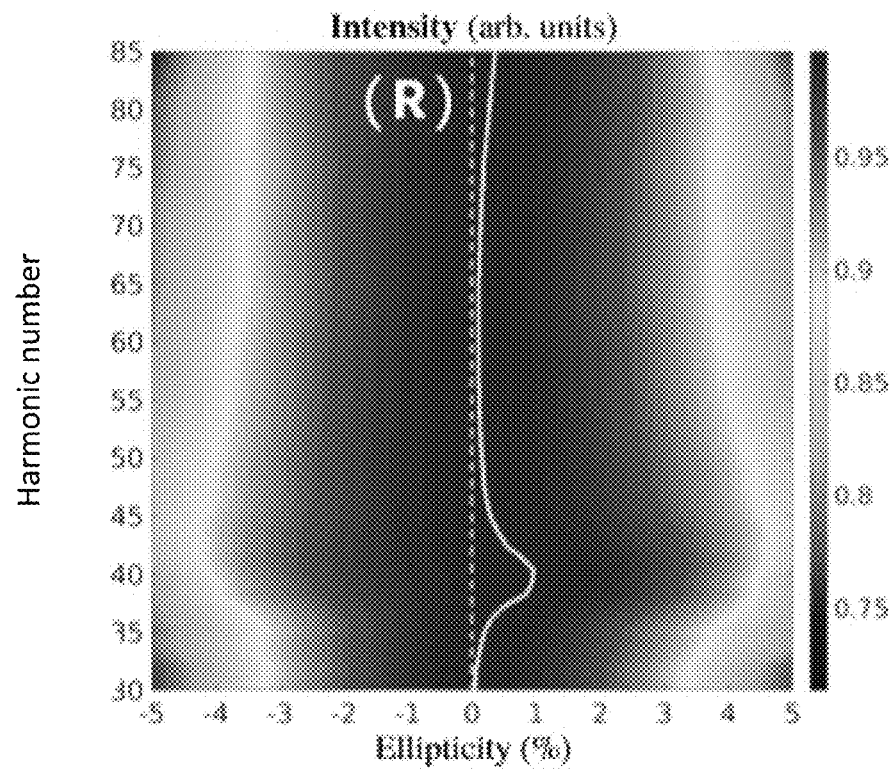
FIGS. 14A-C present high-order harmonic intensity emitted by randomly oriented R and S propylene oxide molecules in elliptically polarized laser fields with intensity $I_0=5\cdot10^{13}$ W cm$^{-2}$ and wavelength $\lambda=1770$ nm (see Methods for detail of the calculations). For each harmonic number, the intensity is normalized to its maximum value. The values of ellipticity that maximize the harmonic intensity are represented with a white line (FIG. 14A-B). Time-resolved chiral response: theoretical results of this work (black line) and experimental values (green line) (FIG. 14C). The shaded area represents the uncertainty of the experimental measurements.
Figure 14B:
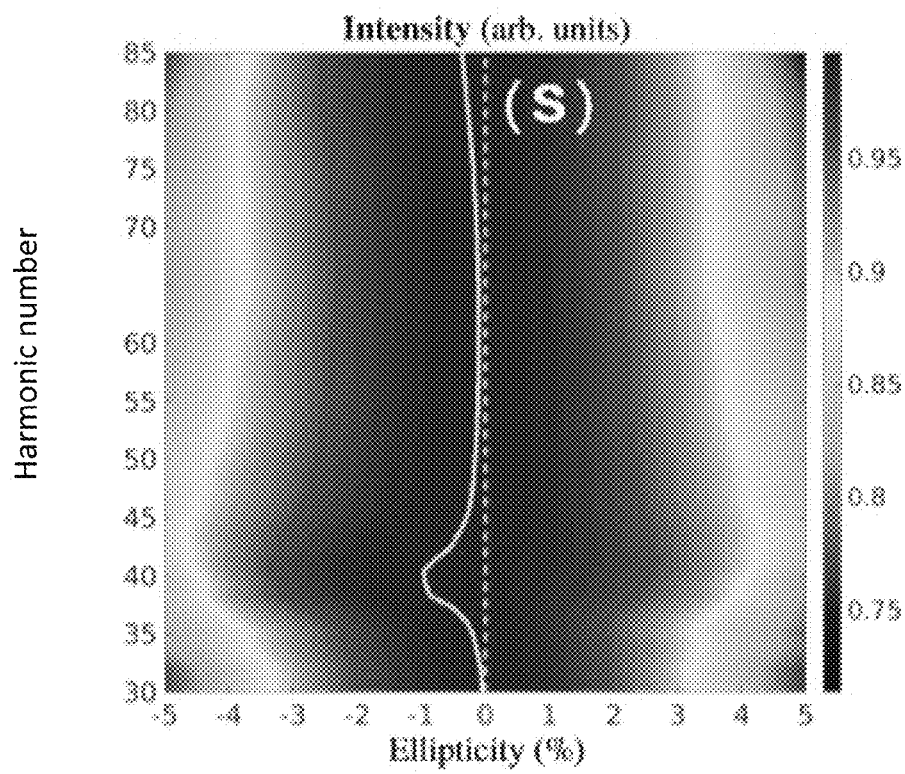
Figure 14C:
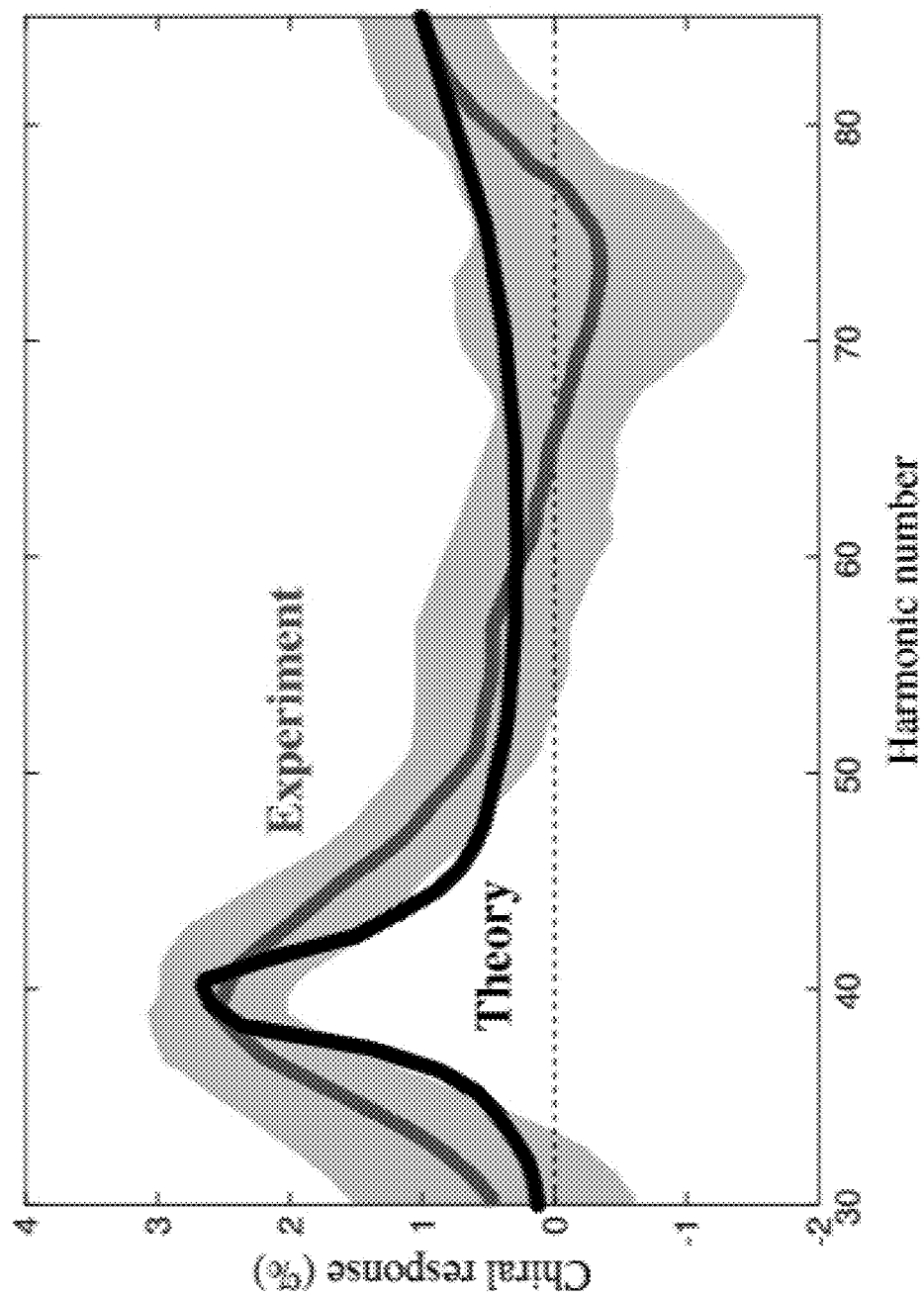

The quantitative model for evaluating high harmonic response in propylene oxide (see Methods) used in this work has been benchmarked against the experimental results, which recorded the harmonic emission from randomly oriented molecules in elliptically polarized laser fields. FIG. 14A-B contains the calculated high harmonic intensity for right-handed and left handed propylene oxide molecules as functions of harmonic number and ellipticity. The agreement with the experimental results is excellent. Our quantitative model reproduces very well the chiral response around H40 and near the cutoff, which could not be explained within the simplified picture. Note that the origin of chiral response in elliptical HHG relies on the interplay between electric and magnetic dipole interactions, and thus it is not very strong (around 2-3%). The use of locally chiral fields can enhance chiral response by two orders of magnitude, as the inventors show in the main text.

Figure 5C:
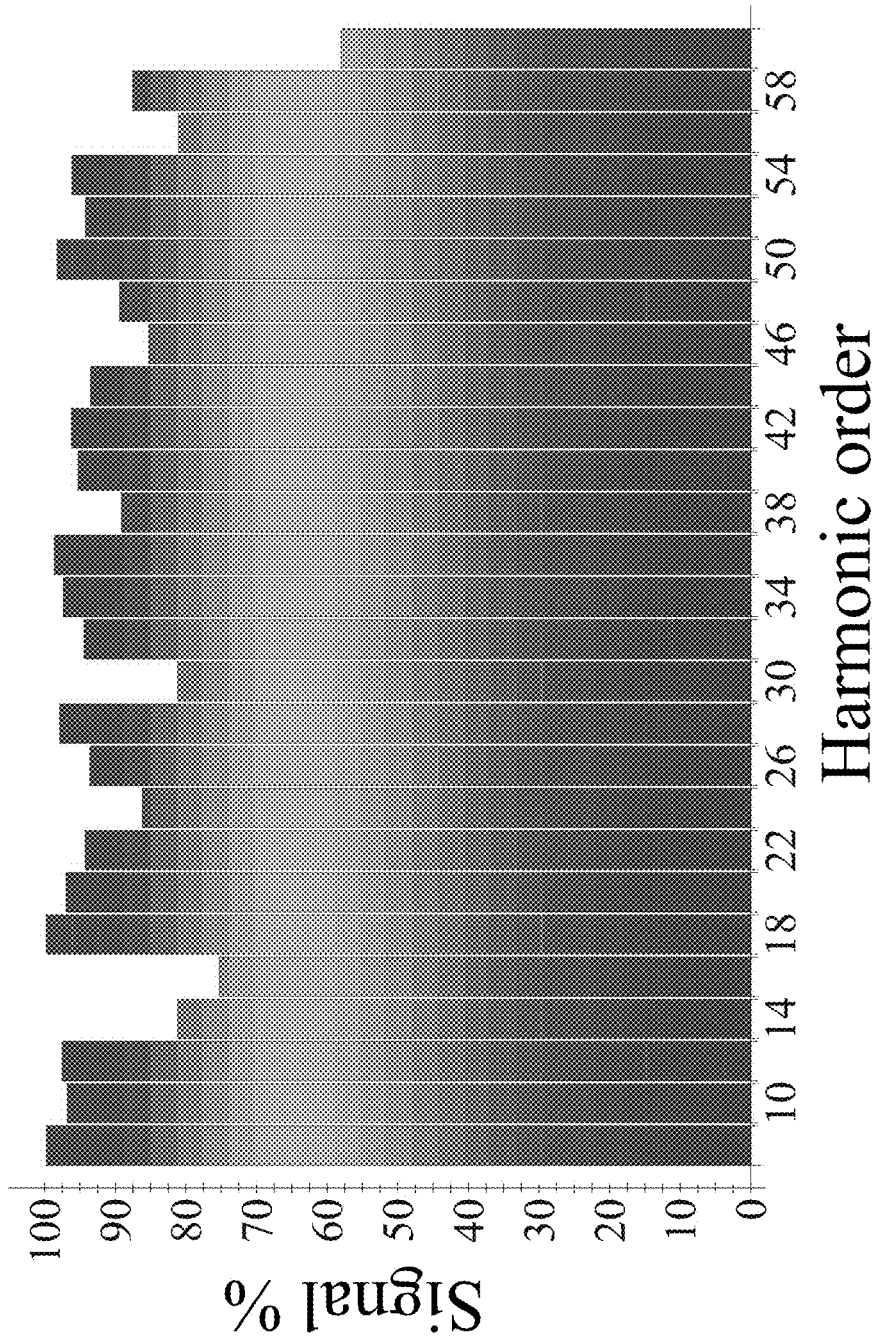
Figures 5D, 5E:
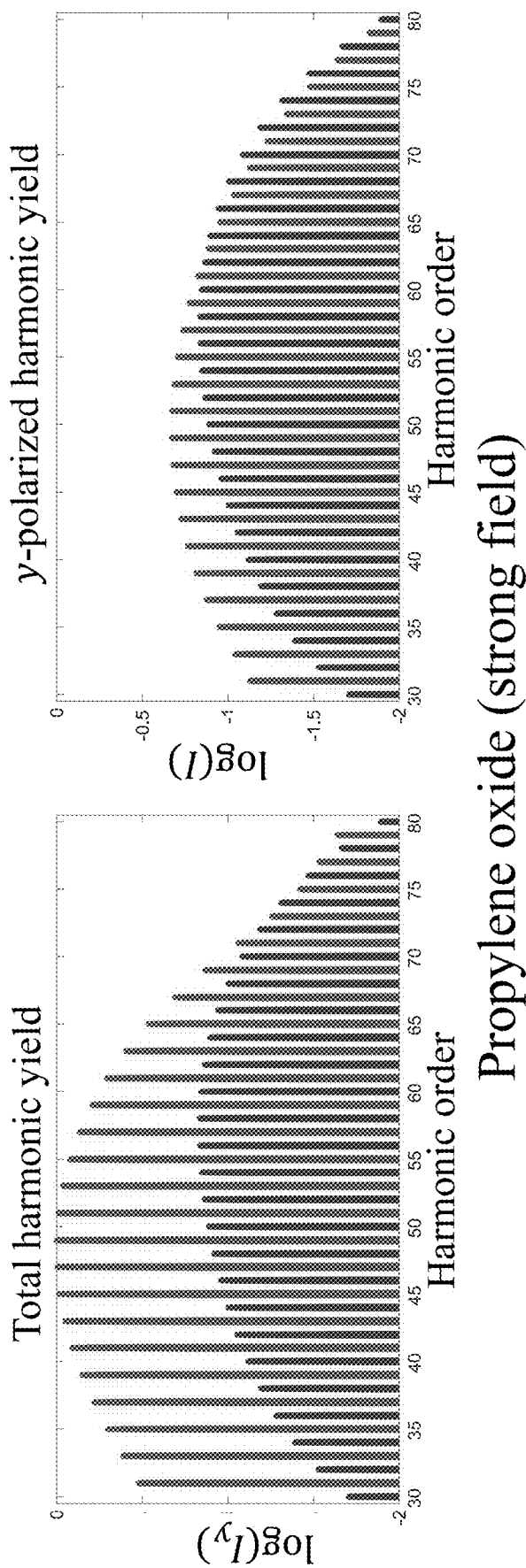

Chiral response in HHG driven by weakly elliptically polarized fields is proportional to the ellipticity that maximizes harmonic signal [13], and it is given by $$S(N) \simeq 2\frac{\varepsilon_0(N)}{\sigma^2} \quad (61)$$

where $\varepsilon_0$ is the value of ellipticity that maximizes the harmonic signal, for a given harmonic number N, and $\sigma$ describes the Gaussian decay of the harmonic signal with ellipticity. The values of S(N) evaluated using the numerical results presented in FIG. 14A-B B are shown in FIG. 5c. The agreement between theory and experiment is excellent in the whole range of harmonic numbers, i.e. for all recombination times.

2 Higher Order Chiral-Field Correlation Functions

Higher order chiral-field correlation functions $h^{(n)}$ control the sign of the enantio-sensitive and dichroic response in multiphoton interactions. Here, the inventors consider higher-order (n>5) correlation functions $h^{(n)}$ for the locally chiral field Eq. (2) employed in our work. The inventors show that for such field $h^{(n)}$ has a unique form in every order, which is helpful for achieving the ultimate control.

The n-th order chiral correlation function in the time domain is defined as $$H^{(n)}(0, \tau_1, \ldots, \tau_{n-1}) \equiv \quad (62)$$

$$\frac{1}{\sqrt{2\pi}} \int dt \{F(t) \cdot [F(t+\tau_1) \times F(t+\tau_2)]\} \times [F(t+\tau_3) \cdot F(t+\tau_4)]$$

$$\ldots [F(t+\tau_{n-2}) \cdot F(t+\tau_{n-1})]$$

for n≥3 odd. The Fourier transform with respect to all variables $\tau_i$ yields the n-th order chiral correlation function in the frequency domain:

$$h^{(n)}(\omega_0, \omega_1, \ldots, \omega_{n-1}) = \frac{1}{(\sqrt{2\pi})^n} \quad (63)$$

$$\int d\tau_1 \ldots \int d\tau_{n-1} e^{i\omega_1 \tau_1} \ldots e^{i\omega_{n-1}\tau_{n-1}} H^{(n)}(0, \tau_1, \ldots, \tau_{n-1}) =$$

$$\{F(\omega_0) \cdot [F(\omega_1) \times F(\omega_2)]\} \times [F(\omega_3) \cdot F(\omega_4)]$$

$$\ldots [F(\omega_{n-2}) \cdot F(\omega_{n-1})]$$

where $\omega_0$, is defined by the equation $$\sum_{i=0}^{n-1} \omega_i = 0 \quad (64)$$

The inventors now consider all possible permutations of the frequencies in $h^{(n)}$, which is equivalent to considering all possible permutations of times in $H^{(n)}$. The inventors will show that the handedness of the field employed in our work [see Eq. (23) in Methods] is invariant with respect to such permutations.

The seventh-order chiral-field correlation function reads as:

$$h^{(7)}(\{\omega_0, \omega_1, \omega_2\}, [\omega_3, \omega_4], [\omega_5, \omega_6]) = \quad (65)$$

$$\{F(\omega_0) \cdot [F(\omega_1) \times F(\omega_2)]\} \times [F(\omega_3) \cdot F(\omega_4)][F(\omega_5) \cdot F(\omega_6)]$$

where the inventors grouped the frequency arguments of $h^{(7)}$ with curly and squared brackets to improve readability. In this case there are new symmetries, the inventors can exchange $\omega_3$ with $\omega_5$ and $\omega_4$ with $\omega_6$ simultaneously, or $\omega_3$ with $\omega_6$ and $\omega_4$ with $\omega_5$ simultaneously. Again, the first step is to make sure that the triple product is non-zero, which yields the same four triple products the inventors got for $h^{(5)}$ (see Methods). But this time, if the inventors choose $\omega_0 = 2\omega$, $\omega_1 = -\omega$, and $\omega_2 = \omega$, instead of one the inventors get five different options that satisfy Eq. (25) for the rest of the frequencies:

$$h_{a_1}^{(7)} = h^{(7)}(\{-2\omega, -\omega, \omega\}, [\omega, \omega], [-\omega, \omega]), \quad (66)$$

$$h_{a_2}^{(7)} = h^{(7)}(\{-2\omega, -\omega, \omega\}, [-2\omega, 2\omega], [\omega, \omega]), \quad (67)$$

$$h_{a_3}^{(7)} = h^{(7)}(\{-2\omega, -\omega, \omega\}, [-\omega, -\omega], [2\omega, 2\omega]), \quad (68)$$

$$h_{a_4}^{(7)} = h^{(7)}(\{-2\omega, -\omega, \omega\}, [-2\omega, \omega], [\omega, 2\omega]), \quad (69)$$

$$h_{a_5}^{(7)} = h^{(7)}(\{-2\omega, -\omega, \omega\}, [-\omega, 2\omega], [-\omega, 2\omega]). \quad (70)$$

Since the triple product can be written in three additional different forms (see analogous discussion for $h^{(5)}$ in Methods) there are a total of 20 different possible versions of $h^{(7)}$: $h_{a_i}^{(7)}$, $h_{b_i}^{(7)}$, $h_{c_i}^{(7)}$, and $h_{d_i}^{(7)}$, with $1 \leq i \leq 5$. If the inventors now consider the interaction with matter and limit the number of $2\omega$ photons to a maximum of one, i.e. the inventors consider the $2\omega$ component to be much weaker than the $\omega$ component $|F_z| \ll |F_x|$, the inventors are left only with $h_{a_1}^{(7)}$, $h_{b_1}^{(7)}$, $h_{c_1}^{(7)}$, and $h_{d_1}^{(7)}$. These four options are related to each other the same way that $h_a^{(5)}$, $h_b^{(5)}$, $h_c^{(5)}$ and $h_d^{(5)}$ were related to each other [see Eqs. (26)-(32) and the corresponding discussion in Methods], and therefore the inventors arrive to the same conclusion as for $h^{(5)}$: up to a sign and complex conjugation, there is a unique expression for $h^{(7)}$ given by [see Eqs (23) in Methods]

$$h_{a_1}^{(7)} = 2iF_x F_y F_z (F_x^2 - F_y^2)(F_x^2 + F_y^2) e^{2i(\delta_{2\omega} - \delta_\omega)}. \quad (71)$$

The next order chiral measure reads as $$h^{(9)}(\{\omega_0, \omega_1, \omega_2\}, [\omega_3, \omega_4], [\omega_5, \omega_6], [\omega_7, \omega_8]) = \quad (72)$$

$$\{F(\omega_0) \cdot [F(\omega_1) \times F(\omega_2)]\} \times [F(\omega_3) \cdot F(\omega_4)][F(\omega_5) \cdot F(\omega_6)]$$

$$[F(\omega_7) \cdot F(\omega_8)]$$

As for the seventh-order case, the inventors obtain some new (trivial) symmetries derived from the commutativity of scalar products. If the inventors allow only a single $2\omega$ photon and choose $\omega_0 = -2\omega$, $\omega_1 = -\omega$, and $\omega_2 = \omega$ then the possible options for $h^{(9)}$ are $$h_{a_1}^{(9)} = h^{(9)}(\{-2\omega, -\omega, \omega\}, [\omega, \omega], [-\omega, \omega], [-\omega, \omega]), \quad (73)$$

$$h_{a_2}^{(9)} = h^{(9)}(\{-2\omega, -\omega, \omega\}, [\omega, \omega], [-\omega, -\omega], [\omega, \omega]). \quad (74)$$

Like before, since the triple product can be written in three additional different forms there are a total of 8 different possible versions of $h^{(9)}$ that involve a single $2\omega$ photon (absorbed or emitted): $h_{a_i}^{(9)}$, $h_{b_i}^{(9)}$, $h_{c_i}^{(9)}$, and $h_{d_i}^{(9)}$, with $i=1,2$; related to each other as in the case of $h^{(5)}$ [see Eqs. (26)-(32) and the corresponding discussion in Methods]. The explicit expressions for $h_{a_1}^{(9)}$ and $h_{a_2}^{(9)}$ read as [see Eq. (23) in Methods]

$$h_{a_1}^{(9)} = 2iF_x F_y F_z (F_x^2 - F_y^2)(F_x^2 + F_y^2)^2 e^{2i(\delta_{2\omega} - \delta_\omega)} \quad (75)$$

$$h_{a_2}^{(9)} = 2iF_x F_y F_z (F_x^2 - F_y^2)^3 e^{2i(\delta_{2\omega} - \delta_\omega)} \quad (76)$$

If the inventors impose small ellipticity $|\in| \equiv |F_y/F_x| \ll 1$, then to first order in $\in$ the inventors get $F_x^2 \pm F_y^2 \approx F_x^2$ and therefore $h_{a_1}^{(9)} = h_{a_2}^{(9)}$, which leaves a unique expression for $h^{(9)}$ up to a sign and complex conjugation:

$$h_{a_1}^{(9)} = 2iF_x^7 F_y F_z e^{2i(\delta_{2\omega} - \delta_\omega)}. \quad (77)$$

Higher-order measures will follow the same pattern and will not introduce any new feature provided the inventors enforce the restrictions $|F_y|$, $|F_z| \ll |F_x|$, which is satisfied by the field employed in our work to demonstrate the highest possible degree of control over enantio-sensitive light matter interactions (see FIGS. 3 and 4 of the main text).

3 Another Example of Locally Chiral Field: Counter-Rotating Bi-Elliptical Field

Figure 15A:
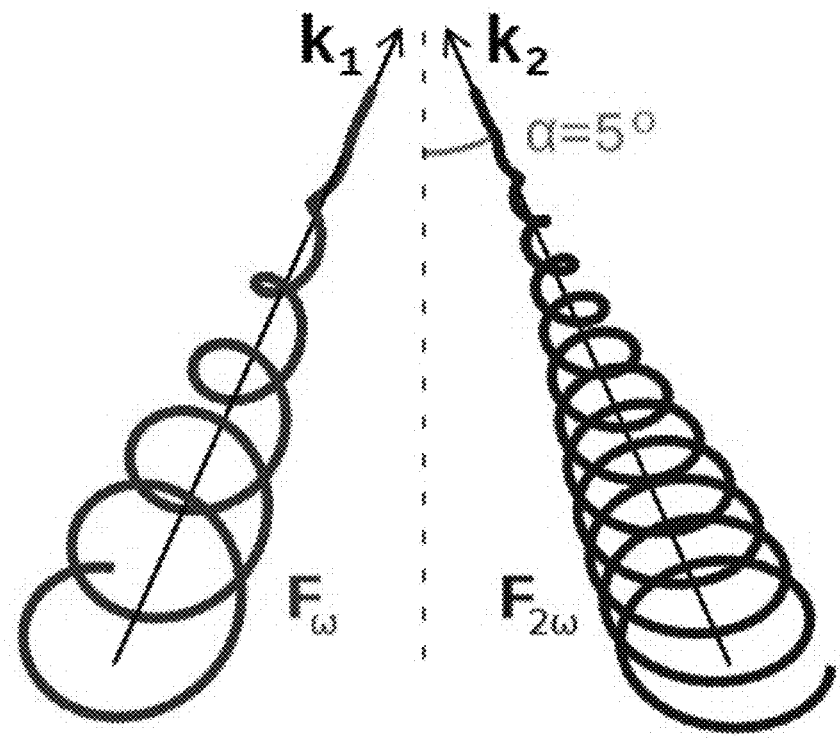
FIGS. 15A-D present enantiosensitive response from a randomly oriented CBrClFH molecule: Setup using counter-rotating elliptically polarized $\omega$ and $2\omega$ fields (FIG. 15A), generating the locally chiral field shown in panel (FIG. 15B) for $\phi_{\omega,2\omega}=-\pi/3$ (upper image) and $27\pi/3$ (central and bottom images). The bottom image has been rotated 180° around the y axis to show that the fields for $\phi_{\omega,2\omega}=-\pi/3,2\pi/3$ are mirror images.
Figure 15B:
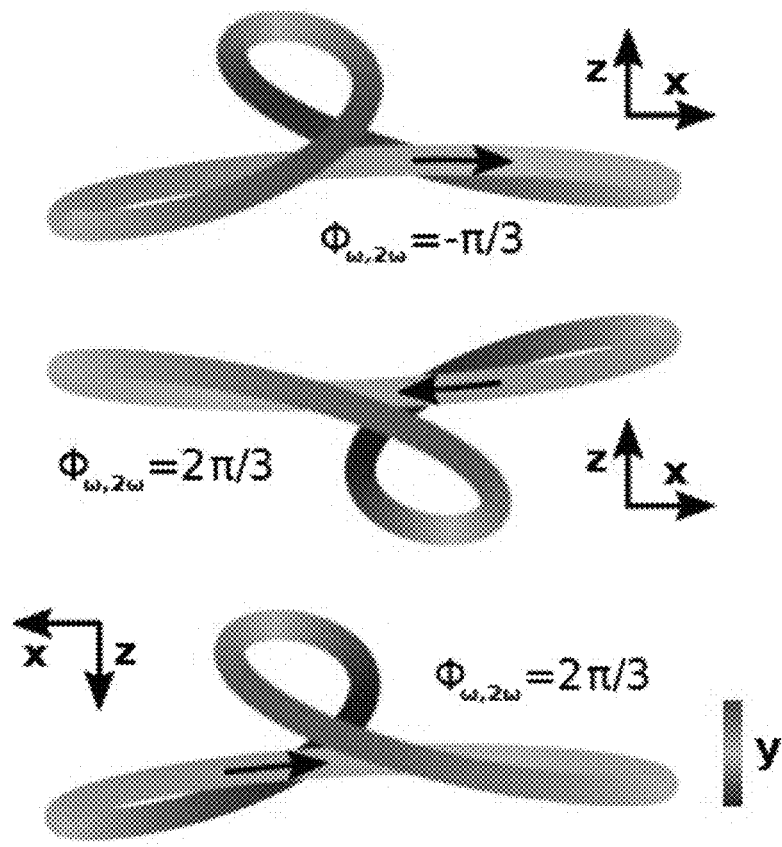
Figure 15C:
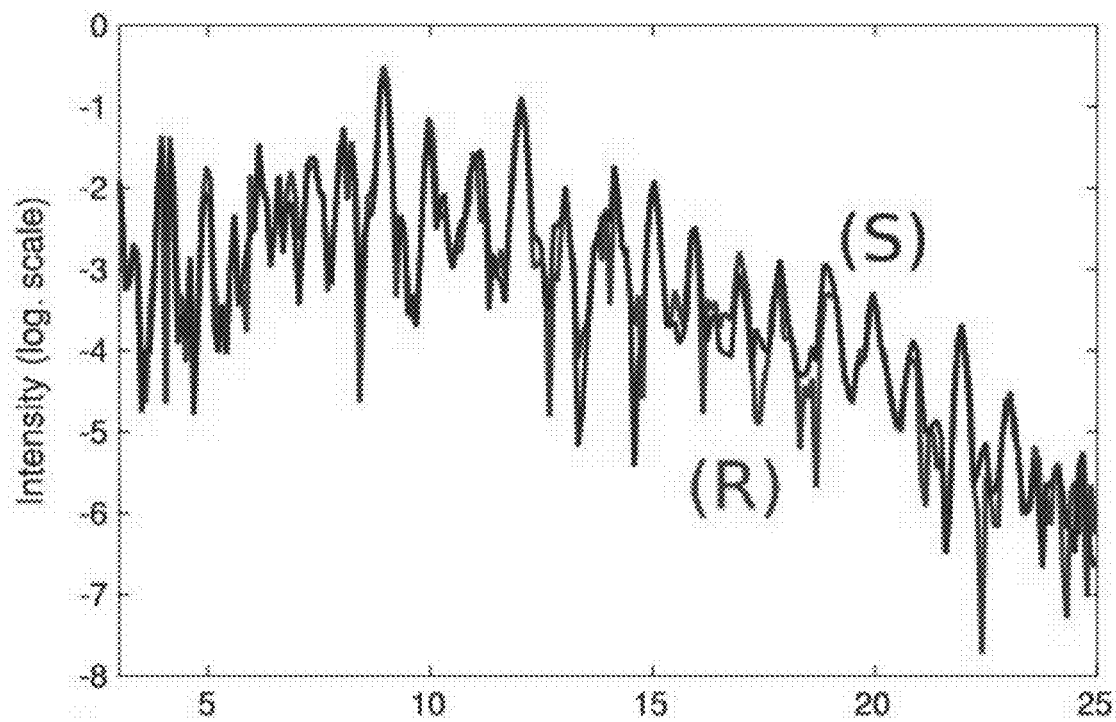
Figure 15D:
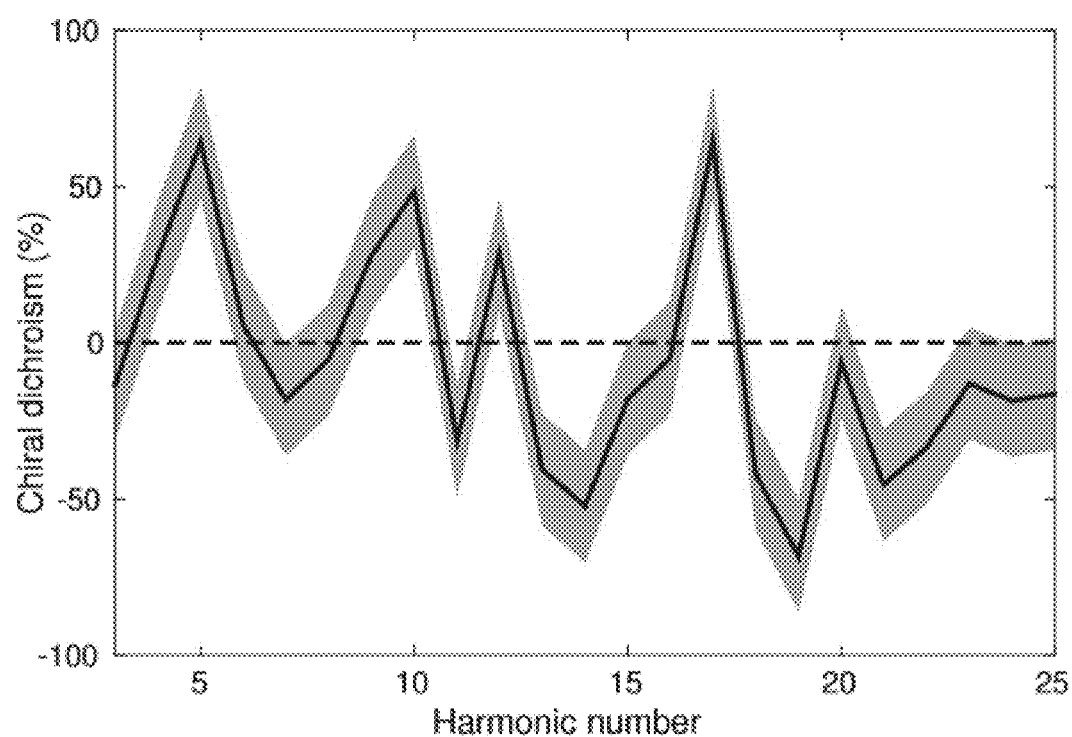

The simple field shown in FIG. 10a of the main text is only one example of a locally chiral field. FIG. 15A-B presents an alternative locally chiral field that has different properties. This field results from combining two counter-rotating elliptically polarized drivers with frequencies $\omega$ and $2\omega$ that propagate in different directions, with their polarization planes creating a small angle $\alpha$ (see FIG. 15A).

The electric fields can be written at the focus as [10]

$$F_1(r, t) = \frac{1}{2} F_{1,0} e^{-\rho_1^2/\bar{\omega}^2} e^{i(k_1 \cdot r - \omega t - \delta_\omega)}(\hat{e}_1 + i\varepsilon_1 \hat{z}) + c.c. \quad (78)$$

$$F_2(r, t) = \frac{1}{2} F_{2,0} e^{-\rho_2^2/\bar{\omega}^2} e^{i(k_2 \cdot r - 2\omega t - 2\delta_{2\omega})}(\hat{e}_2 - i\varepsilon_2 \hat{z}) + c.c. \quad (79)$$

where $F_{n,0}$ is the electric field amplitude, $\varepsilon_n$ is the ellipticity, $\rho_n$ is the radial distance to beams' axis, $\bar{\omega}$ is the waist radius, the propagation vectors are defined as $k_1 = k \sin(\alpha)\hat{x} + k \cos(\alpha)\hat{y}$ and $k_2 = -2k \sin(\alpha)\hat{x} + 2k \cos(\alpha)\hat{y}$, where $$k = \frac{2\pi}{\lambda},$$

$\lambda$ being the fundamental wavelength, and the polarization vectors are given by $\hat{e}_1 = \cos(\alpha)\hat{x} - \sin(\alpha)\hat{y}$ and $\hat{x}_2 = \cos(\alpha)\hat{x} +$ $\sin(\alpha)\hat{y}$. The locally chiral field resulting from combining both beams can be written as $$F(r, t) = F_0 e^{-\rho_1^2/\bar{\omega}^2}[f_1(r, t) + f_2(r, t)] \qquad (80)$$

where the inventors have assumed $F_0 = F_{1,0} = F_{2,0}$ and that $\rho = \rho_1 \simeq \rho_2$ at the focus; $f_1$ and $f_2$ are $$f_1(r, t) = \frac{1}{2} e^{i(\Phi_1 - \omega t)}(\hat{e}_1 + i\varepsilon_1 \hat{z}) + c.c. \qquad (81)$$

$$f_2(r, t) = \frac{1}{2} e^{2i(\Phi_2 - \omega t)}(\hat{e}_2 - i\varepsilon_2 \hat{z}) + c.c. \qquad (82)$$

with $$\Phi_1 = k\sin(\alpha)x + k\cos(\alpha)y - \delta_\omega \qquad (83)$$

$$\Phi_2 = -k\sin(\alpha)x + k\cos(\alpha)y - \delta_{2\omega} \qquad (84)$$

The handedness of this locally chiral field depends on the relative phase between the two colours $$\Delta\Phi = \Phi_2 - \Phi_1 = -2k\sin(\alpha)x + \delta_\omega - \delta_{2\omega} \qquad (85)$$

Note that this relative phase does not depend on the direction of light propagation y because $$\frac{k_1 \cdot y}{\omega_1} = \frac{k_2 \cdot y}{\omega_2},$$

but it depends on the transversal coordinate x, as $$\frac{k_1 \cdot x}{\omega_1} \neq \frac{k_2 \cdot x}{\omega_2}.$$

Thus, the handedness of the locally chiral field changes along the x direction and is not maintained globally in space. FIG. 6b of the main text shows that changing the phase shift $\Delta\Phi$ by $\pm\pi/2$ rad transforms the locally chiral field into its mirror image. This means that the field has opposite handedness at positions (x, y, z) and (x+$\Delta\Delta$x, y', z'), with $$\Delta x = \frac{\lambda}{8\sin(\alpha)}.$$

In order to illustrate that this locally chiral field can drive enantiosensitive response in chiral media, the inventors have performed calculations for randomly oriented bromochlorofluoromethane molecules using Time Dependent Density Functional Theory, implemented in Octopus. The inventors employed the Perdew-Burke-Ernzerhof exchange-correlation functional of the generalized gradient approximation and pseudopotentials for the Br, Cl, F, and C atoms. FIG. 6c shows the single-molecule high harmonic response of enantiopure, randomly oriented media of left and right handed bromochlorofluoromethane molecules. To demonstrate enantiosensitivity in odd harmonic frequencies, the inventors have applied a polarization filter and show the intensity of the z-polarized radiation. The calculated single-molecule high harmonic response shows extremely high degree of chiral dischroism in even and odd harmonic orders, reaching 60%. The error bars at the level of 20% are associated with limited number of molecular orientations used for averaging over orientations. The extreme computational cost of these calculations makes optimization of enantio-sensitive response prohibitively expensive. In contrast to the field in FIG. 10, this field is not globally chiral, as its handedness periodically alternates in space, see below.

3.1 Analysis of Local and Global Handedness of Counter-Rotating Bi-Elliptical Field Here the inventors apply the chiral correlation function $h^{(5)}$ [see Eq. (24)] to illustrate the properties of the locally chiral field in Eq. (80) from this perspective. The analysis of the field correlation function $h^{(5)}$ shows that this locally chiral field carries different elements of chirality, which manifest itself in two types of correlation functions. [see Eq. (25)]

$$h_a^{(5)} = h^{(5)}(-2\omega, -\omega, \omega, \omega, \omega) \qquad (86)$$

$$h_b^{(5)} = h^{(5)}(-\omega, -2\omega, 2\omega, 2\omega, -\omega) \qquad (87)$$

Other options are related to either of these two by a change of sign, by complex conjugation, or by both as discussed in Methods. Note that the second option was not available for the field discussed in the main text because this option requires the 2ω field to be elliptically polarized. Furthermore, it requires more than one 2ω photon. Replacing Eq. (80) in Eqs. (86) and (87) yields $$h_a^{(5)} = 2i\left(\frac{F_0}{2}\right)^5 \varepsilon_1(1-\varepsilon_1^2)\sin(2\alpha) e^{i[4kx\sin\alpha + 2(\delta_{2\omega} - \delta_\omega)]}, \qquad (88)$$

$$h_b^{(5)} = -2i\left(\frac{F_0}{2}\right)^5 \varepsilon_2 \sin(2\alpha)[\cos(2\alpha) + \varepsilon_1\varepsilon_2] e^{i[-4kx\sin\alpha - 2(\delta_{2\omega} - \delta_\omega)]}. \qquad (89)$$

Interestingly, $h_a^{(5)}$ is independent of the ellipticity of the 2ω beam. The inventors can also see from these expressions that the inventors can obtain a locally chiral field with a unique $h^{(5)}$ by setting either of the two ellipticities to zero. That is, the fields with either $\varepsilon_1$ or $\varepsilon_2$ equal to zero are also locally chiral. Two different versions of $h^{(5)}$ mean that the field displays chirality at two different levels, i.e. like a helix made of a tighter helix. Finally, from these expressions it is clear that $h_a^{(5)}$ and $h_b^{(5)}$ oscillate as a function of x with a frequency 4 k sin α, in agreement with the reasoning in the previous section. The global handedness, which obtains as a space-averaged value of correlation functions (Eq. (88), (89)) is zero in case of this field.

4 Control Over Chiral Light Matter Interaction in the Strong Field Regime

Here the inventors describe the mechanism of control over enantionsensitive high harmonic generation. Even harmonic generation driven by the locally chiral field employed in the main text (1, 2, 3 and 4) results from the interference between the achiral and chiral pathways depicted in FIG. 16. The chiral pathway (left diagram) describes the enantiosensitive response driven by the elliptically polarized ω field in the direction orthogonal to the plane of polarization, which is not affected by the presence of the second harmonic field.

There are two possible achiral pathways giving rise to even harmonic generation. One of them (central diagram in FIG. 16) involves the absorption of 2N−2 photons of α frequency and x polarization, absorption of a photon of 2ω frequency and z polarization and emission of a 2N harmonic with z polarization. The polarization associated with this process can be written as $$P_{2N}^{\uparrow} = P_{2N-2}\chi_{\uparrow}^{(1)}F(2\omega) = a_{\uparrow}e^{i\delta}\hat{z} \qquad (90)$$

where $P_{2N-2}$ is a scalar describing the absorption of 2N−2 photons with x polarization, that depends on the properties of the molecule and of the strong field component, $\chi_{\uparrow}^{(1)}$ is the first order susceptibility of the system dressed by the ω field describing the absorption of a 2ω photon with z polarization, and $\alpha_{\uparrow}=P_{2N-2}\ X_{\uparrow}^{(1)}|F(2\omega))\cdot\hat{z}|$. The relative phase between the two colours δ fully controls the phase of $P_{2N}^{\uparrow}$.

Let us consider now the alternative achiral pathway (right diagram in FIG. 16) involving the absorption of 2N+2 x-polarized photons of ω frequency, emission of a z-polarized photon of 2ω frequency and emission of a z-polarized 2N harmonic of the fundamental frequency. The polarization term associated with this pathway is $$P_{2N}^{\downarrow} = P_{2N+2}\chi_{\downarrow}^{(1)}F^*(2\omega) = a_{\downarrow}e^{-i\delta}\hat{z} \qquad (91)$$

where $\alpha_{\downarrow}=P_{2N+2}\ X_{\downarrow}^{(1)}|F^*(2\omega)\cdot\hat{z}|$. The arrows ↓ and ↓ indicate whether the 2ω photon is absorbed or emitted.

The total achiral contribution to polarization at 2Nω frequency is given by $P_{2N}^{\uparrow\downarrow}=P_{2N}^{\uparrow}\alpha P_{2N}^{\downarrow}$. If one of the two pathways is dominant, then δ fully controls the phase of $P_{2N}^{\uparrow\downarrow}$. If both pathways are equally intense, i.e. $\alpha_{\uparrow}=\alpha_0 e^{i\phi\uparrow}$ and $\alpha_{\downarrow}=\alpha_0 e^{i\phi\downarrow}$, then the inventors have $$P_{2N}^{\uparrow\downarrow} = a_0(e^{i\phi_\uparrow}e^{i\delta} + e^{i\phi_\downarrow}e^{-i\delta})\hat{z} = 2a_0 e^{i\phi_+}\cos(\phi_- - \delta)\hat{z} \qquad (92)$$

$$\text{where } \phi_\pm = \frac{\phi_\downarrow \pm \phi_\uparrow}{2}.$$

Here the inventors control the amplitude and the sign of the achiral contribution in full range. The phase control is associated with the dependence of the phase of the recombination matrix element on the direction of electron approach (in the molecular frame). Further, once one includes changes in ionization and recombination times due to the presence of the 2ω field, one finds δ—dependent corrections to the Volkov phase and thus the phase of a given harmonic.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of detecting a chiral characteristic of a randomly oriented analyte, the method comprising:
   illuminating the analyte with at least two laser beams non-collinearly to generate a laser field at an interaction region;
   receiving at least one spectral line of a harmonic emission signal indicative of chirality resulting from an electric dipole interaction between the laser field and the analyte at the interaction region;
   measuring a characteristic of an electric field of the at least one spectral line; and
   determining the chiral characteristic of said analyte based on said measured characteristics of the at least one spectral line.

2. The method of claim 1, wherein the laser field exhibits any one of the following symmetry properties:
   (i) static reflection symmetry;
   (ii) dynamical reflection symmetry;
   (iii) dynamical inversion symmetry;
   (iv) dynamical improper rotational symmetry; and
   (v) lack of inversion, reflection, and improper-rotation symmetry, wherein the laser field is locally chiral at said interaction.

3. The method of claim 1, wherein said determining the chiral characteristic of the analyte is based on a model that assumes any one of: (i) electric dipole interaction between the laser field and the analyte; and (ii) that the laser field exhibit the said symmetry properties.

4. The method of claim 1, wherein said electric field of the laser is generated by any one of:
   (a) illuminating at least two laser beams non-collinearly, wherein at least one of the following is controlled: (i) one or more of the wavelengths of the laser beams, and (ii) one or more of the polarizations of the laser beams;
   (b) shaping a laser beam or multiple laser beams with a metamaterial structure, so as to exhibit said symmetry properties.

5. The method of claim 1, wherein said harmonic emission results from any one of: (i) a high harmonic generation process between the laser field and the analyte; (ii) a low-order harmonic generation process between the laser field and the analyte; (iii) a wave-mixing nonlinear process causing a polarization density which responds non-linearly to the electric field; and (iv) the at least two non-collinear beams, comprising a first laser beam and a second laser beam which jointly meet the analyte to generate said harmonic emission.

6. The method of claim 1, wherein the laser field interacting with the analyte is characterized by any one of: (i) a static reflection symmetry; (ii) a dynamical reflection symmetry; (iii) a dynamical inversion symmetry; (iv) a dynamical improper rotation symmetry; (v) lack of inversion, reflection, and improper-rotation symmetry, wherein the laser field is locally chiral at said interaction.

7. The method of claim 1, wherein the at least two laser beams comprise a first laser beam and a second laser beam, and wherein an angle of incidence of the first laser beam and the second laser beam is in the range exceeding 0°, and equal to, or below 90°.

8. The method of claim 1, wherein said measuring a characteristic of at least one spectral line is in respect to a predefined measuring model based on any one of: (i) the level of polarized harmonic spectrum emitted from the chiral/achiral analyte; (ii) harmonic ellipticity value according to the harmonic order, wherein the harmonic helicity corresponds to the analyte's handedness; (iii) the ratio of said spectral line to at least one other spectral line.

9. The method of claim 1, wherein said harmonic emission from the analyte is imaged to create a dimensional map at one two or three space dimensions of chiral regions in the analyte.

10. A method of detecting a chiral characteristic of a randomly oriented analyte, the method comprising:
   illuminating the analyte with at least two laser beams non-collinearly to generate a laser field at an interaction region;
   receiving at least one spectral line resulting from an interaction between a laser field and the analyte at the interaction region;
   measuring a characteristic of an electric field of the at least one spectral line; and
   determining the chiral characteristic of said analyte based on said measured characteristics of the at least one spectral line.

11. The method of claim 1, wherein said measuring a characteristic of an electric field is any one of: (i) measuring intensity of the spectral line; and (ii) measuring any one of ellipticity and polarization handedness of the spectral line, or combination thereof.

12. The method of claim 10, wherein the laser field is locally chiral at said interaction, and wherein the locally chiral laser field is any one of: (i) locally chiral laser field which maintains its local chirality and handedness within all the interaction region with the analyte; and (ii) locally chiral laser field having different handedness in different sections of the interaction region.

13. The method of claim 10, wherein the laser field exhibits different symmetry properties in different sections of the interaction region.

14. The method of claim 10, wherein one or more of the wavelengths of the at least two laser beams, and/or one or more of the polarizations of the at least two laser beams is controlled, such that the laser field is configured to exhibit local chirality at said interaction region.

15. The method of claim 10, wherein one or more of the wavelengths of the at least two laser beams, and/or one or more of the polarizations of the at least two laser beams is controlled, such that the laser field is configured to exhibit asymmetry at said interaction region, said asymmetry comprising (i) inversion asymmetry, (ii) reflection asymmetry and (iii) improper-rotation asymmetry.

16. The method of claim 15, wherein the asymmetric configuration of the laser field causes emission of harmonics with a first intensity for (R) chiral analytes, and emission of harmonics with a second, different intensity for(S) chiral analytes.

17. The method of claim 10, wherein one or more of the wavelengths of the at least two laser beams, and/or one or more of the polarizations of the at least two laser beams is controlled, such that the laser field is configured to exhibit a symmetry selected from (i) static reflection symmetry, (ii) dynamical reflection symmetry, (iii) dynamical inversion symmetry, (iv) dynamical improper rotational symmetry, and any combination thereof.

18. The method of claim 17, wherein said symmetry of the laser field is configured such that when the analyte is chiral, said symmetry is broken, resulting in emission of forbidden harmonics in the harmonic emission signal, and/or emission of harmonics with forbidden polarizations in the harmonic emission signal.

19. A system for detecting a chiral characteristic of a randomly oriented analyte, the system comprising:
   at least one laser source, configured to illuminate the analyte with at least two laser beams non-collinearly to generate a laser field at an interaction region;
   a detection device coupled with at least one hardware processor; and
   a non-transitory computer-readable storage medium having stored thereon program instructions, the program instructions executable by the at least one hardware processor to:
   receive, via the detection device, at least one spectral line of a harmonic emission signal indicative of chirality, resulting from an electric dipole interaction between the laser field and the analyte;
   measure a characteristic of an electric field of the at least one spectral line; and
   determine the chiral characteristic of said analyte based on said measured characteristics of the at least one spectral line.

20. The system of claim 19, wherein the harmonic emission is received from an electric dipole interaction generated by a three-dimensional vectorial laser field which interacts with the analyte and exhibits harmonic emission with one of the following properties:
   (i) static reflection symmetry;
   (ii) dynamical reflection symmetry;
   (iii) dynamical inversion symmetry;
   (iv) dynamical improper rotational symmetry
   (v) harmonic emission without any one of inversion, reflection, or improper-rotation symmetry,
   wherein the detection device optionally comprises a spectrometer.

* * * * *